Figure 1:
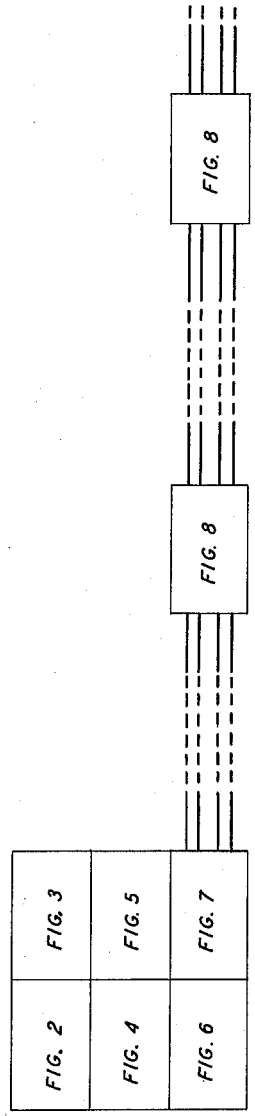

March 7, 1961

E. E. BARRETT ET AL 2,974,187

SELECTIVE CALLING SYSTEM

Filed Dec. 17, 1958

9 Sheets-Sheet 1

INVENTORS E.E. BARRETT
L.M. KOLENSKY
C.J. VOTAW
BY

ATTORNEY

INVENTORS
E.E. BARRETT
L.M. KOLENSKY
C.J. VOTAW

BY John E. Cassidy
ATTORNEY

March 7, 1961

E. E. BARRETT ET AL 2,974,187

SELECTIVE CALLING SYSTEM

Filed Dec. 17, 1958

9 Sheets-Sheet 4

INVENTORS
E.E. BARRETT
L.M. KOLENSKY
C.J. VOTAW

BY John E. Cassidy

ATTORNEY

INVENTORS
E. E. BARRETT
L. M. KOLENSKY
C. J. VOTAW

BY John E. Cassidy
ATTORNEY

March 7, 1961  E. E. BARRETT ET AL  2,974,187
SELECTIVE CALLING SYSTEM
Filed Dec. 17, 1958  9 Sheets-Sheet 7

INVENTORS
E.E. BARRETT
L.M. KOLENSKY
C.J. VOTAW
BY
John E. Cassidy
ATTORNEY

United States Patent Office 2,974,187
Patented Mar. 7, 1961

2,974,187
SELECTIVE CALLING SYSTEM

Edward E. Barrett, Paramus, Leo M. Kolensky, Newark, and Clarence J. Votaw, Bergenfield, N.J., assignors to Bell Telephone Laboratories, Incorporated, New York, N.Y., a corporation of New York Filed Dec. 17, 1958, Ser. No. 781,062

17 Claims. (Cl. 178—3)

This invention relates to an automatic telegraph selection system and more particularly to a telegraph communication system for automatically selecting remote transmitters and recorders on a full-duplex multistation line.

A broad object of this invention is to provide an improved system for automatically selecting stations on a multistation line.

Another object of this invention is to provide an improved system for selectively enabling stations on a multistation line to transmit messages under the control of a central control station.

In certain previous systems of the type wherein outlying telegraph stations on a multistation line are connected to a central control station, the central control station includes a transmitter start circuit for sequentially polling the outlying stations for available message material. The transmitter start circuit generates and transmits transmitter start code patterns one a a time and in rotation for selectively starting remote station transmitters and each outlying station transmitter is selectively started in response to the reception of the pattern individual thereto if it is supplied with a message tape. In the event the outlying station transmitter is not supplied with a message tape, perforated with one or more messages awaiting transmission, when polled by the transmitter start circuit, the outlying station informs the central station that there is no message awaiting transmission and the transmitter start circuit proceeds to poll the next outlying station transmitter by sending the next successive transmitter start code pattern.

A further object of this invention is to provide a more rapid and efficient system for automatically selecting remote stations on a multistation line.

Another object of this invention is to eliminate the redundancy of code signals in successive selection code patterns.

A further object of this invention is to provide assurance that the outlying station is connected to the central station before the outlying station transmitter is started.

In accordance with a specific embodiment of the invention disclosed herein, the central station transmitter start circuit is arranged to generate and transmit a plurality of transmitter start code patterns one at a time, and in rotation. Each pattern comprises a sequence of four code signals and the last three code signals of each pattern is identical with the first three code signals of the next successive pattern, wherein the last three code signals may serve as the first three code signals of the next pattern. If, when an outlying station transmitter is polled, the outlying station informs the central station that the transmitter does not have an available message, the transmitter start circuit sends the last code signal only of the next successive pattern thus completing the next successive pattern. In the event an outlying station transmitter is supplied with a message tape when polled by the transmitter start circuit, the outlying station informs the central station that a message is awaiting transmission, whereupon the transmitter start circuit at he central station sends a sart signal to initiate the operation of the outlying station transmitter. The transmitter start circuit then retires until the outlying station message is completed, whereupon a new polling cycle is initiated.

Figure 8:
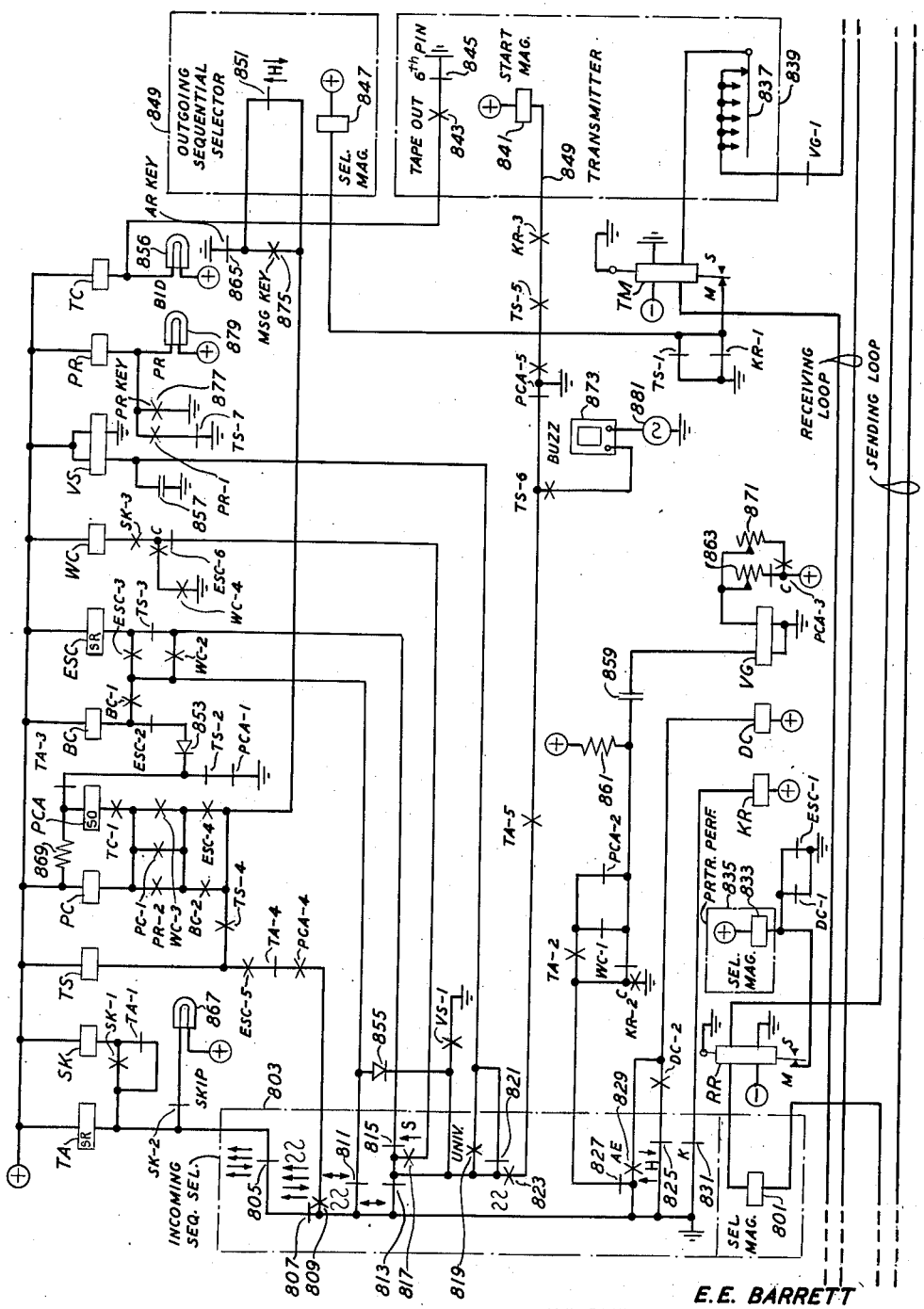
Figure 9:
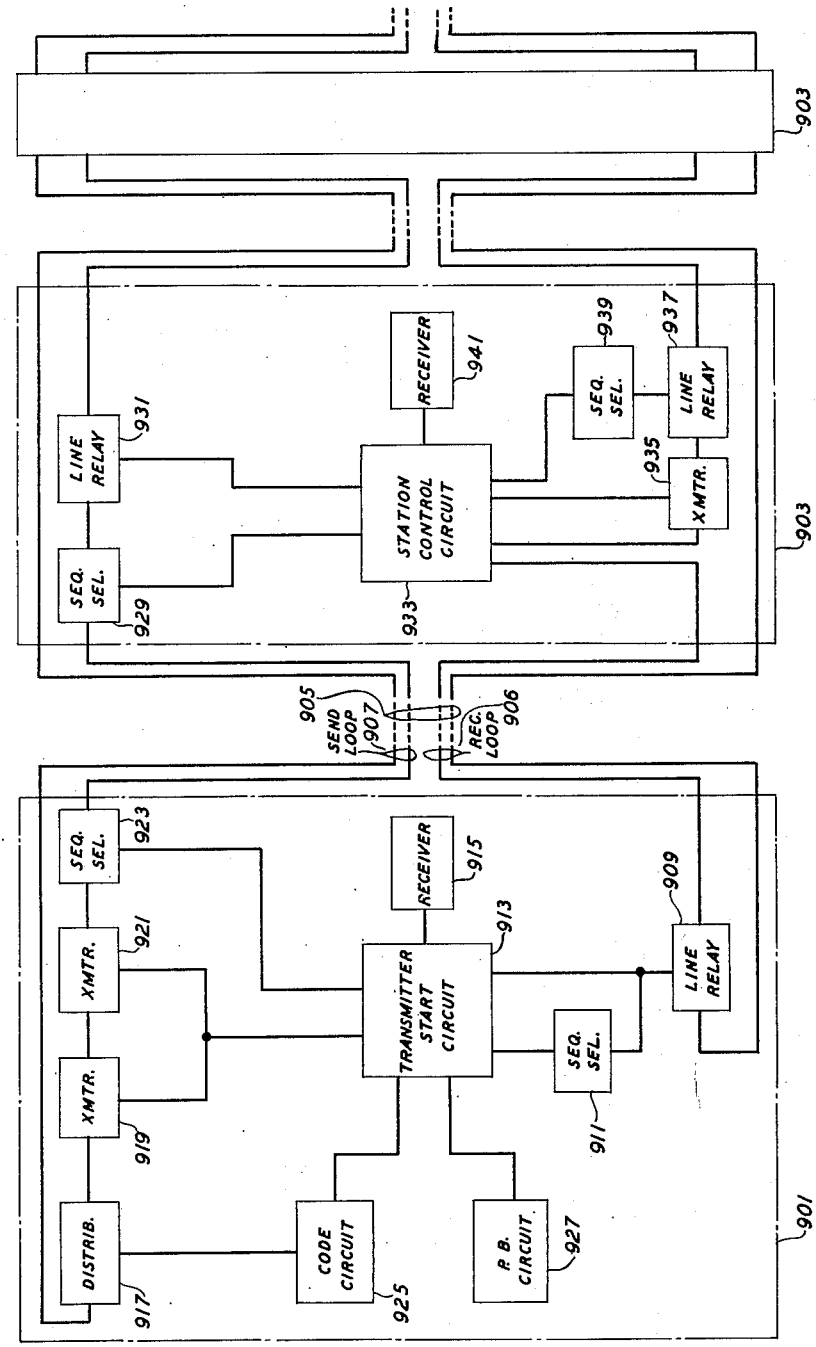

The means for fulfilling the foregoing objects and the practical embodiment of the features of this invention will be fully understood from the following description taken in conjunction with the accompanying drawings wherein:

Figs. 2–7, when arranged as shown in Fig. 1, show the details of circuits and equipment which cooperate to form a central control station in accordance with this invention;

Fig. 8 shows the details of circuits and equipment which cooperate to form a typical outlying station in accordance with this invention; and Fig. 9 illustrates in block form the various equipment and circuits of the central station and a typical outlying station and the manner in which they cooperate.

In order to minimize the number of leads interconnecting the circuit components and to effect a reduction in the number of sets of drawings comprising the detailed circuit disclosure, the "detached contact" method of exposition used in Patent No. 2,722,675, granted to J. Michal et al. on November 1, 1955, has been adopted. In the detached contact method, the relay core and its winding or windings are shown physically separated from the contacts controlled thereby. The core is given a functional designation such, for example, as FC indicated on Fig. 6 of the drawings by a small rectangle. In the specification, the relay is referred to as 6–FC where "6" indicates the figure number of the drawing on which the core is located and "FC" signifies "first code," the functional designation of the relay. On the drawings, each of the contacts controlled by the relay and shown on the same figure with the winding are given a contact number such, for example, as 1, and a relay designation, FC, placed in proximity to the contacts where "FC" indicates that the contacts are controlled by the winding of relay FC located on the same figure. In the specification, the contacts are referred to as 6–FC–1. When the relay has contacts located on another figure of the drawing, the relay contacts are given a compound designation such as 6–FC–2. In the specification, the contacts are referred to as 5–6–FC–2 where "5" indicates the figure number of the drawing on which the contacts are located, "6" indicates the figure number of the drawing on which the core is located, "FC" is the functional designation and "2" is the number of the relay contacts.

Contacts which are closed when the relay is de-energized, known as "break contacts," are represented by a single short line perpendicular to the line representing the conductor, while contacts which are closed when the relay is energized, known as "make contacts," are represented by two short, crossed line diagonally intercepting the conductor line. "Break" and "make" contacts connected together on one side, in close proximity to each other, indicate a set of transfer contacts. If the contacts include the designation "C," they indicate a set of "continuity" or "make-before-break" contacts. Similarly, the normally opened and normally closed contacts of keys and push-buttons are shown in a manner similar to that used in designating relay contacts. These contacts, however, are given the conventional numerical designation. Transmitter-distributors, lamps, rotary selectors, etc. are shown and designated in the conventional manner employed heretofore.

*General description*

Referring now to Fig. 9, a typical full-duplex party line 905 is shown extending from a central station generally indicated by block 901 to outlying stations 903. It is to be understood that any number of outlying stations may be served by party line 905.

Party line 905 comprises a central station sending loop or channel 907 for transmitting signals from central station 901 to the outlying stations and a central station receiving loop or channel 906 for transmitting signals from outlying stations 903 to central station 901. Sending loop 907 and receiving loop 906 have been shown as separate metallic transmission circuits. It is to be understood, however, that these loops may include any of the usual types of transmission channels suitable for the transmission of telegraph signals in both directions simultaneously.

Central station 901 is provided with line relay 909 in series with receiving loop 906. Line relay 909 repeats signals received over receiving loop 906 to a sequential selector 911, transmitter start circuit 913 and receiver 915 by way of transmitter start circuit 913. Central station 901 is also provided with start-stop distributor 917, transmitter 919, transmitter 921 and sequential selector 923 in series with sending loop 907. Code circuit 925 codes distributor 917 with code characters for impression on sending loop 907 in accordance with instructions by transmitter start circuit 913 and push-button circuit 927 via transmitter start circuit 913.

Outlying station 903 is provided with sequential selector 929 and line relay 931 in series with sending loop 907. Signals received from central station 901 over sending loop 907 are repeatedly by relay 931 to receiver 941 by way of station control circuit 933. Outlying station 903 is also provided with transmitter 935 and line relay 937 in series with station control circuit 933 and receiving loop 906. Signals impressed on receiving loop 906 by transmitter 935 are repeated by line relay 937 to sequential selector 939.

Suitable transmitting and receiving apparatus for use in this system are disclosed in Patent No. 1,904,164, granted to S. Morton et al. on April 18, 1933; Patent No. 2,255,794, granted to R. A. Lake on September 16, 1941; Patent No. 2,348,214, granted to E. A. Gubisch on May 9, 1944; and Patent No. 2,296,845, granted to M. T. Goetz on September 29, 1942. Sequential selectors 911, 923, 929 and 939 selectively open and close contacts in response to predetermined code signals and sequences of code signals. A sequential selector suitable for use in this system is disclosed in Patent No. 2,568,264, granted to W. J. Zenner on September 18, 1951. The disclosure of all of these patents and all patents hereinafter referred to are hereby incorporated herein by reference as though fully set forth herein.

Messages from central station 901 are transmitted to outlying stations 903 by transmitter 919 or transmitter 921 which operate alternately to transmit a message to one or more of the selected outlying stations. The central station operator supplies a message tape to transmitter 919 or 921, preceding each message with call directing code sequences to select outlying station receivers. In the event that a selected outlying station receiver is arranged to acknowledge the selection by the central station, an answerback request code sequence is punched in the tape prior to the call directing code sequences.

Sequential selector 923, in response to the transmission of the answerback request code sequence, informs transmitter start circuit 913 that one or more subsequent call directing code sequences will require answerback and when sequential selector 923 informs transmitter start circuit 913 that the call directing code sequence requiring answerback has been transmitted to the sending loop, transmitter start circuit 913 stops transmitter 919 or 921 and awaits the answerback response from the selected outlying station.

Sequential selector 929 of outlying station 903 responds to the reception of the answerback request code sequence by informing station control circuit 933 that a subsequent call directed code sequence will require answerback whereupon station control circuit 933 stops transmitter 935 if it is sending. In the event that a call directing code sequence for selecting receiver 941 is received and answerback is required, station control circuit 933 impresses a reply signal on receiving loop 906 and connects receiver 941 to line relay 931.

Upon the reception of the reply signal by transmitter start circuit 913 via line relay 909, transmitter start circuit 913 restarts the sending transmitter to send the next call directing code sequence. All the call directing code sequences are thus sent, with the central station transmitter start circuit 913 causing transmitter 919 or 921 to pause and await replies after each sequence requiring answerback. When the call directing code sequences are all transmitted, the central station transmitter sends the message text and station control circuit 933 restarts transmitter 935.

At the conclusion of the message, central station transmitter 919 or 921 sends an end-of-message code sequence whereupon sequential selector 923 instructs transmitter circuit 913 to stop the particular transmitter which is sending, and to start the other transmitter if and when it is supplied with a message. Sequential selector 929, in response to the end-of-message code sequence, instructs station control circuit 933 at each receiving station to disconnect receiver 941 thereat from its respective line relay 931. The next message is now transmitted in the same manner as previously described.

Instead of punching the call directing code sequence in the tape, the central station operator may insert the selection codes by operating appropriate keys in push-button circuit 927 which will instruct code circuit 925 to code distributor 917 with the appropriate call directing code sequence and the answerback request code sequence, if required. Where a call directing code sequence requires answerback, push-button circuit 927 pauses under the control of transmitter start circuit 913 and central station 901 awaits the reply signal in the same manner as if the call directing code sequences were punched in the tape.

Messages from outlying station transmitter 935 to central station 901 are prepared by supplying transmitter 935 with a message tape and operating the priority key, not shown in Fig. 9, if the message has a priority classification. Transmitter start circuit 913 functions to sequentially poll outlying station transmitters for priority messages and then for regular messages. Each polling cycle is initiated by transmitting an emergency stop code sequence coded on distributor 917 by code circuit 925 in accordance with instructions from transmitter start circuit 913. Sequential selector 929, in response to the emergency stop code sequence, instructs station control circuit 933 to blind receiver 941, if it is receiving a message, and stop transmitter 935, if it is sending.

After the transmission of the emergency stop code sequence, transmitter start circuit 913 instructs code circuit 925 to sequentially code distributor 917 with four character transmitter start code sequences for polling outlying station transmitters for message material, pausing after the transmission of each transmitter start code sequence to await the response from the outlying station.

Sequential selector 929 informs station control circuit 933 of the reception of the transmitter start code sequence individual to transmitter 935. Station control circuit 933 recognizes the reception of the first sequence of each cycle as a request for priority messages and the subsequent sequence as a request for regular messages. Station control circuit 933, in response to the first sequence, impresses a no-traffic response signal on receiving loop 906 if transmitter 935 is not supplied with a priority message and impresses a traffic-available response signal on receiving loop 906 if transmitter 935 is supplied with a priority message and, in response to the second sequence, impresses on loop 906 a no-traffic response if transmitter 935 is not supplied with a message and a traffic-available response if transmitter 935 is supplied with a message. It is emphasized, however, that all stations are first polled for priority messages before any station is polled for a non-priority message.

The traffic-available and no-traffic response signals are repeated to transmitter start circuit 913 by way of line relay 909 and sequential selector 911. Transmitter start circuit 913, in response to a no-traffic response signal, instructs code circuit 925 to impress the last character of the next successive transmitter start sequence on distributor 917. In the event that a traffic-available response signal is received, transmitter start circuit 913 instructs code circuit 925 to impress a start code sequence on distributor 917.

Upon the reception of the start code sequence, station control circuit 933 starts transmitter 935 and unblinds receiver 941, if it had been previously receiving. Transmitter 935 now proceeds to send the message to the central station. Transmitter start circuit 913, in response to the reception of the message from transmitter 935, connects receiver 915 to line relay 909, restarts the central station transmitter that had previously been sending and retires until the end-of-message code sequence is received.

When transmitter 935 impresses the end-of-message code sequence on receiving loop 906, sequential selector 939, in response to the end-of-message code sequence received by way of line relay 937, instructs station control circuit 933 to stop transmitter 935. When the end-of-message code sequence is received by line relay 909, sequential selector 911 instructs transmitter start circuit 913 to disconnect receiver 915 from line relay 909 and transmitter start circuit 913 initiates a new polling cycle.

In the event of the central station polls all the outlying station transmitters for priority and regular messages without starting an outlying station transmitter, transmitter start circuit 913 instructs code circuit 925 to impress a standby code sequence on distributor 917 and restarts the sending central station transmitter. Transmitter start circuit 913 thereupon retires and the central station is maintained in a standby condition. Station control circuit 933, when informed of the reception of the standby code sequenc by sequential selector 929, sets outlying station 903 in the standby condition and unblinds receiver 941, if it is receiving. During the standby condition, the outlying station operator may restart the polling cycle by inserting a message tape in transmitter 935 whereupon station control circuit 933 impresses a request signal on receiving loop 906. Transmitter start circuit 913, in response to the reception of the request signal, initiates a new polling cycle in the same manner as previously described.

*The central control station*

Figure 6:
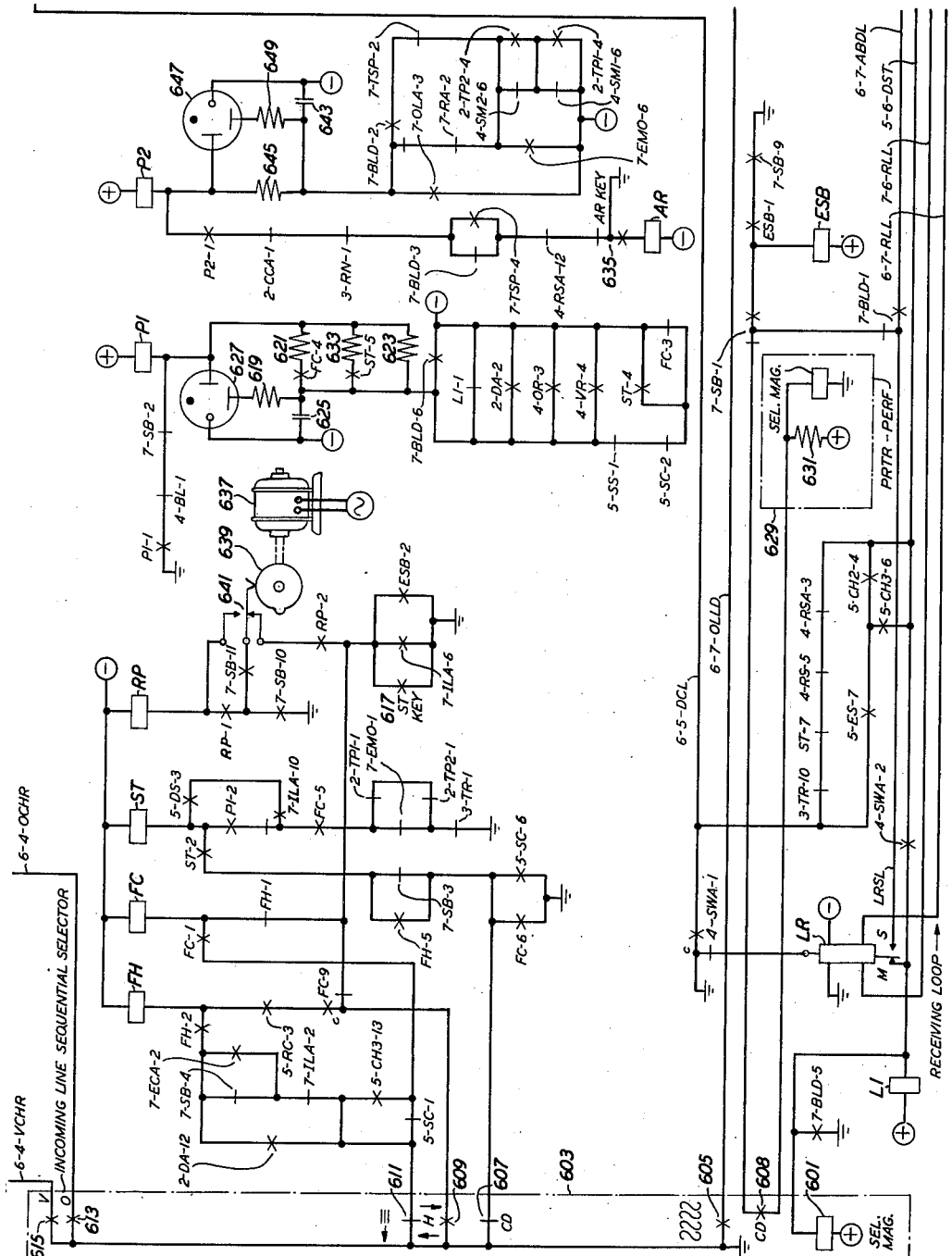
Figure 7:
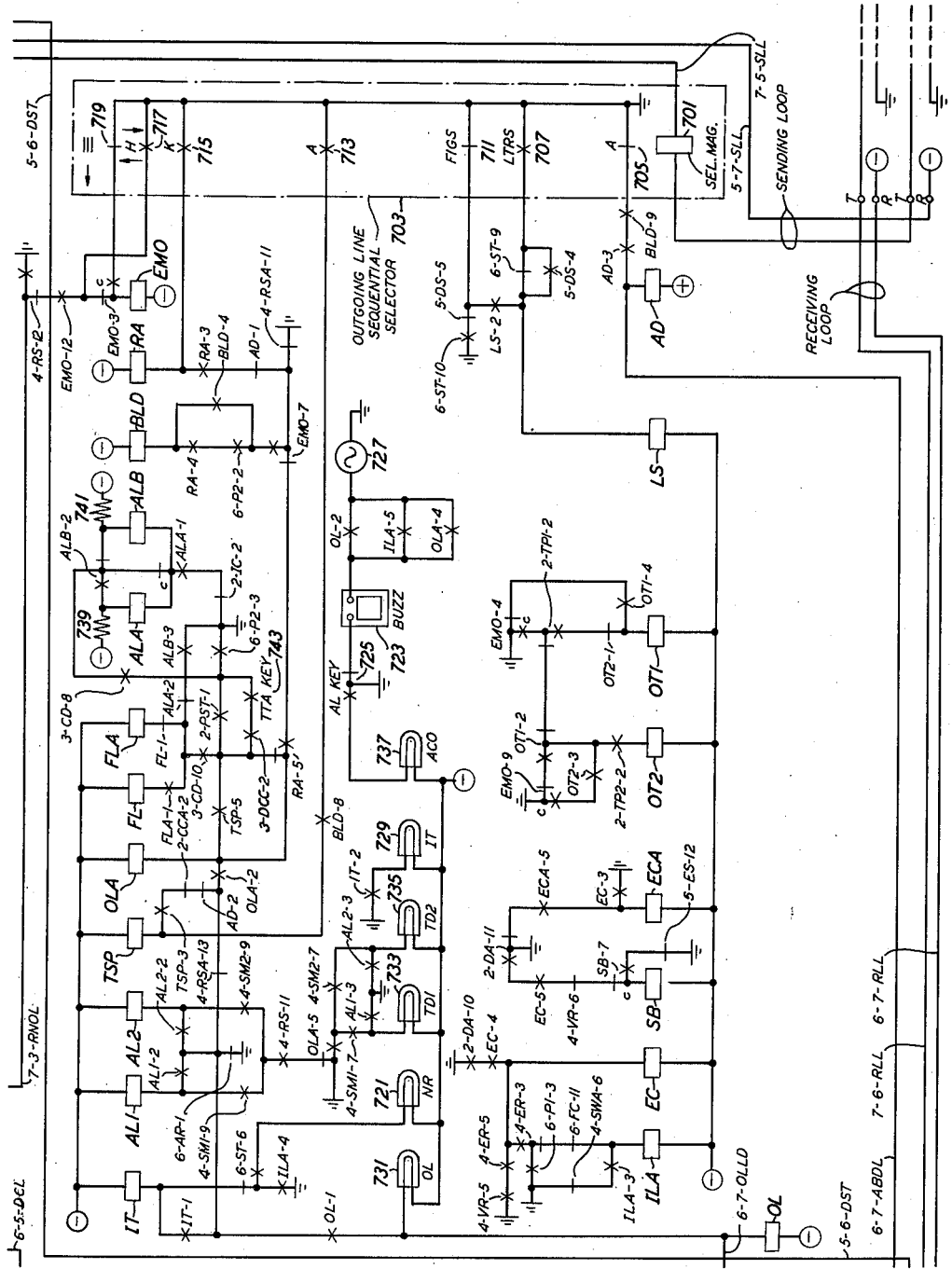

Referring now to Figs. 2 through 7 showing the details of the central control station and more particularly to Fig. 7, incoming signals from the outlying stations are rceived across connection T and connection R of the receiving loop and the T and R receiving loop connections are interconnected by way of receiving loop lead 7–6–RLL, the winding of polarized line relay 6–LR, Fig. 6, and receiving loop lead 6–7–RLL whereby polarized line relay 6–LR follows the line signals on the receiving loop. Ground is normally applied to the armature of relay 6–LR by way of the break contacts of continuity contacts 6–4–SWA–1 and when the receiving loop is in the marking or closed condition, the armature of relay 6–LR is operated to the marking contact and a path is completed from ground by way of the break contacts of continuity contacts 6–4–SWA–1, the armature and the marking contact of relay 6–LR and the winding of relay 6–L1 to positive battery. Relay 6–L1 operated opens one possible path for applying negative battery to the control electrode of gas timer tube 627 by way of break contacts 6–L1–1 and resistance 619. The marking contact of relay 6–LR is also connected to selector magnet 601 of the incoming line stunt box or sequential selector generally indicated in block 603 whereby sequential selector 603 follows the line signals on the receiving loop. Sequential selector 603 responds to the teletypewriter code sequence Figures-H-Letters by momentarily closing normally opened contacts 609 unlatching contacts 607 and 608 if they are opened and closed, respectively, and placing itself in the select condition. Sequential selector 603 momentarily closes normally open contacts 605 in response to the code sequence Blank-Blank and while in the select condition momentarily closes contacts 615 in response to code character V, momentarily closes contacts 613 in response of code character O and opens and latches contacts 607 and closes and latches contacts 608 in response to the code sequence CD. In addition, sequential selector 603 momentarily opens contacts 611 and places itself in the non-select condition in response to the code sequence Carriage Return-Line Feed.

The spacing contact of relay 6–LR is connectable to the select magnet of the printer-perforator, generally indicated in block 629 by way of line relay spacing lead LRSL, the break contacts of transfer contacts 6–7–BLD–1, the break contacts of transfer contacts 6–7–SB–1 and contacts 608 when they are closed in response to the cut-on code sequence CD. The select magnet of printer-perforator 629 is normally maintained in the idle marking condition due to current applied from positive battery to ground by way of resistance 631 and the winding of the select magnet. Thus when the spacing contact of relay 6–LR is connected to the select magnet, the operation of the armature of relay 6–LR to the spacing contact applies shunting ground to the select magnet of printer 629 thereby simulating a spacing signal.

Outgoing line signals from the central station are applied across connection T and connection R of the sending loop, Fig. 7. The T and R connections of the sending loop are normally interconnected by way of select magnet 701 of the outgoing line stunt box or sequential selector, generally indicated by block 703, sending loop lead 7–5–SLL, break contacts 5–4–SM1–1 or in shunt thereto the stop contacts 501 of the No. 1 transmitter-distributor contacts, generally indicated by block 503 of the No. 1 outgoing transmitter-distributor, contacts 5–4–SM2–1 or in shunt thereto the stop contacts 505 of the No. 2 transmitter-distributor contacts, generally indicated by block 507 of the No. 2 outgoing transmitter-distributor, break contacts 5–4–SW–1, lead 5–6–DST, the distributor stop contacts 509 of the code distributor, generally indicated by block 511, distributor common lead 6–5–DCL, break contacts of continuity contacts 5–4–SW–2 and lead 5–7–SLL. Select magnet 701 thus follows the outgoing line signals and in response to the code sequence Figures-H-Letters, sequential selector 703 places itself in the select condition and momentarily closes contacts 717. Sequential selector 703 momentarily closes contacts 707 in response to the code character Letters, momentarily opens contacts 711 in response to the code character Figures and when in the select condition momentarily opens contacts 705 in response to the code character A, momentarily closes contacts 713 in response to the code character A and momentarily closes contacts 715 in response to the code character K. In addition, selector 703 momentarily opens contacts 719 and returns itself to the non-select condition in response to the code sequence Carriage Return-Line Feed.

Message tapes may be supplied to the outgoing transmitter-distributors by manual insertion or by conventional perforators, not shown. Transmitter-distributor contacts 503 senses tape supplied to the No. 1 transmitter-distributor when the No. 1 transmitter-distributor is sending. Associated with the No. 1 transmitter-distributor is start magnet 201, Fig. 2, tape-cut contacts 203, and 6 pin contacts 205. Transmitter-distributor contacts 507 senses tape supplied to the No. 2 transmitter-distributor. Associated with the No. 2 transmitter-distributor is start magnet 207, Fig. 2, tape-out contacts 211 and 6 pin contacts 209. Tape-out contacts 203 and 211 of the No. 1 transmitter-distributor and the No. 2 transmitter-distributor, respectively, are normally open and they close in response to a slack in the tape when there is an available supply of tape in the respective transmitter-distributor. Normally closed contacts 205 and 209 momentarily open during the sensing pin cycle if the tape is torn in the associated transmitter-distributor.

The contacts 1 through 5 of code distributor 511 are connected to distributor leads DL-1 through DL-5 whereby the contacts of the distributor 511 generate various code characters in accordance with the coding of leads DL-1 through DL-5 which are selectively extended to distributor stop contact lead 5-6-DST in a manner described hereinafter. Associated with distributor 511 is distributor auxiliary contacts 213, Fig. 2, which close at the end of the start pulse during the rotation of distributor 511 and open at the end of the fifth intelligence pulse. Also associated with distributor 511 is clutch magnet 512 which, when energized, releases distributor 511 for rotation.

*The central station polls the outlying stations*

To initiate polling of the outlying stations, the central station first sends an emergency stop code sequence to the sending loop to stop any outlying station transmitter that may be sending, next sends an end-of-message code sequence to the incoming line sequential selector 603 to place sequential selector 603 in the select condition and finally sends a transmitter start code sequence of nonprinting code characters to the sending loop to selectively poll an outlying station. Two rounds of polling are sent if no station has message material and each outlying station recognizes the first polling of the station as a request for priority messages and the subsequent polling as a request for regular messages. A traffic available response from an outlying station terminates the polling cycle.

Polling of the outlying station transmitters may be initiated by the momentary operation of start key 617, Fig. 6, completing a path from ground by way of the contacts of start key 617, break contacts 6-FH-1 and the winding of first code relay 6-FC to battery, operating relay 6-FC which locks by way of make contacts 6-FC-1, break contacts 6-5-SC-1 and contacts 611 of sequential selector 603. Relay 6-FC operated completes a path from ground by way of make contacts 5-6-FC-2, break contacts of transfer contacts 5-6-ST-1 and the winding of slow-to-release delay start relay 5-DS to battery.

Relay 6-FC operated also opens a path applying negative batttery to the control electrode of tube 627 by way of break contacts 6-FC-3, break contacts 6-5-SC-2, break contacts 6-5-SS-1 and resistance 619. Condenser 625 starts charging from positive battery by way of the winding of relay 6-P1 and the parallel paths of resistance 623 and resistance 621 in series with make contacts 6-FC-4, slowly raising the potential applied to the control electrode of tube 625. After about 240 milliseconds the potential on the control electrode is raised sufficiently to fire tube 627 which draws plate current from positive battery by way of the winding of relay 6-P1 and relay 6-P1 operates and locks via break contacts 6-7-SB-2, break contacts 6-4-BL-1 and make contacts 6-P1-1. In addition, ground applied to the plate of tube 627 by way of the locking path of relay 6-P1 extinguishes the tube.

Relay 6-P1 operated completes a path from ground by way of break contacts 6-3-TR-1, break contacts 6-7-EMO-1 or, in shunt thereto, break contacts 6-2-TP2-1 and break contacts 6-2-TP1-1, make contacts 6-FC-5, break contacts of transfer contacts 6-7-1LA-10, make contacts 6-P1-2 and the winding of start relay 6-ST to battery, operating relay 6-ST which locks by way of make contacts 6-ST-2, break contacts 6-7-SB-3 and contacts 607 of sequential selector 603 or make contacts 6-FC-6 in shunt thereto.

Figure 2:
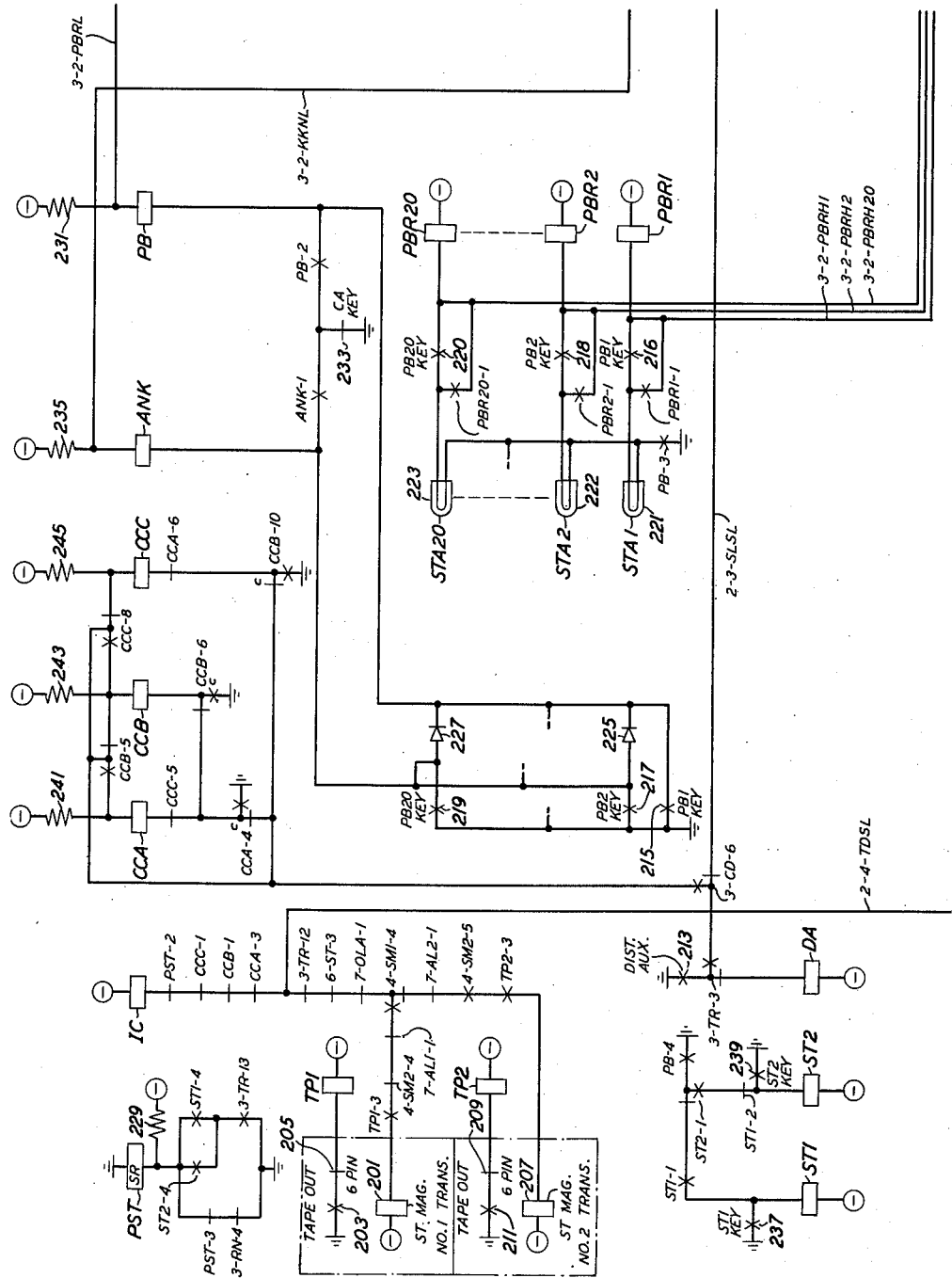

Relay 6-ST operated opens the path, via break contacts 6-3-TR-10, break contacts 6-ST-7, break contacts 6-4-RS-5 and break contacts 6-4-RSA-3, which connects leads 6-5-DCL and 5-6-DST thus removing the shunt around distributor 511, opens the common operating path for start magnet 201 and start magnet 207, Fig. 2, of the No. 1 and the No. 2 transmitter-distributors, respectively, by way of break contact 2-6-ST-3 and discharges condenser 625 by way of break contacts 6-5-SS-1, break contacts 6-5-SC-2 and make contacts 6-ST-4.

Relay 6-ST operated also opens the previously-described operating path for slow-to-release relay 5-DS by way of the break contacts of transfer contacts 5-6-ST-1. In addition, relay 6-ST operated completes a path from ground by way of make contacts 5-6-FC-2, make contacts of transfer contacts 5-6-ST-1, make contacts 5-DS-1 and the winding of the emergency stop relay 5-ES to battery operating relay 5-ES which locks by way of make contacts 5-ES-1 and break contacts 5-EML-1 or make contacts 5-ES-9 and break contacts 5-2-DA-1 in shunt thereto, make contacts of transfer contacts 5-6-ST-1 and make contacts 5-6-FC-2.

Relay 5-ES operated completes a path from ground via break contacts 4-5-CH3-1, break contacts 4-5-EML-2, make contacts 4-5-ES-2 and the winding of blank relay 4-BL to battery. Relay 5-ES operated also prepares an energizing path for clutch magnet 512 from ground by way of make contacts of transfer contacts 4-6-FC-7, make contacts 4-5-ES-4, break contacts 4-5-DS-2, distributor clutch magnet lead 4-5-DCML, break contacts of transfer contacts 53-TR-2 and the winding of clutch magnet 512 to battery. The energizing path of clutch magnet 512 will not be completed, however, until slow-to-release relay 5-DS releases.

In addition, relay 5-ES operated completes an energizing path from ground by way of make contacts 4-5-ES-3, break contacts 4-RL-1 and the winding of step magnet 401 of step-on-release selector 403 to battery energizing step magnet 401. Ground is also placed on the winding of relay 4-RL. Relay 4-RL does not operate at this time, however, due to the shunting path by way of break contacts 4-RL-2 and the selector interruptor contacts 405.

Step-on-release selector 403 comprises six arcs having 11 positions or points each. Certain predetermined points of arcs 3 through 6 are connected to the letters common lead LTCL and function to code distributor 511 with the Figures and Letters characters constituting the transmitter start codes as described hereinafter. Arcs 3 through 6 are strapped to lead LTCL to code distributor 511 with the following transmitter start code sequences:

| Position | Code | | | |
| --- | --- | --- | --- | --- |
| 1 | Figures | Figures | Figures | Letters |
| 2 | Figures | Figures | Letters | Letters |
| 3 | Figures | Letters | Letters | Figures |
| 4 | Letters | Letters | Figures | Figures |
| 5 | Letters | Figures | Figures | Letters |
| 6 | Figures | Figures | Letters | Figures |
| 7 | Figures | Letters | Figures | Letters |
| 8 | Letters | Figures | Letters | Figures |
| 9 | Figures | Letters | Figures | Figures |
| 10 | Letters | Figures | Figures | Figures |

Inspection of the transmitter start sequence discloses that the first three characters of each sequence are identical with the last three characters of the prior sequence. The advantage of this arrangement will be discussed hereinafter.

Selector 403 includes normally closed interrupter contacts 405 and 413 which open when step magnet 401 is energized and normally closed off-normal contacts 415 which open when the wipers of selector 403 are on position 11.

Returning now to the energization of step magnet 401 interrupter contacts 405 open, opening the previously-described shunting path for relay 4-RL and relay 4-RL operates due to the operating path from ground by way of make contacts 4-5-ES-3, the winding of relay 4-RL and resistance 407 to battery. The operation of relay 4-RL further opens the shunt path via contacts 4-RL-2 and opens the previously-described energizing path for step magnet 401 by way of break contacts 4-RL-1 and selector 403 steps to the next successive position. If selector 403 is on position 10, when step magnet 401 de-energizes the wipers step to position 11, interrupter contacts 405 close and a shunt path is completed from ground by way of the wiper and position 11 of arc 1 of selector 403 and contacts 405 to the junction of resistance 407 and the winding of relay 4-RL, releasing relay 4-RL and thus recompleting the previously-described energizing path for step magnet 401 via contacts 4-RL-1. The resultant energization of step magnet 401 thus steps selector 403 to position 1 and operates relay 4-RL in the same manner as previously described.

Assuming now that when step magnet 401 is energized the wipers of selector 403 step from position 7 to position 8. A path is thus completed from ground to battery by way of the wiper and position 8 of arc 1, the normally closed contacts of skip 8 locking key 409 and the filament of station 8 lamp 411, energizing lamp 411. Although not necessarily shown in Fig. 4, a key identical to key 409 and a lamp identical to lamp 411 are associated with each of positions 1 through 10 of arc 1 and each lamp is similarly energized when the selector wipers step to the point associated with the lamp, thus indicating the station to be polled for message material. It is further noted that positions 8 of arc 3 and arc 5 are strapped to lead LTCL and a path is completed from ground by way of make contacts 4-5-ES-5, the wiper and position 8 of arc 3 of selector 403, lead LTCL and the winding of letters relay 4-LTRS to battery operating the relay. Relay 4-LTRS, however, performs no function at this time.

Relay 4-BL operated opens the previously-described locking path for relay 6-P1 by way of break contacts 6-4-BL-1 releasing relay 6-P1. In addition, relay 4-BL operated opens the common path, by way of break contacts 5-4-BL-2, which extends distributor leads DL-1 through DL-5 to lead 5-6-DST thereby coding distributor 511 with the code character Blank.

It is recalled that relay 6-ST operated opens the operating path of slow-to-release relay 5-DS, but the release time of relay 5-DS maintains the relay operated until after selector 403 steps and relay 4-BL operates. When relay 5-DS releases, the previously-described energizing path for clutch magnet 512 is completed, energizing clutch magnet 512 and thereby releasing distributor 511 for rotation. Since distributor 511 is coded for the character Blank a start-stop Blank character is generated and transmitted to the sending loop. This is the first character of the emergency stop sequence, Blank followed by a pause of two character lengths and Letters, which functions to stop outlying station transmitters in a manner described subsequently.

At the end of the start pulse on the Blank character, distributor auxiliary contacts 213, Fig. 2, close completing a path from ground by way of contacts 213, the break contacts of transfer contacts 2-3-TR-3 and the winding of distributor auxiliary relay 2-DA to battery. Relay 2-DA while operated completes an additional discharge path for condenser 625 by way of make contacts 6-2-DA-2, completes a holding path for relay 4-LTRS via make contacts 4-LTRS-1, letters hold lead 4-5-LTHL and make contacts of transfer contacts 5-2-DA-4 and completes a path from ground by way of make contacts 5-6-FC-8, make contacts 5-ES-6, break contacts 5-EML-3, make contacts of transfer contacts 5-2-DA-3, break contacts 5-CH2-1, break contacts 5-CH3-2 and the winding of the character 1 relay 5-CH1 to battery operating relay 5-CH1 which locks by way of make contacts 5-CH1-1 and the break contacts of transfer contacts 5-CH2-2. Relay 5-CH1 constitutes the first relay of the stepping chain relays 5-CH1, 5-CH2 and 5-CH3.

At the end of the transmission of the fifth intelligence pulse of the Blank character, distributor auxiliary contacts 213 reopen releasing relay 2-DA. The release of relay 2-DA completes a supplementary holding path for relay 5-CH1 by way of the break contacts of transfer contacts 5-2-DA-4 and make contacts 5-CH1-1. In addition, the release of relay 2-DA completes a path from ground by way of contacts 5-6-FC-8, 5-ES-6 and 5-EML-3, the break contacts of transfer contacts 5-2-DA-3, the make contacts of transfer contacts 5-CH1-2, break contacts 5-CH3-3 and the winding of character 2 relay 5-CH2 to battery operating relay 5-CH2 which locks by way of make contacts 5-CH2-3 and break contacts 5-CH3-4. The operation of relay 5-CH2 opens the previously-described locking path of relay 5-CH1 by way of break contacts of transfer contacts 5-CH2-2. Relay 5-CH1 remains operated at this time, however, due to the holding path by way of the break contacts of transfer contacts 5-2-DA-4.

Relay 5-CH2 operated also completes a shunt path across the sending loop from lead 7-5-SLL to lead 5-7-SLL by way of contacts 5-4-SM1-1, 5-4-4SM2-1 and 5-4-SW-1, lead 5-6-DST, make contacts 6-5-CH2-4, make contacts 6-5-ES-7, lead 6-5-DCL and break contacts of continuity contacts 5-4-SW-2. The sending loop is now in a steady marking condition and will remain this way for the second and third revolutions of distributor 511 regardless of the coding of distributor 511.

During the second revolution of distributor 511 relay 2-DA operates opening the previously-described holding path for relay 5-CH1 via the break contacts of transfer contacts 5-2-DA-4 releasing relay 5-CH1. The release of relay 2-DA near the end of the second revolution of distributor 511 completes a supplementary holding path for relay 5-CH2 via the break contacts of transfer contacts 5-2-DA-5 and make contacts 5-CH2-3. In addition, the release of relay 2-DA completes a path from ground via contacts 5-6-FC-8, 5-ES-6, 5-EML-3, break contacts of transfer contacts 5-2-DA-3, break contacts of transfer contacts 5-CH1-2, make contacts 5-CH2-5 and the winding of character 3 relay 5-CH3 to battery operating relay 5-CH3 which locks by way of make contacts 5-CH3-5 and the make contacts of transfer contacts 5-CH2-2.

Relay 5-CH3 operated completes a shunting path via contacts 6-5-CH3-6 around contacts 6-5-CH2-4 in the previously-described sending loop shunting path and opens the previously-described operating path for relay 4-BL via contacts 4-5-CH3-1 releasing relay 4-BL. Relay 5-CH3 operated also completes a supplementary holding path for relay 5-ES via contacts 5-CH3-7 in shunt with contacts 5-2-DA-1 in the previously-described locking path for relay 5-ES and opens the previously-described locking path for relay 5-CH2 via contacts 5-CH3-4. Relay 5-CH2 remains operated, however, due to the hold path via the break contacts of transfer contacts 5-2-DA-5.

Relay 2-DA operates during the third revolution of distributor 511 completing a supplementary holding path for relay 5-CH3 via the make contacts of transfer contacts 5-2-DA-5 and make contacts 5-CH3-5 and opening the previously-described holding path for relay 5-CH2 via the break contacts of transfer contacts 5-2-DA-5 releasing relay 5-CH2.

Relay 5-CH2 released opens the previously-described locking path for relay 5-CH3 via contacts 5-CH2-2 but relay 5–CH3 remains operated at this time due to the previously-described holding path via the make contacts of contacts 5–2–DA–5. Relay 5–CH2 released also completes a path from ground by way of make contacts 5–CH3–8, break contacts 5–CH2–6, the code sequence reset lead 4–5–CSRL, make contacts 5–ES–8 and the winding of the end-of-message local relay 5–EML to negative battery operating relay 5–EML which locks via make contacts 5–EML–4, break contacts of transfer contacts 5–RC–1 or, in shunt thereto, make contacts 5–CH3–9, make contacts of transfer contacts 5–6–ST–1 and make contacts 5–6–FC–2. Relay 5–EML operated opens one of the previously-described locking paths for relay 5–ES by way of contacts 5–EML–1 and opens the previously-described operating paths for relays 5–CH1, 5–CH2 and 5–CH3 via contacts 5–EML–3.

Near the end of the third revolution, relay 2–DA releases opening a previously-described locking path for relay 5–CH3 via the make contacts of contacts 5–2–DA–5 and relay 5–CH3 releases removing the previously-described shunt across the sending loop via contacts 6–5–CH3–6.

Relay 5–CH3 released opens the operating path and one of the locking paths for relay 5–EML via contacts 5–CH3–8 and contacts 5–CH3–9 respectively and opens one of the previously-described locking paths for relay 5–ES via contacts 5–CH3–7.

During the start pulse for the fourth revolution relay 2–DA operates opening the previously-described locking path of relay 5–ES by way of contacts 5–2–DA–1 and relay 5–ES releases opening the operating path for relay 4–LTRS via contacts 4–5–ES–5. Relay 4–LTRS is maintained operated by its locking path via the make contacts of contacts 5–2–DA–4.

Relay 5–ES released also opens the energizing path for clutch magnet 512 via contacts 4–5–ES–4 whereby distributor 511 will stop at the end of the fourth revolution. In addition relay 5–ES released opens the previously-described operating path for relay 4–RL via contacts 4–5–ES–3 and relay 4–RL releases.

With the shunt path now removed from across the sending loop, distributor 511 sends the characters Letters to the outlying stations since distributor contacts 1 through 5 are now connected to lead 5–7–DST by way of the distributor coding circuit. Distributor contact 1 is connected to lead 5–7–DST by way of lead DL–1, the break contacts of transfer contacts 5–3–TR–4, break contacts 5–4–SWA–5, break contacts 5–4–RSA–1, the break contacts of continuity contacts 5–4–RS–1, break contacts 5–4–BL–2 and the break contacts of continuity contacts 5–3–TR–5. Contact 2 of distributor 511 is connected to lead 5–6–DST by way of lead DL–2, the break contacts of transfer contacts 5–3–TR–6, break contacts 5–4–RS–2, break contacts 5–4 RS–3, break contacts 5–7–EC–1, and, in common with contact 1, via contacts 5–4–SWA–5, 5–4–RSA–1, 5–4–RS–1, 5–4–BL–2 and 5–3–TR–5. Contact 3 is connected to lead 5–6–DST by way of lead DL–3, the break contacts of transfer contacts 5–3–TR–7, make contacts 5–4–LTRS–2, contacts 5–4–RS–1, 5–4–BL–2 and 5–3–TR–5. Contact 4 is connected to lead 5–6–DST by way of lead DL–4, the break contacts of transfer contacts 5–3–TR–8 and, in common with contact 2, via contacts 5–4–RS–3, 5–7–EC–1, 5–4–SWA–5, 5–4–RSA–1, 5–4–RS–1, 5–4–BL–2, and 5–3–TR–5. Contact 5 is connected to lead 5–6–DST by way of lead DL–5, the break contacts of transfer contacts 5–3–TR–9, break contacts 5–7–EC–2 and contacts 5–4–RS–1, 5–4–BL–2 and 5–3–TR–5.

It is to be noted that, with relay 4–LTRS operated, distributor contact 3 is connected to lead 5–6–DST and distributor 511 is coded for the character Letters whereas if relay 4–LTRS is released, distributor 511 would be coded for the character Figures. Recalling that the operating path for relay 4–LTRS is completed via arc 3 of selector 403 and relay 4–LTRS operates in accordance with the strapping of arc 3, the transmission of this character functions to complete the emergency stop code, Blank followed by a pause of two character lengths and either Figures or Letters and constitutes the first character of the transmitter-start code sequence, the remainder of which is transmitted subsequently. The outgoing loop will now be maintained in the idle marking condition to allow the outlying station transmitters to stop and distributor 511 will be switched to the incoming line sequential selector 603 in order to place selector 603 in the select condition.

When the fifth intelligence pulse of the Letters character is transmitted, relay 2–DA releases opening the locking path for relay 4–LTRS via the make contacts of contacts 5–2–DA–4 and relay 4–LTRS releases. Relay 2–DA released also completes a path from ground via the break contacts of transfer contacts 4–2–DA–6, break contacts 4–5–ES–10, make contacts 4–5–EML–5, the break contacts of transfer contacts 4–7–ILA–1 and the winding of switch relay 4–SW to battery operating switch relay 4–SW.

Relay 4–SW operated completes a path shunting the sending loop by connecting lead 7–5–SLL to lead 5–7–SLL by way of contacts 5–4–SM1–1 and 5–4–SM2–1 and the make contacts of continuity contacts 5–4–SW–2. In addition relay 4–SW operated disconnects lead 7–5–SLL from lead 5–6–DST by way of break contacts 5–4–SW1–1 and disconnects lead 5–7–SLL from 6–5–DCL by way of break contacts of continuity contacts 5–4–SW–2 thereby disconnected the distributor from the outgoing loop.

Relay 4–SW operated also completes a path from ground by way of contacts 4–2–DA–6 and 4–5–ES–10, make contact 4–5–EML–6, make contacts 4–SW–3 and the winding of switch auxiliary relay 4–SWA to battery operating relay 4–SWA. Relay 4–SWA operated transfers the ground from the armature of relay 6–LR via the break contacts of continuity contacts 6–4–SWA–1 to lead 6–5–DCL by way of the make contacts of contacts 6–4–SWA–1 and connects selector magnet 601 of sequential selector 603 to lead 5–6–DST by way of make contacts 6–4–SWA–2 whereby ground is applied to selector magnet 601 by way of the make contacts of continuity 6–4–SWA–1, lead 6–5–DCL the stop contacts of distributor 511 lead 5–6–DST and make contacts 6–4–SWA–2 thus connecting the output of distributor 511 to select magnet 601.

Relay 4–SWA operated completes a self-holding path via contacts 4–SWA–3, 4–7–ILA–1, 4–5–EML–5, 4–5–EML–6 and 4–SW–3, completes a holding path for relay 4–SW via contacts 4–SWA–3 and completes an energizing path from ground by way of the make contacts of transfer contacts 4–6–FC–7, make contacts 4–SWA–4, break contacts 4–5–RC–2, break contacts 4–5–DS–2, lead 4–5–DCML, the break contacts of transfer contacts 5–3–TR–2 and the winding of clutch magnet 512 to battery thereby releasing distributor 511 for rotation. Distributor 511 now generates the end-of-message code sequence Figures-H-Letters to place sequential selector 603 in the select condition.

When the start pulse of the first character of the end-of-message sequence is generated, relay 2–DA operates as previously described completing a path from ground via make contacts 5–6–FC–8, make contacts 5–4–SW–4, the make contacts of transfer contacts 5–2–DA–3, break contacts 5–CH2–1, break contacts 5–CH3–2, and the winding of relay 5–CH1 to battery operating relay 5–CH1 which as previously described locks by way of contacts 5–CH1–1 and 5–CH2–2.

The distributor is now coded with the character Figures with contacts 1, 2, 4 and 5 of distributor 511 connected to lead 5–6–DST in the same manner as previously described for the generation of the Letters character in the emergency stop code sequence with the exception that the paths connecting contacts 1, 2 and 4 with lead 5–6–DST are completed by way of break contacts 5–CH2–7 which shunts contacts 5–4–SWA–5 and 5–4–RSA–1.

During the generation of the fifth intelligence pulse of the Figures character relay 2–DA releases completing the previously-described holding path for relay 5–CH1 via contacts 5–CH1–1 and 5–2–DA–4. Relay 2–DA released also completes a path from ground via contacts 5–6–FC–8, 5–4–SW–4, the break contacts of transfer contacts 5–2–DA–3, the make contacts of transfer contacts 5–CH1–2, break contacts 5–CH3–3 and the winding of relay 5–CH2 to battery operating relay 5–CH2 which as previously described locks via contacts 5–CH2–3 and 5–CH3–4. Relay 5–CH2 operated opens the previously-described locking path for relay 5–CH1 via contacts 5–CH2–2.

During the start pulse of the second revolution relay 2–DA operates opening the previously-described holding path for relay 5–CH1 via contacts 5–2–DA–4 and relay 5–CH1 releases. Distributor 511 is now coded with the character H insofar as contacts 3 and 5 are connected to lead 5–6–DST. The paths between contacts 3 and 5 and lead 5–6–DST are the same as previously described for the generation of the Letters character in the emergency stop code sequence with the exception that contact 3 is connected to lead 5–6–DST via break contacts 5–CH1–3 and make contacts 5–4–SW–5 which shunts contacts 5–4–LTRS–2.

During the generation of the fifth intelligence pulse of the H character, relay 2–DA releases closing the previously-described holding path for relay 5–CH2 via contacts 5–2–DA–5 and completing a path from ground via contacts 5–6–FC–8, 5–4–SW–4, 5–2–DA–3, 5–CH1–2, 5–CH2–5 and the winding of relay 5–CH3 to battery operating relay 5–CH3 which as previously described locks via contacts 5–CH3–5 and 5–CH2–2. Relay 5–CH3 operated recloses the previously-described locking path for relay 5–EML via contacts 5–CH3–9.

During the generation of the start pulse during the third revolution of distributor 511 relay 2–DA operates completing the previously-described holding path for relay 5–CH3 via contacts 5–2–DA–5 and opening the previously-described holding path for relay 5–CH2 via contacts 5–2–DA–5 releasing relay 5–CH2. Relay 5–CH2 released opens the previously-described locking path for relay 5–CH3 via contacts 5–CH–2 and completes a path from ground via contacts 5–CH3–8 and 5–CH2–6, lead 4–5–CSRL, make contacts 5–4–SW–6 and the winding of the remainder of code relay 5–RC to battery operating relay 5–RC which locks by way of break contacts 5–SC–3 or, in shunt thereto, make contacts 5–CH3–10, make contacts of transfer contacts 5–RC–1, make contacts of transfer contacts 5–6–ST–1 and make contacts 5–6–FC–2. Relay 5–RC operated opens the previously-described locking path for relay 5–EML via contacts 5–RC–1 and opens the previously-described energizing path for clutch magnet 512 via contacts 4–5–RC–2 whereby the distributor will stop at the end of this rotation.

The distributor at this time is coded for the character Letters with contacts 1 through 5 of distributor 511 connected to lead 5–6–DST in substantially the same manner as previously described for the generation of the Letters character in the emergency stop code sequence with the exception that the path connecting contacts 1, 2 and 4 to lead 5–6–DST is completed by way of make contacts 5–CH3–11 which shunts contacts 5–4–SWA–5, 5–4–RSA–1 and 5–4–RS–1 and the path from contact 3 to lead 5–6–DST is completed by way of contacts 5–CH1–3 and 5–4–SF–5 which shunt contacts 5–4–LTRS–2.

On the fifth intelligence pulse of the Letters character, relay 2–DA releases opening the previously-described holding path for relay 5–CH3 via contacts 5–2–DA–5 and relay 5–CH3 releases. Relay 5–CH3 released opens the previously-described holding path for relay 5–EML via contacts 5–CH3–9 and relay 5–EML releases. Relay 5–EML released opens the previously-described operating and holding path of relay 4–SWA via contacts 4–5–EML–6 and relay 4–SWA releases.

Relay 4–SWA released opens the previously-described path from select magnet 601 of sequential selector 603 to lead 5–6–DST via contacts 6–4–SWA–2 and transfers ground from lead 6–5–DCL via the make contacts of continuity contacts 6–4–SWA–1 back to the armature of relay 6–LR via the break contacts of contacts 6–4–SWA–1, thus disconnecting distributor 511 from sequential selector 603 and reconnecting line relay 6–LR to select magnet 601. In addition, relay 4–SWA released opens the previously-described holding path for relay 4–SW via contacts 4–SWA–3 releasing relay 4–SW.

Relay 4–SW released removes the previously-described shunt across the sending loop via the make contacts of continuity contacts 5–4–SW–2, recompletes the path from lead 6–5–DCL to sending loop lead 5–7–SLL via the break contacts of contacts 5–4–SW–2 and recompletes the path from lead 7–5–SLL to lead 5–6–DST via contacts 5–4–SM1–1, 5–4–SM2–1 and 5–4–SW–1, thus reconnecting distributor 511 to the sending loop.

The reception of the code sequence Figures-H-Letters by sequential selector 603 places sequential selector 603 in the select position and momentarily closes contacts 609 completing a path from ground by way of contacts 609, the make contacts of continuity contacts 6–FC–9, make contacts 6–5–RC–3 and the winding of Figures H relay 6–FH to battery operating relay 6–FH which locks via make contacts 6–FH–2, break contacts 6–7–SB–4, break contacts 6–7–ILA–2 and normally closed contacts 611 of sequential selector 603. Relay 6–FH will remain operated for the duration of the polling cycle.

Relay 6–FH operated opens the previously-described operating path for relay 6–FC via contacts 6–FH–1, completes a path via contacts 6–FH–5 shunting contacts 6–7–SB–3 in the previously described locking path for relay 6–ST and completes a path from ground by way of the make contacts of transfer contacts 4–6–FC–7, make contacts 4–6–FH–3, the break contacts of transfer contacts 4–5–SC–4, break contacts of 4–5–DS–2, lead 4–5–DCML, the break contacts of transfer contacts 5–3–TR–2 and the winding of clutch magnet 512 to battery releasing distributor 511 which will now send the remaining three characters of the transmitter start code sequence Letters-Figures-Letters-Figures, in accordance with the strappings of position 8 of selector 403 recalling that the first Letters character was previously transmitted as the last character of the emergency stop code sequence.

During the start pulse of the first revolution of distributor 511, relay 2–DA operates as previously described completing a path from ground via make contacts 5–6–FC–8, make contacts 5–6–FH–4, the make contacts of transfer contacts 5–2–DA–3, break contacts 5–CH2–1, break contacts 5–CH3–2 and the winding of relay 5–CH1 to battery operating relay 5–CH1 which as previously described locks via contacts 5–CH1–1 and 5–CH2–2. Relay 5–CH1 operated applied ground to the wiper of arc 4 of selector 403 via break contacts 4–5–CH3–1, make contacts 4–5–RC–4, the break contacts of transfer contacts 4–5–CH2–8 and make contacts 4–5–CH1–4. Ground is not placed on lead LTCL with the consequent operation of relay 4–LTRS, however, since position 8 of arc 4 is not strapped to lead LTCL whereby relay 4–LTRS remains released.

With relay 4–LTRS released, distributor 511 is coded with the character Figures since paths from contacts 1, 2, 4 and 5 of distributor 511 are extended to lead 5–6–DST in the same manner as previously described for the Letters character in the emergency stop code sequence and the previously-described path via contacts 5–4–LTRS–2 extending from contact 3 of distributor 511 to lead 5-6-DST for the Letters character of the emergency stop code sequence is now opened with relay 4-LTRS released.

During the generation of the fifth intelligence pulse of the Figures character relay 2-DA releases completing the previously-described holding path for relay 5-CH1 via contacts 5-CH1-1 and 5-2-DA-4 and completing a path from ground via contacts 5-6-FC-8, 5-6-FH-4, 5-2-DA-3, 5-CH1-2 and 5-CH3-3 and the winding of relay 5-CH2 to battery operating relay 5-CH2 which locks, as previously described, via contacts 5-CH2-3 and 5-CH3-4. Relay 5-CH2 operated opens the previously-described locking path for relay 5-CH1 via contacts 5-CH2-2 and transfers the ground applied to the wiper of arc 4 via the break contacts of transfer contacts 4-5-CH2-8 to the wiper of arc 5 via the make contacts of transfer contacts 4-5-CH2-8. Since position 8 of arc 5 is strapped to lead LTCL ground is thus applied to lead LTCL operating relay 4-LTRS in the same manner as previously described.

On the start of the second revolution of distributor 511 relay 2-DA operates opening the previously-described holding path for relay 5-CH1 via contacts 5-2-DA-4 and relay 5-CH1 releases. At this time distributor 511 is coded with the character Letters insofar as contacts 1 through 5 of distributor 511 are connected to lead 5-6-DST by way of the same paths previously described for the generation of the Letters character in the emergency stop code sequence.

During the fifth intelligence pulse of the Letters character relay 2-DA releases closing the previously-described locking path for relay 5-CH2 via contacts 5-2-DA-5 and completing a path from ground via contacts 5-6-FC-8, 5-6-FH-4, 5-2-DA-3, 5-CH1-2 and 5-CH2-5 and the winding of relay 5-CH3 to battery operating relay 5-CH3 which, as previously described, locks via contacts 5-CH3-5 and 5-CH2-2. Relay 5-CH3 operated opens the previously-described locking path for relay 5-CH2 via contacts 5-CH3-4 and removes ground applied to the wiper of arc 5 via contacts 4-5-CH3-1 releasing relay 4-LTRS. In addition, relay 5-CH3 operated applies ground to the wiper of arc 6 via the make contacts of transfer contacts 4-5-CH3-12, make contacts 4-5-RC-5 and last character letters lead 5-4-LCHL. However, insofar as position 8 of arc 6 is not strapped to lead LTCL, relay 4-LTRS does not operate. Relay 5-CH3 operated also completes a path via make contacts 6-5-CH3-13 which shunts contacts 6-5-SC-1 in the previously-described locking path for relay 6-FC and recloses the previously-described locking path for relay 5-RC via contacts 5-CH3-10.

When the start pulse is generated during the third revolution of distributor 511 relay 2-DA operates closing the previously-described holding path for relay 5-CH3 via contacts 5-2-DA-5 and opening the previously-described holding path for relay 5-CH2 via contacts 5-2-DA-5 releasing relay 5-CH2 which in turn opens the previously-described locking path for relay 5-CH3 via contacts 5-CH2-2 and completes a path from ground via contacts 5-CH3-8 and 5-CH2-6, lead 4-5-CSRL, make contacts 5-6-FH-6 and the winding of subsequent code relay 5-SC to battery operating relay 5-SC which locks by way of make contacts 5-SC-5, break contacts 5-4-OR-1 and make contacts 5-6-FH-7. The operation of relay 5-SC indicates to the circuit that the subsequent transmitter start code sequence will consist of only the last character in the transmitter start code sequence.

Relay 5-SC operated opens one of the previously-described locking paths for relay 6-FC via contacts 6-5-SC-1, opens one of the previously-described paths via contacts 6-5-SC-2 applying negative battery to the control electrode of tube 627, opens one of the previously-described locking paths for relay 5-RC via contacts 5-SC-3 and closes a path via contacts 6-5-SC-6 around contacts 607 or 6-FC-6 in the previously-described locking path for relay 6-ST. In addition, relay 5-SC operated opens the previously-described energizing path for clutch magnet 512 by way of contacts 4-5-SC-4 whereby distributor 511 will stop rotating at the end of the third revolution.

At this time, with relay 4-LTRS released distributor 511 is coded for the character Figures insofar as contacts 1, 2, 4 and 5 of distributor 511 are connected to lead 5-6-DST by way of paths previously-described for the generation of the Letters character in the emergency stop code sequence and the path connecting contact 3 of distributor 511 to lead 5-6-DST is open at make contacts 5-4-LTRS-2.

During the fifth intelligence pulse of the Figures character, relay 2-DA releases opening the previously-described path via contacts 6-2-DA-2 applying negative battery to the control electrode of tube 627 and condenser 625 starts charging via the parallel paths of resistance 623 and resistance 633 in series with make contacts 6-ST-5. In addition, relay 2-DA released closes a path via break contacts 5-2-DA-7 which shunts contacts 5-4-OR-1 in the previously-described locking path for relay 5-SC and opens the previously-described holding path for relay 5-CH3 via contacts 5-2-DA-5 whereupon relay 5-CH3 releases.

Relay 5-CH3 released opens the previously-described locking path for relay 6-FC via contacts 6-5-CH3-13 and relay 6-FC releases and relay 5-CH3 released also opens the previously-described locking path for relay 5-RC via contacts 5-CH3-10 and relay 5-RC releases.

The first transmitter start code sequence in accordance with the strapping of position 8 of selector 403 has now been transmitted and unless outlying station 8 is on skip, that is skip key 409 is operated, the central station pauses and no further action is taken until a response is received from the polled outlying station. If a V character is received from the polled outlying station indicating that there is no priority message material ready for transmission, the next outlying station is polled. If an O character is received from the polled outlying station indicating message material is available for transmission, the outlying station transmitter is started. If no response is received within a predetermined time, an alarm is sounded at the central station and the emergency stop code sequence is sent to initiate a new polling cycle. If the outlying station is on skip, the next outlying station is polled as though a V character had been received. The central station does not wait for a response from a outlying station, however, but immediately proceeds to poll the next station. As described hereinafter, where a pause does not follow the transmission of the transmitter start code sequence, the outlying station recognizes that it is on skip and does not respond.

The central station operator may place the outlying station on skip by operating skip key 409. Assuming key 409 is operated, the previously-described release of relay 6-FC and operation of relay 5-SC completes a path from ground via the wiper and position 8 of arc 1 of selector 403, the normally open contacts of key 409, break contacts 4-7-SB-5, break contacts 4-7-ECA-1, break contacts 4-6-FC-10, break contacts 4-5-CH4-1, V character response lead 6-4-VCHR, make contacts 4-5-SC-7 and the winding of V response relay 4-VR to battery operating relay 4-VR. If the outlying station is not on skip but the outlying station does not have priority message material, the reception of the character V from the polled station momentarily closes contacts 615 of sequential selector 603 completing a path from ground via contacts 615, lead 6-4-VCHR, contacts 4-5-SC-7 and the winding of relay 4-VR to battery. Thus, relay 4-VR is operated for either a station on skip or a no traffic response.

Relay 4-VR operated locks via make contacts 4-VR-1 and the break contacts of transfer contacts 4-2-DA-8 and completes a path via make contacts 6–4–VR–4 to discharge condenser 625 and reapply negative battery to the control electrode of tube 627. Relay 4–VR operated also completes a path from ground via make contacts 5–SC–8, make contacts 5–4–VR–3, break contacts 5–4–ER–2 and the winding of character 4 relay 5–CH4 to battery operating relay 5–CH4. Relay 5–CH4 operated places ground on the wiper of arc 6 of selector 403 via make contacts 5–SC–8, make contacts 5–CH4–2 and lead 5–4–LCHL. Relay 5–CH4 operated also opens the operating path of relay 4–VR via contacts 4–5–CH4–1.

In addition, relay 4–VR operated completes a path from ground via make contacts 4–VR–2, break contacts 4–ER–1, break contacts 4–RL–1 and the winding of step magnet 401 to negative battery energizing step magnet 401 which as previously described opens the shunt path via interrupter contacts 405 around relay 4–RL and since an operating path has been completed from ground via contacts 4–VR–2 and 4–ER–1, the winding of relay 4–RL and resistance 407 to battery, relay 4–RL operates opening the previously-described energizing path of step magnet 401 via contacts 4–RL–1 de-energizing step magnet 401 and thus stepping the wipers of selector 403 to the next position. In addition, relay 4–RL operated further opens its shunt path via contacts 4–RL–2. The de-energization of step magnet 401 completes a path from ground via the break contacts of transfer contacts 4–6–FC–7, make contacts 4–RL–3, interrupter contacts 413, off-normal contacts 415, the make contacts of transfer contacts 4–5–SC–4, break contacts 4–5–DS–2, lead 4–5–DCML, the break contacts of transfer contacts 5–3–TR–2 and the winding of clutch magnet 512 to battery releasing distributor 511 for rotation.

Assuming at this time that selector 403 had stepped to position 11, off-normal contacts 415 open and the energizing path for clutch magnet 512 is not completed. However, as previously described, shunting ground is placed on the winding of relay 4–RL via the wiper and arc 1 of selector 403 and interrupter contacts 405 and relay 4–RL releases whereupon step magnet 401 is re-energized, relay 4–RL reoperates and step magnet 401 is de-energized stepping the wipers of selector 403 to position 1 thus closing off-normal contacts 415 and completing the previously-described energizing path for clutch magnet 512.

It is recalled that relay 5–CH4 operated places ground on the wiper of arc 6. Assuming that the wipers of selector 403 step to position 9, since position 9 of arc 6 is not strapped to lead LTCL, relay 4–LTRS is not operated. It is evident however that if the selector steps to position 5, for example, ground would be placed on lead LTCL and relay 4–LTRS would operate.

During the generation of the start pulse during the rotation of distributor 511, relay 2–DA operates as previously described completing a holding path for relay 5–CH4 via make contacts 5–CH4–3, make contacts 5–2–DA–9 and contacts 5–SC–8 and opening the previously-described locking path for relay 4–VR via contacts 4–2–DA–8 releasing relay 4–VR. Relay 4–VR released opens the operating path for relay 4–RL via contacts 4–VR–2 and relay 4–RL releases opening the previously-described energizing path for clutch magnet 512 via contacts 4–RL–3 and distributor 511 will stop rotating at the end of the character now being generated.

With relay 4–LTRS released, distributor 511 is coded with the character Figures insofar as contacts 1, 2, 4 and 5 of distributor 511 are connected to lead 5–6–DST via the same paths previously described for the generation of the Letters character in the emergency stop code sequence and the path connecting contact 3 of distributor 511 to lead 5–6–DST is opened at make contacts 5–4–LTRS–2. Since the three previous characters transmitted were the last three characters, Figures-Letters-Figures, of the previous transmitter start code sequence, the last four characters transmitted with the additional transmission of the Figures character are Figures-Letters-Figures-Figures. It is to be noted that this code sequence is the transmitter start code sequence for outlying station 9 insofar as arc 4 of position 9 is strapped to lead LTCL. Thus, the transmission of the Figures character only, in combination with the transmission of the last three characters of the preceding start code sequence polls outlying station 9 for message material.

Relay 2–DA releases at the end of the Figures character opening the holding path for relay 5–CH4 via contacts 5–2–DA–9 releasing relay 5–CH4 which in turn removes the ground applied to the wiper of arc 6 of selector 403 via contacts 5–CH4–2.

The circuit is now in the same condition as it was following the end of the transmission of the first transmitter start code sequence with the exception that the wipers of selector 403 are now on position 9. The central station now pauses and no further action is taken until the response from the polled outlying station is received in the same manner as previously described.

If after sending the transmitter start code sequence no response is received from the polled outlying station within two seconds an alarm is sounded and the central station reinitiates the polling cycle by automatically sending the emergency stop code sequence to the sending loop, the end-of-message code sequence to the incoming line sequential selector and the transmitter start code sequence of the next successive outlying station to the sending loop.

As previously described when relay 2–DA releases during the fifth intelligence pulse of the last character of the transmitter start code sequence, the discharge path of condenser 625 is open and condenser 625 begins to charge through resistance 623 and resistance 633. If no response is received within approximately two seconds, condenser 625 charges sufficiently to raise the voltage of control electrode of tube 627 where tube 627 will fire operating relay 6–P1 in the same manner as previously described. Relay 6–P1 operated locks via the previously described path by way of contacts 6–P1–1 and extenguishes tube 627. In addition relay 6–P1 operated completes a path from ground via make contacts 7–6–P1–3, the break contacts of transfer contacts 7–4–ER–3, break contacts 7–6–FC–11 and the winding of the incoming line alarm relay 7–ILA to battery operating relay 7–ILA which locks via make contacts 7–ILA–3 and break contacts 7–4–SWA–6.

Relay 7–ILA operated also completes an energizing path from ground via the normally closed contacts of alarm locking key 725, buzzer 723 and make contacts 7–ILA–5 to A.-C. source 727 thereby raising an audible alarm and completes a path from ground via make contacts 7–ILA–4, the make contacts of transfer contacts 7–6–ST–6 and the no response lamp 721 to battery thus energizing lamp 721.

In addition, relay 7–ILA operated opens the previously-described locking path for relay 6–FH via contacts 6–7–ILA–2 releasing relay 6–FH which in turn opens the previously-described locking path for relay 5–SC via contacts 5–6–FH–7 releasing relay 5–SC. The release of relay 6–FH completes a path from ground via make contacts 6–7–ILA–6, break contacts 6–FH–1 and the winding of relay 6–FC to battery operating relay 6–FC. The operation of relay 6–FC completes a path from ground via make contacts 5–6–FC–2, the make contacts of transfer contacts 5–6–ST–1, break contacts 5–EML–1, make contacts 5–7–ILA–7 and the winding of relay 5–ES to battery operating relay 5–ES.

The operation of relay 5–ES now initiates the transmission of the emergency stop code sequence in the same manner as previously described wherein relay 5–ES operated steps the wipers of selector 403, in this case to position 9, energizes clutch magnet 512 to release distributor 511 since relay 5–DS is not operated, places ground on the wiper of arc 3 of selector 403 and operates relay 4-BL which, in turn, codes distributor 511 with the character Blank and releases relay 6-P1. Since position 9 of arc 3 is not strapped to lead LTCL, relay 4-LTRS does not operate. Distributor 511 now sends emergency stop code sequence Blank followed by a pause of two character lengths and the character Figures, insofar as relay 4-LTRS has not been operated, to the sending loop and relays 5-CH1, 5-CH2 and 5-CH3 successively operate in the same manner as previously described. As previously described, the operation of relay 5-CH3 releases relay 4-BL and the release of relay 5-CH2 operates relay 5-EML which, in turn, opens the operating path of relay 5-ES via contacts 5-EML-1. During the transmission of the Figures character in the emergency stop code sequence, relay 5-ES releases completing a path from ground via the break contacts of transfer contacts 4-2-DA-6, break contacts 4-5-ES-10, make contacts 4-5-EML-5, the make contacts of transfer contacts 4-7-ILA-1, the normally closed contacts of the alarm stop locking key 417 and the winding of relay 4-SW to battery. If at this time key 417 had been operated, the circuit would stop at this point and the operator would have to take corrective action and release key 417 before the circuit could process.

Assuming key 417 is released, the resultant operation of relay 4-SW operates relay 4-SWA and initiates the transmission of the end-of-message code sequence to the incoming line sequential selector 603 in the same manner as previously described. Relay 4-SWA operated opens the previously-described locking path for relay 7-ILA via contacts 7-4-SWA-6 releasing relay 7-ILA which in turn opens the previously-described energizing paths for lamp 721 and buzzer 723. The central station now proceeds to send the end-to-message code sequence to sequential selector 603 and then send the transmitter start code sequence to the sending loop in the same manner as previously described with the exception that the wipers of selector 403 are on position 9 whereby the last three characters of the transmitter start code sequence comprise Letters-Figures-Figures. After transmitting the transmitter start sequence the central station circuit is in the same condition as it was at the end of the transmission of the previous transmitter start code sequence.

*The central station starts the outlying station transmitter*

If the polled outlying station has a priority message the central station will receive the traffic available response character O after sending the transmitter start code sequence. The central station will then send a blank-shift code sequence comprising the characters Blank followed by Figures or Letters to start the outlying station transmitter and will then wait to receive traffic from the outlying station before taking further action.

When the character O is received by the central station, contacts 613 of the incoming line sequential selector 603 close completing a path from ground via contacts 613, the O character response lead 6-4-OCHR, make contacts 4-5-SC-9 and the winding of the O response relay 4-OR to battery operating relay 4-OR which locks via make contacts 4-OR-2 and make contacts 4-5-SC-10. Relay 4-OR operated opens the previously-described locking path for relay 5-SC via contacts 5-4-OR-1 and completes a discharge path for condenser 625 via make contacts 6-4-OR-3. Relay 4-OR operated also completes a path from ground via break contacts 4-7-ILA-8, break contacts 4-5-SS-2, make contacts 4-OR-4 and the winding of relay 4-BL to battery operating relay 4-BL.

As previously described relay 4-BL operated opens the paths via contacts 5-4-BL-2 connecting contacts 1 through 5 of distributor 511 to lead 5-6-DST and thus coding distributor 511 with the character Blank. In addition relay 4-BL operated completes a path via contacts 5-4-BL-3 shunting contacts 5-2-DA-7 in the previously-described locking path for relay 5-SC and completes a path from ground via the break contacts of transfer contacts 4-6-FC-7, make contacts 4-BL-4, the make contacts of transfer contacts 4-5-SC-4, break contacts 4-5-DS-2, lead 4-5-DCML, the break contacts of transfer contacts 5-3-TR-2 and the winding of clutch magnet 512 to battery releasing distributor 511 for rotation.

Relay 2-DA operates during the start pulse of the first rotation of distributor 511, as previously described, and while operated completes a path via the make contacts of transfer contacts 4-2-DA-8 shunting contacts 4-5-SC-10 in the previously-described locking path for relay 4-OR and completes a holding path for relay 4-BL via make contacts 4-BL-5 and the make contacts of transfer contacts 4-2-DA-6 shunting contacts 4-7-ILA-8 and 4-5-SS-2 in the previously-described operating path for relay 4-BL.

In addition relay 2-DA operated completes a path from ground via the make contacts of transfer contacts 5-2-DA-4, make contacts 5-4-OR-5 and the winding of the station start relay 5-SS to battery operating relay 5-SS which locks via break contacts 5-ES-11, make contacts 5-SS-3 and break contacts 5-7-ILA-9. Relay 5-SS operated completes a path via contacts 4-5-SS-4 shunting contacts 4-BL-4 in the previously-described energizing path for clutch magnet 512. In addition relay 5-SS operated opens the previously-described operating path for relay 4-BL via contacts 4-5-SS-2 and opens the previously-described discharge path for condenser 625 via contacts 6-5-SS-1. Assuming that at this time relay 7-LS is operated in a manner subsequently described the operation of relay 5-SS also completes a path from ground via break contacts 4-RSA-2, break contacts 4-RS-4, make contacts 4-5-SS-5, make contacts 4-7-LS-1, lead LTCL and the winding of relay 4-LTRS to battery.

Distributor 511 at this time sends the character Blank to the sending loop since relay 4-BL is operated. During the fifth intelligence pulse of the Blank character relay 2-DA releases completing a path via contacts 5-2-DA-7 shunting contacts 5-4-BL-3 in the previously-described locking path for relay 5-SC and opens the previously-described holding path for relay 4-BL via contacts 4-2-DA-6 releasing relay 4-BL which in turn opens the previously-described locking path for relay 5-SC via contacts 5-4-BL-3.

During the start pulse of the next revolution of distributor 511, relay 2-DA operates opening the previously-described locking path for relay 5-SC via contacts 5-2-DA-7 releasing relay 5-SC which in turn opens the previously-described locking path for relay 4-OR via contacts 4-5-SC-10 and opens the previously-described energizing path for clutch magnet 512 via contacts 4-5-SC-4 and distributor 511 will stop at the end of this rotation.

Distributor 511 will send either the character Figures or the character Letters to the sending loop depending on whether relay 4-LTRS is operated. If relay 4-LTRS is operated contacts 1 through 5 of distributor 511 are connected to lead 5-6-DST by the same paths previously described for the generation of the Letters character in the emergency stop code sequence. If relay 4-LTRS is released, the path connecting contact 3 of distributor 511 to lead 5-6-DST is open at contacts 5-4-LTRS-2 and distributor 511 will send the character Figures to the sending loop.

On the fifth intelligence pulse relay 2-DA releases opening the previously-described discharge path for condenser 625 via contacts 6-2-DA-2. In addition, relay 2-DA released opens the previously-described locking path for relay 4-OR via contacts 4-2-DA-8 releasing relay 4-OR which in turn opens the previously-described discharge path for condenser 625 via contacts 6-4-OR-3 and as previously described condenser 625 will start to charge by way of resistance 633 and resistance 623. In addition, the release of relay 4-OR opens the previously-described operating path for relay 5-SS via contacts 5-4-OR-5.

The transmission of the blank-shift code sequence starts the outlying station transmitter and the central station now awaits incoming traffic from the outlying station. If no traffic is received from the outlying station transmitter that was started, the central station raises an alrm and automatically starts a new polling cycle.

As previously described, the release of relay 2-DA at the end of the Letters or Figures character in the blank-shift code sequence causes condenser 625 to charge through parallel resistances 623 and 633. If no traffic is received in about two seconds, condenser 625 charges sufficiently to raise the voltage of the control electrode of tube 627 where tube 627 will fire operating relay 6-P1. Relay 6-P1 operated locks via contacts 6-P1-1, extinguishes tube 627, and operates relay 7-ILA in the same manner as previously described. Relay 7-ILA operated locks via contacts 7-ILA-3, releases relay 6-FH and energizes buzzer 723 and lamp 721 in the same manner as previously described and opens the locking path for relay 5-SS via contacts 5-7-ILA-9 and relay 5-SS releases. The release of relay 5-SS opens the operating path via contacts 4-5-SS-5 of relay 4-LTRS and relay 4-LTRS releases if it had been previously operated. With relay 6-FH released and relay 7-ILA operated, relay 6-FC operates and relay 5-ES operates in turn in the same manner as previously described and the central station sends the emergency stop code sequence to the sending loop, places the incoming line sequential selector 603 in the select condition and sends the next successive transmitter start code sequence to the sending loop.

If traffic is received from the outlying station transmitter that was started, the central office unblinds the printer-perforator, prepares the central office outgoing transmitter-distributor for transmission and then retires until the incoming message ends or the incoming transmission is interrupted. The format of the incoming message should include first a cut-on code sequence, characters C and D, for example, to cut on the central station printer-preforator, an end-of-address code sequence, Carriage-Return-Line-Feed, the message text and the end-of-message code sequence, Figures-H-Letters.

The first character of the incoming message causes the armature of relay 6-LR to be operated to the spacing contact momentarily releasing relay 6-L1 which in turn momentarily completes the previously-described discharge path via contacts 6-L1-1 for condenser 625. When the cut-on code sequence C-D is received, contacts 608 of sequential selector 603 close and contacts 607 open. The closure of contact 608 completes the previously-described path from the spacing contact of relay 6-LR to the selector magnet of printer-perforator 629 and printer-perforator 629 records all the subsequent incoming message material. The opening of contact 607 opens the previously-described locking path for relay 6-ST and relay 6-ST releases.

Relay 6-ST released completes the previously-described path from lead 6-5-DCL to lead 5-6-DST by way of contacts 6-ST-7 thus removing distributor 511 from the sending loop. In addition, relay 6-ST released prepares the energizing path via contacts 2-6-ST-3 for start magnet 201 of the No. 1 transmitter-distributor and start magnet 207 of the No. 2 transmitter-distributor.

When the end-of-address code sequence, Carriage Return-Line Feed, is received, sequential selector 603 is placed in the non-select condition and contacts 611 of sequential selector 603 momentarily open. This opens the locking path for relay 6-FH and relay 6-FH releases preparing the operating path of relay 6-FC via contacts 6-FH-1.

When the end-of-message code sequence, Figures-H-Letters, is received at the end of the message, sequential selector 603 is placed in the select condition, contacts 609 momentarily close, contacts 608 reopen opening the previously-described path from the spacing contact of relay 6-LR to the select magnet of printer-perforator 629 thus blinding printer-perforator 629 and contacts 607 reclose. The closure of contacts 609 completes a path from ground via contacts 609, the break contacts of continuity contacts 6-FC-9, break contacts 6-FH-1 and the winding of relay 6-FC to battery. The operation of relay 6-FC opens the discharge path of condenser 625 and tube 627 will fire in 240 milliseconds to initiate a new polling cycle in the same manner as previously described. When relay 5-ES subsequently operates during the new polling cycle, the locking path of relay 5-SS via contacts 5-ES-11 opens releasing relay 5-SS.

Since an outlying station may send multiple messages, incoming transmission may continue and relay 6-L1, operated by incoming marking signals, discharges condenser 625 to recycle the timing circuit. Printer-perforator is reconnected to the spacing contact of relay 6-LR by the cut-on code sequence, as previously described, and the end-of-address code sequence open contacts 611 thus opening the locking path of relay 6-FC. The release of relay 6-FC returns the central station circuit to the same condition it was in following the reception of the end-of-address code sequence of the prior message.

If the incoming line goes idle after the printer-perforator selection code is received, the central station will raise an alarm and initiate a new polling cycle.

When the incoming line goes idle marking, the armature of line relay 6-LR remains on the marking contact maintaining relay 6-L1 operated. Relay 6-L1 operated maintains the discharge path for condenser 625 via contacts 6-L1-1 open and condenser 625 charges through resistance 623. In approximately 20 seconds condenser 625 charges sufficiently to raise the voltage on the control electrode of tube 627 where tube 627 fires operating relay 6-P1 which locks via contacts 6-P1-1 and extinguishes tube 627 as previously described. Relay 6-P1 operated completes the previously-described operating path for relay 7-ILA which locks via contacts 7-ILA-3 as previously described. Relay 7-ILA operated opens the previously-described locking path for relay 6-FH via contacts 6-7-ILA-2 and relay 6-FH releases if it is operated at this time. In addition, relay 7-ILA operated opens the previously-described locking path for relay 5-SS via contacts 5-7-ILA-9 and relay 5-SS releases opening the previously-described operating path for relay 4-LTRS via contacts 4-5-SS-5 and relay 4-LTRS releases if it is operated at this time. Relay 7-ILA operated also completes the previously-described energizing path for buzzer 723 via contacts 7-ILA-5 and completes a path from ground via make contacts 7-ILA-4, the break contacts of transfer contacts 7-6-ST-6 and the winding of interrupted transmission relay 7-IT to battery operating relay 7-IT which locks via make contacts 7-IT-1 and break contacts 7-6-AR-1. Relay 7-IT operated completes an energizing path from ground via make contacts 7-IT-2 and interrupted transmission lamp 729 to battery energizing lamp 729.

With relay 7-ILA operated and relay 6-FH released, the previously-described operating path for relay 6-FC via contacts 6-7-ILA-6 and 6-FH-1 is completed operating relay 6-FC which in turn completes the previously-described operating path for relay 5-DS via contacts 5-6-FC-2 and the break contacts of transfer contacts 5-6-ST-1. Relay 5-DS operated completes a path via the make contacts of transfer contacts 6-7-ILA-10 and make contacts 6-5-DS-3 shunting the break contacts of transfer contacts 6-7-ILA-10 and make contacts 6-P1-2 in the previously-described operating path for relay 6-ST operating relay 6-ST. Relay 6-ST operated completes the previously-described energizing path for lamp 721.

With relay 6-ST operated the energizing paths for start magnets 201 and 207 via contacts 2-6-ST-3 are open stopping transmitter distributor No. 1 or transmitting distributor No. 2 if either one is sending and a new polling cycle is initiated in the same manner as previously described.

During the new polling cycle, relay 4–BL operates releasing relay 6–P1 and, assuming key 417 is released, relay 4–SWA operates releasing relay 7–ILA which in turn deenergizes lamp 721 and buzzer 723. Lamp 729 may be deenergized by the momentary operation of alarm release key 635 which completes a path from ground via the normally open contacts of key 635 and the winding of alarm release relay 6–AR to battery. Relay 6–AR operated opens the previously-described locking path for relay 7–IT via contacts 7–6–AR–1 releasing relay 7–IT which in turn opens the previously described energizing path for lamp 729 via contacts 7–IT–2.

If the incoming line goes open for two character lengths at any time, the double Blank contacts 605 in sequential selector 603 close completing a path from ground via contacts 605, open line lead 6–7–OLLD and the winding of open line relay 7–OL to battery operating relay 7–OL which locks via make contacts 7–OL–1 and break contacts 7–6–AR–1. Relay 7–OL operated completes an energizing path from ground via contacts 7–6–AR–1, contacts 7–OL–1 and open line lamp 731 to battery energizing lamp 731 and completes an energizing path from A.-C. source 727 to ground via make contacts 7–OL–2, buzzer 723 and the normally closed contacts of key 725. Lamp 731 and buzzer 723 remain energized until key 635 is momentarily operated completing the previously-described operating path for relay 6–AR operating relay 6–AR which in turn opens the previously-described locking path for relay 7–OL via contacts 7–6–AR–1 releasing relay 7–OL and thus opening the previously-described energizing paths for lamp 721 and buzzer 723. A new polling cycle is not automatically initiated at this time. If a new polling cycle is desired, it may be initiated in the same manner as previously described by operating start key 617.

*Central station standby condition*

If the central station sends a complete round of polling, both priority and regular, receiving a no-traffic response from each polled outlying station, it will stop polling and prepare to place all outlying stations in the standby condition. The central station circuit is arranged to initiate a count of polled stations the first time a transmitter start code sequence is sent to station 1, which occurs when the wipers of selector 403 are on position 1, and continue counting so long as the no-traffic response character V is received from each outlying station or the station is on skip until the second polling of station 10 after first polling of station 1. In an extreme case where station 2 is the first outlying station polled, 29 transmitter start code sequences would be sent to complete an unsuccessful round of polling. However, polling always starts from station 1 after the termination of the standby condition whereby the minimum of 20 transmitter start code sequences would be sent for a complete round of polling.

Recalling that relays 6–FH, 6–ST and 5–SC are operated while the central station pauses after sending the transmitter start code sequence and assuming the wipers of selector 403 are on position 1 whereby the transmitter start code sequence of station 1 has just been sent, if station 1 is on skip or if the no-traffic response character V is received from station 1, relay 4–VR operates as previously described and in turn operates relay 5–CH4. Relay 5–CH4 operated completes a path from ground via make contacts 4–5–CH4–4, break contacts 4–RL–4, the wiper and position 1 of arc 2 of selector 403 and the winding of start priority relay 4–SP to battery operating relay 4–SP which locks via make contacts 4–SP–1, break contacts 4–7–SB–6, break contacts 4–5–SS–2 and break contacts 4–7–ILA–8. In addition, relay 4–VR operated completes the previously-described energizing path for step magnet 401 resulting in the operation of relay 4–RL which in turn opens the previously-described operating path of relay 4–SP via contacts 4–RL–4 and de-energizes step magnet 401 thus stepping the wipers of selector 403 to position 2. At this time the last character Letters of the transmitter start code sequence of station 2 is sent in the same manner as previously described.

Assuming that no-traffic responses are received from stations 1 through 8 and with the wipers of selector 403 on position 8, the no-traffic response character V received from station 8 operates relay 4–VR operating relay 5–CH4 in turn, in the same manner as previously described. Relay 4–VR operated completes the previously-described energizing path for step magnet 401 whereupon relay 4–RL operates de-energizing step magnet 401 to step the wipers of selector 403 to the next position whereupon distributor 511 is released for rotation and the last character Figures of the transmitter start code sequence of station 9 is sent in the same manner as previously described. During the rotation of distributor 511, relay 2–DA operates releasing relay 4–VR which in turn releases relay 4–RL completing a path from ground via contacts 4–5–CH4–4 and 4–RL–4, the wiper and position 9 of arc 2 of selector 403, make contacts 4–SP–2 and the winding of end priority relay 4–EP to battery operating relay 4–EP which locks via make contacts 4–EP–1 and contacts 4–7–SB–6, 4–5–SS–2 and 4–7–ILA–8.

Assuming that the wipers of selector 403 are on position 1, the transmitter start code sequence for station 1 has been sent and all the previously polled stations have no traffic, the receipt of the no-traffic response character V from outlying station 1 operates relay 4–VR which in turn operates relay 5–CH4 in the same manner as previously described. Relay 4–VR operated energizes step magnet 401 which in turn operates relay 4–RL. Relay 4–RL operated de-energizes step magnet 401 stepping the wipers of selector 403 to the next position in this case position 2. The last character Letters of the transmitter start code sequence of station 2 is now sent in the same manner as previously described. During the transmission of the Letters character, relay 2–DA operates releasing relay 4–VR which in turn releases 4–RL completing a path from ground via contacts 4–5–CH4–4 and 4–RL–4, the wiper and position 2 of arc 2 of selector 403, make contacts 4–EP–2 and the winding of start regular relay 4–SR to battery operating relay 4–SR which locks via make contacts 4–SR–1 and contacts 4–7–SB–6, 4–5–SS–2 and 4–7–ILA–8.

If during the two rounds of polling the traffic-available response character O is received from a polled outlying station, relay 4–OR operates and the blank-shift code sequence is sent in the same manner as previously described. The resultant operation of relays 4–BL and 2–DA during the transmission of the blank-shift code sequence provides a path via contacts 4–BL–5 and 4–2–DA–6 shunting contacting 4–5–SS–2 and 4–7–ILA–8 in the previously-described locking path of the no-traffic chain relays 4–SP, 4–EP and 4–SR. The subsequent operation of relay 5–SS and release of relay 2–DA during the transmission of the blank-shift code sequence opens the locking paths of the no-traffic chain relays releasing any of the relays that are operated. If during the two rounds of polling a station fails to respond to a transmitter start code sequence, tube 627 fires and a new polling cycle is initiated in the same manner as previously described. The resultant operation of relay 7–ILA following the firing of tube 627 opens the previously-described locking paths via contacts 4–7–ILA–8 of the no traffic chain relays releasing any of the relays if they are operated. Thus, the initiation of a new polling cycle recycles the no-traffic chain relays.

Assuming that the wipers of selector 403 are on position 9, the transmitter start code sequence has been sent twice for all previous stations and all the previously polled stations have no traffic, the receipt of the no-traffic response character V from outlying station 9 operates relay 4-VR which in turn operates relay 5-CH4 in the same manner as previously described. Relay 4-VR operated energizes step magnet 401 which in turn operates relay 4-RL. Relay 4-RL operated deenergizes step magnet 401 stepping the wipers of selector 403 to the next position, in the case position 10. The last character Figures of the transmitter start code sequence of station 10 is now sent in the same manner as previously described. During the transmission of the Figures character, relay 2-DA operates releasing relay 4-VR which in turn releases relay 4-RL completing a path from ground via contacts 4-5-CH4-4 and 4-RL-4, the wiper and position 10 of arc 2 of selector 403, makes contacts 4-SR-2 and the winding of end regular relay 4-ER to battery operating relay 4-ER which locks via make contacts 4-ER-4 and contacts 4-7-SB-6, 4-5-SS-2 and 4-7-ILA-8. Relay 4-ER operated opens the energizing path for step magnet 401 and the operating path for relay 4-RL via contacts 4-ER-1, opens the operating path for relay 5-CH4 via contacts 5-4-ER-2 and opens the operating path for relay 7-ILA via contacts 7-4-ER-3.

If, when the transmitter start code sequence is sent to station 10 after two complete rounds of polling, the traffic-available response character O is received, relay 4-OR operates and the blank-shift code sequence is sent in the same manner as previously described. The resultant operation of relay 5-SS and release of relay 2-DA during the transmission of the blank-shift code sequence opens the locking path of the no-traffic chain relays in the same manner as previously described and the relays release if they are operated.

If when the transmitter start code sequence is sent to station 10 after two complete rounds of polling, the no-traffic response character V is received from station 10 or station 10 is on skip, relay 4-VR operates in the same manner as previously described. Relay 4-VR operated completes a path from ground via make contacts 7-4-VR-5, make contacts 7-4-ER-5 and the winding of end code relay 7-EC to battery operating relay 7-EC. If no response is received from station 10, condenser 625 charges via the parallel paths of resistance 623 and resistance 633 in series with contacts 6-ST-5 whereby tube 627 fires operating relay 6-P1 in the same manner as previously described. Relay 6-P1 operated locks via contacts 6-P1-1, 6-4-BL-1 and 6-7-SB-2 and completes a path from ground via make contacts 7-6-P1-3, the make contacts of transfer contacts 7-4-ER-3 and the winding of relay 7-EC to battery. Thus relay 7-EC operates if station 10 sends back a no traffic response or if no response is received from station 10.

The operation of relay 7-EC indicates that no traffic was picked up in response to two complete rounds of polling. The central office now puts all outlying stations in the "S" or standby condition by sending the standby code sequence Figures-S and then Figures or Letters to put all outlying stations in the proper case for receiving the outgoing message. Insofar as the central station previously sent the last character Figures in the transmitter start code sequence for station 10, the central station sends only the character S followed by Figures or Letters.

Relay 7-EC operated completes a path from ground via make contacts 7-EC-3 and the winding of end code auxiliary relay 7-ECA to battery operating relay 7-ECA. Relay 7-ECA operated opens the previously-described operating path for relay 4-VR via contacts 4-7-ECA-1 and completes a path via contacts 6-7-ECA-2 shunting contacts 6-7-SB-4 in the previously-described locking path for relay 6-FH. In addition relay 7-ECA operated completes a path from ground via the break contacts of transfer contacts 4-6-FC-7, make contacts 4-7-ECA-3, the make contacts of transfer contacts 4-5-SC-4, break contacts 4-5-DS-2, lead 4-5-DCML, the break contacts of transfer contacts 5-3-TR-2 and the winding of clutch magnet 512 to battery releasing distributor 511 for rotation.

During the transmission of the start pulse relay 2-DA operates in the same manner as previously described, completing a locking path for relay 7-EC via make contacts 7-2-DA-10 and make contacts 7-EC-4 and opening the previously-described locking path for relay 4-VR via contacts 4-2-DA-8 releasing relay 4-VR. The release of relay 4-VR completes a path from ground via the make contacts of transfer contacts 7-2-DA-11, make contacts 7-EC-5, break contacts 7-4-VR-6, the break contacts of continuity contacts 7-SB-7 and the winding of standby relay 7-SB to battery operating relay 7-SB which locks via the make contacts of continuity contacts 7-SB-7 and break contacts 7-5-ES-12. Relay 7-SB operated opens the previously-described signaling path to the select magnet of printer-perforator 629 via the break contacts of transfer contacts 6-7-SB-1, blinding printer-perforator 629, opens the previously-described locking path for relay 6-P1 via contacts 6-7-SB-2 releasing relay 6-P1, opens one of the previously-described locking paths for relay 6-ST via contacts 6-7-SB-3, opens one of the previously-described locking paths for relay 6-FH via contacts 6-7-SB-4 and opens the previously-described locking paths for the no traffic chain relays 4-SP, 4-EP, 4-SR and 4-ER via contacts 4-7-SB-6 releasing the no traffic chain relays. If at this time relay 7-LS is operated in a manner described hereinafter, a path is completed from ground via contacts 4-RSA-2, 4-RS-4, make contacts 4-7-SB-8, contacts 4-7-LS-1, lead LTCL and the winding of relay 4-LTRS to battery whereby relay 4-LTRS operates assuming relay 7-LS is operated.

Distributor 511 is now coded with the character S insofar as distributor contacts 1 and 3 are connected to lead 5-6-DST via the same paths previously described during the generation of the Letter character in the emergency stop code sequence with the exception that the path from contact 3 to lead 5-6-DST is completed via make contacts 5-7-ECA-4 which shunts contacts 5-4-LTRS-2. Thus, the character S is transmitted out over the sending loop.

Relay 2-DA releases during the transmission of the fifth intelligence pulse of the character S completing a locking path for relay 7-ECA via make contacts 7-ECA-5 and the break contacts of transfer contacts 7-2-DA-11. In addition, relay 2-DA released opens the previously-described locking path for relay 7-EC via contacts 7-2-DA-10 releasing relay 7-EC which in turn opens the operating path for relay 7-ECA via contacts 7-EC-3.

When the start pulse is transmitted during the second revolution of distributor 511 relay 2-DA operates completing a path via make contacts 6-2-DA-12 shunting contacts 6-7-ECA-2 and 6-7-ILA-2 in the previously-described locking path for relay 6-FH. In addition relay 2-DA operated opens the locking path for relay 7-ECA via contacts 7-2-DA-11 releasing relay 7-ECA which in turn opens the energizing path for clutch magnet 512 via contacts 4-7-ECA-3 whereby distributor 511 will stop at the end of this rotation.

Distributor 511 is now coded for the character Letters or the character Figures depending upon whether relay 4-LTRS is operated, as previously described, insofar as the distributor contacts are connected to lead 5-6-DST in the same manner as previously described for the transmission of the Letters character or the Figures character in the emergency stop code sequence.

Relay 2-DA releases during the transmission of the fifth intelligence pulse opening the previously-described locking path for relay 6-FH via contacts 6-2-DA-12 releasing relay 6-FH. Relay 6-FH released opens the previously-described locking path for relay 6-ST via contacts 6-FH-5 releasing relay 6-ST and opens the previously-described locking path for relay 5–SC via contacts 5–6–FH–7 releasing relay 5–SC.

At this point relay 7–SB remains operated and the outgoing stations are now all in the standby condition. While in this condition the insertion of tape in any outlying station transmitter-distributor except those on skip will cause the transmission of the character O to be sent to the central station to initiate a new polling cycle.

The receipt of the character O at the central station will operate line relay 6–LR to its spacing contact completing a path from ground via the break contacts of continuity contacts 6–4–SWA–1, the armature and the spacing contact of relay 6–LR, lead LRSL, the break contacts of transfer contacts 6–7–BLD–1, the make contacts of transfer contacts 6–7–SB–1 and the winding of end-of-standby relay 6–ESB to positive battery operating relay 6–ESB which locks via make contacts 6–ESB–1 and make contacts 6–7–SB–9. Relay 6–ESB operated completes a path from ground via make contacts 6–ESB–2, break contacts 6–FH–1 and the winding of relay 6–FC to battery operating relay 6–FC and thus initiating a new polling cycle in the same manner as previously described. During the new polling cycle, relay 5–ES operates opening the previously-described locking path for relay 7–SB via contacts 7–5–ES–12 releasing relay 7–SB which in turn opens the previously-described locking path for relay 6–ESB via contacts 6–7–SB–9 releasing relay 6–ESB and opens the previously-described operating path for relays 4–LTRS via contacts 4–7–SB–8 releasing relay 4–LTRS if it had previously been operated.

The central station also includes an interval timer which, when the central station is in the standby condition, will initiate a new polling cycle every 30 minutes. The timer includes A.-C. operated motor 637 which rotates cam 639 whereby key switch 641 opens its normally closed lower contacts, as shown in Fig. 6, and closes its normally open upper contacts for a short interval of time every 30 minutes, in an obvious manner. If relay 7–SB is operated when the upper contacts of switch 641 close, a path is completed from ground via make contacts 6–7–SB–10, make contacts 6–7–SB–11, the upper contacts of switch 641 and the winding of resume polling relay 6–RP operating relay 6–RP which locks via make contacts 6–RP–1 and contacts 6–7–SB–10.

When the lower contacts of switch 641 are reclosed, a path is completed from ground via make contacts 6–7–SB–10, make contacts 6–7–SB–11, the lower contacts of switch 641, make contacts 6–RP–2, break contacts 6–FH–1 and the winding of relay 6–FC to battery operating relay 6–FC. Relay 6–FC operated now initiates a new polling cycle in the same manner as previously described. The operation of relay 5–ES during the new polling cycle releases relay 7–SB which in turn opens the locking path for relay 6–RP via contacts 6–7–SB–10 releasing relay 6–RP.

*The central station sends a message*

As previously described relay 6–ST is released when an outlying station transmitter is successfully started or the central station is in the standby condition preparing the central station to send an outgoing message. If the message is the first message to be tranmitted at the beginning of the day, to insure that the central station outgoing line sequential selector 703 and the outlying stations sequential selectors are properly prepared, the line-reset nonlocking key 419, Fig. 4, should be operated to send the end-of-address code sequence Carriage Return-Line Feed followed by Letters and then the end-of-message code sequence Figures-H-Letters thus releasing all operated contacts in the sequential selectors and placing them in the select condition.

The operation of key 419 completes a path from ground via the normally open or make contacts of key 419, break contacts 4–6–ST–8 and the winding of reset relay 4–RS to battery operating relay 4–RS which locks via make contacts 4–RS–6 and the break contacts of continuity contacts 4–RSA–4. Relay 4–RS operated opens the operating path of relay 4–LTRS via contacts 4–RS–4 releasing relay 4–LTRS if it is operated and opens the previously-described path shunting distributor 511 via break contacts 6–4–RS–5.

Upon the release of key 419 a path is completed from ground via break contacts 4–7–EMO–2 or break contacts 4–SM1–2 and 4–SM2–2 in shunt thereto, make contacts 4–RS–7, the normally closed or break contacts of key 419, lead 4–5–DCML, the break contacts of transfer contacts 5–3–TR–2 and the winding of clutch magnet 512 to battery releasing distributor 511 for rotation.

When distrubitor 511 generates the start pulse, relay 2–DA operates completing a path from ground via make contacts 5–4–RS–8, the make contacts of transfer contacts 5–2–DA–3, contacts 5–CH2–1 and 5–CH3–2 and the winding of relay 5–CH1 to battery operating relay 5–CH1 which locks in the same manner as previously described. At this time distributor 511 is coded with the character Carriage Return insofar as contact 4 of distributor 511 is connected to lead 5–6–DST via lead DL–4, the break contacts of transfer contacts 5–3–TR–8, break contacts 5–CH2–9, the make contacts of continuity contacts 5–4–RS–1, break contacts 5–4–BL–2 and the break contacts of continuity contacts 5–3–TR–5.

During the transmission of the fifth intelligence pulse of the character Carriage Return, relay 2–DA releases completing a path from ground via contacts 5–4–RS–8, the break contacts of transfer contacts 5–2–DA–3, the make contacts of transfer contacts 5–CH1–2, break contacts 5–CH3–3 and the winding of relay 5–CH2 to battery operating relay 5–CH2 which locks in the same manner as previously described.

During the generation of the start pulse in the second revolution of distributor 511, relay 2–DA operates releasing relay 5–CH1 in the same manner as previously described. Distributor 511 is now coded with the character Line Feed insofar as a path is completed from contact 2 of distributor 511 to lead 5–6–DST via lead DL–2, the break contacts of transfer contacts 5–3–TR–6, break contacts 5–CH1–5, the make contacts of continuity contacts 5–4–RS–1, contacts 5–4–BL–2 and the contacts 5–3–TR–5.

During the generation of the fifth intelligence pulse of the character Line Feed relay 2–DA releases completing a path from ground via contacts 5–4–RS–8, the break contacts of transfer contacts 5–2–DA–3, the break contacts of transfer contacts 5–CH1–2, make contacts 5–CH2–5 and the winding of relay 5–CH3 to battery operating relay 5–CH3 which locks in the same manner as previously described. Relay 5–CH3 operated completes a path from ground via the make contacts of transfer contacts 4–5–CH3–12, make contacts 4–RS–9, lead LTCL and the winding of relay 4–LTRS to battery operating relay 4–LTRS.

During the generation of the start pulse in the third revolution of distributor 511 relay 2–DA operates releasing relay 5–CH2 in the same manner as previously described. Relay 5–CH2 released completes a path from ground via make contacts 5–CH3–8, break contacts 5–CH2–6, lead 4–5–CSRL, the break contacts of continuity contacts 4–RSA–5, make contacts 4–RS–10 and the winding of reset auxiliary relay 4–RSA to battery operating relay 4–RSA which locks via make contacts 4–RS–10 and the make contacts of continuity contacts 4–RSA–5. Relay 4–RSA operated further opens the previously described operating path for relay 4–LTRS via contacts 4–RSA–2, maintains open the previously described path shunting distributor 511 via contacts 6–4–RSA–3 and transfers the locking path for relay 4–RS via the break contacts of continuity contacts 4–RSA–4 to a path via the make contacts of continuity contacts 4–RSA–4 and the make contacts of transfer contacts 4–5–CH3–12. In addition relay 4–RSA operated completes a path via make contacts 4–RSA–6 shunting contacts 4–RS–7 in the previously described energizing path for clutch magnet 512.

Distributor 511 is coded with the character Letters for the third revolution. Contact 1 of distributor 511 is connected to lead 5–6–DST via lead DL–1, the break contacts of transfer contacts 5–3–TR–4, make contacts 5–CH3–11 and contacts 5–4–BL–2 and 5–3–TR–5. Contact 2 of distributor 511 is connected to lead 5–6–DST via lead DL–2, contacts 5–3–TR–6, break contacts 5–CH1–5, make contacts of continuity contacts 5–4–RS–1 and contacts 5–4–BL–2 and 5–3–TR–5. Contact 3 of distributor 511 is connected to lead 5–6–DST via lead DL–3, contacts 5–3–TR–7 and 5–4–LTRS–2, break contacts 5–CH2–7, make contacts 5–CH3–11 and contacts 5–4–BL–2 and 5–3–TR–5. Contact 4 of distributor 511 is connected to lead 5–6–DST via lead DL–4, contacts 5–3–TR–8, break contacts 5–CH2–9, the make contacts of continuity contacts 5–4–RS–1 and contacts 5–4–BL–2 and 5–3–TR–5. Contact 5 of distributor 511 is connected to lead 5–6–DST via lead contacts 5–3–TR–9, contacts 5–7–EC–2, break contacts 5–CH2–7, make contacts 5–CH3–11 and contacts 5–4–BL–2 and 5–3–TR–5.

Relay 2–DA releases during the generation of the fifth intelligence pulse of the Letters character releasing relay 5–CH3 in the same manner as previously described. Relay 5–CH3 released completes a locking path for relay 4–RSA via the break contacts of transfer contacts 4–5–CH3–12 and make contacts 4–RSA–7 and opens the previously described operating path for relay 4–LTRS via the make contacts of transfer contacts 4–5–CH3–12 releasing relay 4–LTRS. In addition, relay 5–CH3 released opens the previously described locking path for relay 4–RS via the make contacts of transfer contacts 4–5–CH3–12 releasing relay 4–RS which in turn opens the previously described locking path for relay 4–RSA via contacts 4–RS–10.

This concludes the transmission of the end-of-address code sequence Carriage Return-Line Feed followed by Letters and the central station now proceeds to send the end-of-message code sequence Figures-H-Letters.

During the generation of the start pulse in the first revolution of distributor 511 during the generation of the end-of-message code sequence relay 2–DA operates completing a path from ground via make contacts 5–4–RSA–8, the make contacts of transfer contacts 5–2–DA–3, contacts 5–CH2–1, contacts 5–CH3–2 and the winding of relay 5–CH1 to battery operating relay 5–CH1 which locks in the same manner as previously described.

Distributor 511 is coded with the character Figures for the first revolution insofar as contacts 1 through 5 of distributor 511 are connected to lead 5–6–DST in the same manner as previously described for the generation of the Figures character in the emergency stop code sequence with the exception that the paths connecting contacts 1, 2 and 4 of distributor 511 are connected to lead 5–6–DST by way of break contacts 5–CH2–7 which shunt contacts 5–4–SWA–5 and 5–4–RSA–1.

During the generation of the fifth intelligence pulse of the Figures character relay 2–DA releases completing a path from ground via contacts 5–4–RSA–8, 5–2–DA–3, 5–CH1–2, and 5–CH3–3 and the winding of relay 5–CH2 to battery operating relay 5–CH2 which locks in the same manner as previously described. Relay 5–CH2 operated completes a path via make contacts 4–5–CH2–10 shunting contacts 4–5–CH3–12 in the previously described locking path for relay 4–RSA.

During the generation of the start pulse in the second revolution of distributor 511, relay 2–DA operates releasing relay 5–CH1 in the same manner as previously described. Distributor 511 is coded with the character H for the second revolution of distributor 511 insofar as contacts 3 and 5 of distributor 511 are connected to lead 5–6–DST in the same manner as previously described for the generation of the Letters character in the emergency stop code sequence with the exception that the path connecting contact 3 of distributor 511 to lead 5–6–DST is completed by way of break contacts 5–CH1–3 and make contacts 5–4–RSA–9 which shunt contacts 5–4–LTRS–2.

Relay 2–DA releases during the generation of the fifth intelligence pulse of the H character completing a path from ground via contacts 5–4–RSA–8, 5–2–DA–3, 5–CH1–2 and 5–CH2–5 and the winding of relay 5–CH3 to battery operating relay 5–CH3 which locks in the same manner as previously described. Relay 5–CH3 operated completes a path from ground via the make contacts of transfer contacts 4–5–CH3–12, make contacts 4–RSA–10, lead LTCL and the winding of relay 4–LTRS to battery operating relay 4–LTRS. In addition relay 5–CH3 operated opens one of the previously described locking paths for relay 4–RSA via the break contacts of transfer contacts 4–5–CH3–12.

During the generation of the start pulse in the third revolution of distributor 511 relay 2–DA operates completing a locking path fo relay 4–LTRS via make contacts 4–LTRS–1, lead 4–5–LTHL and the make contacts of transfer contacts 5–2–DA–4. In addition, relay 2–DA operated releases relay 5–CH2 in the same manner as previously described. Relay 5–CH2 released opens the previously described locking path for relay 4–RSA via contacts 4–5–CH2–10 releasing relay 4–RSA. Relay 4–RSA released recompletes the previously described operating path for relay 4–LTRS via contacts 4–RSA–2 if relay 4–LTRS was previously operated prior to the operation of line reset key 419. In addition, relay 4–RSA released opens the previously described energizing path for clutch magnet 512 via contacts 4–RSA–6 and distributor 511 will stop at the termination of the third revolution. Relay 4–RSA released also recompletes the previously described path shunting distributor 511 via contacts 6–4–RSA–3, but this has no adverse effect at this time since the character Letters is being sent.

Distributor 511 is coded with the character Letters for the third revolution insofar as contacts 1 through 5 of distributor 511 are connected to lead 5–6–DST in the same manner as previously described for the generation of the Letters character in the emergency stop code sequence with the exception that the path connecting contact 1 of distributor 511 to lead 5–6–DST is completed via contacts 5–CH3–11 which shunts contacts 5–4–SWA–5, 5–4–RSA–1 and 5–4–RS–1.

During the generation of the fifth intelligence pulse of the Letters character relay 2–DA releases, releasing relay 5–CH3 in the same manner as previously described and opening the locking path for relay 4–LTRS via the make contacts of transfer contacts 5–2–DA–4.

Insofar as select magnet 701 of the outgoing line sequential selector 703 is sensing the code signals impressed on the sending loop, sequential selector 703 places itself in the select condition and momentarily closes contacts 717 in response to the code sequence Figures-H-Letters. The momentary closure of contacts 717 completes a path from ground via contacts 717, the break contacts of continuity contacts 7–EMO–3 and the winding of end-of-message relay 7–EMO to battery operating relay 7–EMO which locks via the make contacts of continuity contacts 7–EMO–3 and normally closed contacts 719 of sequential selector 703. Relay 7–EMO operated opens one of the previously described operating paths for relay 6–ST via break contacts 6–7–EMO–1 and completes a discharge path for condenser 643 to negative battery via the break contacts of transfer contacts 6–7–BLD–2, break contacts 6–7–RA–2 and make contacts 6–7–EMO–6 which shunts break contacts 6–4–SM1–6 and 6–4–SM2–6.

The central station is now prepared to start an outgoing transmitter-distributor and the outlying stations are now prepared to respond to the address or call directing code characters of the outgoing message.

The central station circuit performs certain functions in conjunction with controlling the central station transmitter-distributors and the sending of call directing code sequences to select the outlying station recorders. The two central station transmitter-distributors are arranged to send alternately if both are supplied with message material. In order to provide for the necessary control of the two transmitter-distributors a flip-flop circuit is incorporated in the central station circuit.

Assuming that tape is supplied to both the No. 1 transmitter-distributor and the No. 2 transmitter-distributor, tape out contacts 203 and tape out contacts 211 close as previously described. The closure of tape out contacts 203 completes a path from ground via contacts 203, sixth pin contacts 205 and the winding of tape 1 relay 2–TP1 to battery operating relay 2–TP1. Relay 2–TP1 operated opens a previously described operating path for relay 6–ST via contacts 6–2–TP1–1 and completes a path via make contacts 6–2–TP1–4 shunting contacts 6–4–SM1–6 in the previously described discharge path for condenser 643. The closure of tape out contacts 211 completes a path from ground via contacts 211, sixth pin contacts 209 and the winding of tape 2 relay 2–TP2 operating relay 2–TP2 which in turn opens the previously described operating path for relay 6–ST via contacts 6–2–TP2–1 and completes a path via make contacts 6–2–TP2–4 shunting contacts 6–4–SM2–6 in the previously described discharge path for condenser 643.

When the end-of-message code sequence Figures-H-Letters is impressed upon the sending loop, relay 7–EMO operates as previously described. The operation of relay 7–EMO completes a path from ground via the make contacts of continuity contacts 7–EMO–4, the make contacts of transfer contacts 7–2–TP1–2, break contacts 7–OT2–1 and the winding of outgoing transmitter 1 relay 7–OT1 to battery operating relay 7–OT1.

Relay 7–OT1 operated completes a path from ground via contacts 4–RSA–2, contacts 4–RS–4, make contacts 4–7–EMO–5, the break contacts of transfer contacts 4–3–TR–11, the break contacts of transfer contacts 4–7–OT2–2, make contacts 4–7–OT1–1 and the winding of slow-to-release start magnet 1 relay 4–SM1 operating relay 4–SM1 which locks via make contacts 4–SM1–3 and the break contacts of transfer contacts 4–SM2–3 shunting contacts 4–7–OT1–1, 4–7–OT2–2, 4–3–TR–11 and 4–7–EMO–5 in the previously described operating path for relay 4–SM1.

Relay 4–SM1 operated completes a path from ground via contacts 4–RSA–2, contacts 4–RS–4, break contacts 4–6–AR–2, break contacts 4–7–TSP–1, break contacts 4–7–RA–1, transmitter distributor start lead 2–4–DTSL, break contacts 2–3–TR–12, break contacts 2–6–ST–3, break contacts 2–7–OLA–1, make contacts of transfer contacts 2–4–SM1–4, break contacts 2–7–AL1–1, break contacts 2–4–SM2–4, make contacts 2–TP1–3 and the winding of start magnet 201 of the No. 1 transmitter-distributor to battery thus starting the No. 1 transmitter-distributor. Relay 4–SM1 operated also opens the previously described discharge path for condenser 643 via contacts 6–4–SM1–6. In addition, relay 4–SM1 operated removes the previously described shunt path via break contacts 5–4–SM1–1 across sensing contacts 503 of the No. 1 transmitter-distributor.

If tape is supplied only to the No. 1 transmitter-distributor, relay 2–TP1 operates as previously described and when relay 7–EMO operates, relay 7–OT1 operates in the same manner as previously described operating relay 4–SM1 and thus starting the No. 1 transmitter-distributor.

If tape is supplied to the No. 2 transmitter-distributor only, relay 2–TP2 operates as previously described and when relay 7–EMO operates a path is completed from ground via the make contacts of continuity contacts 7–EMO–4, the break contacts of transfer contacts 7–2–TP1–2, the break contacts of transfer contacts 7–OT1–2, make contacts 7–TP2–2 and the winding of outgoing transmitter 2 relay 7–OT2 to battery operating relay 7–OT2 which locks via make contacts 7–OT2–3 and the make contacts of continuity contacts 7–EMO–9. Relay 7–OT2 operated completes a path from ground via contacts 4–RSA–2, contacts 4–RS–4, contacts 4–7–EMO–5, the break contacts of transfer contacts 4–3–TR–11, the make contacts of transfer contacts 4–7–OT2–2, break contacts 4–7–OT1–3 and the winding of slow-to-release start magnet 2 relay 4–SM2 to battery operating relay 4–SM2 which locks via break contacts 4–SM1–5 and the make contacts of transfer contacts 4–SM2–3 shunting contacts 4–7–OT1–3, 4–7–OT2–2, 4–3–TR–11 and 4–7–EMO–5 in the previously described operating path for relay 4–SM2.

Relay 4–SM2 operated completes a path from ground via contacts 4–RSA–2, 4–RS–4, 4–6–AR–2, 4–7–TSP–1 and 4–7–RA–1, lead 2–4–TDSL, break contacts 2–3–TR–12, break contacts 2–6–ST–3, break contacts 2–7–OLA–1, the break contacts of transfer contacts 2–4–SM–1, break contacts 2–6–AL2–1, make contacts 2–4–SM2–5, make contacts 2–TP2–3 and the winding of start magnet 207 of the No. 2 transmitter-distributor thus starting the No. 2 transmitter-distributor. Relay 4–SM2 operated also opens the previously described discharge path for condenser 643 via contacts 6–4–SM2–6. In addition, relay 4–SM2 operated opens the previously described shunt via break contacts 5–4–SM2–1 across the No. 2 transmitter-distributor sensing contacts 507.

Thus for the initial outgoing message the No. 1 transmitter-distributor is started if tape is supplied to the No. 1 transmitter-distributor or to both transmitter-distributors and the No. 2 transmitter-distributor is started if tape is supplied to the No. 2 transmitter-distributor only.

Each message contains an address portion, an end-of-address code sequence, a text portion and an end-of-message code sequence. One or more call directing code sequences may be sent during the address portion of each outgoing message. Each individual call directing code sequence comprises two characters followed by the character Letters which may be punched in the tape prior to the message text. As described hereinafter outlying stations may be arranged to answerback if an outlying station recorder is selected by a call directing code sequence. In the system described herein the first character of call directing code sequences which select recorders requiring answerback is always the character A while the first character of call directing code sequences which select recorders not requiring answerback is always the character B. Any character may be employed as the second character in the call directing code sequence. However, insofar as certain characters, including such characters as K, T, O, M, V and H, are employed for the selection of various functions or may be simulated by line hits, these characters are avoided. In addition, since the character A is employed in the call directing code sequences which select outlying station recorders requiring answerbacks, this character is not available in the call directing code sequences which select recorders not requiring answerbacks. Thus 20 call directing code sequences are available for recorders requiring answerback and 19 call directing code sequences are available for recorders not requiring answerback.

*The central station requests answerback*

If answerback is desired from one or more outlying station recorders selected by the call directing code sequences in the address portion of the message, the address portion is prefaced by the answerback code sequence K-K-Letters. This code sequence stops any outlying station transmitter-distributor that may be sending and conditions all outlying stations to respond to their call directing code sequences if a recorder requiring answerback is selected and also causes the central station to blind the printer-perforator and await the answering code characters O or V. The outlying station transmitter is restarted when the end-of-address code sequence is sent. If answerback is not desired from the outlying stations, the address portion is not prefaced by the answerback code sequence and the transmitter-distributor proceeds to send the call directing code sequences while the central station looks for the end-of-address code sequence.

Assuming the No. 1 transmitter-distributor is supplied with a message tape containing call directing code characters prefaced by the answerback code sequence K-K-Letters, when the No. 1 transmitter-distributor is started as previously described, the impression of the character K of the answerback code sequence on the sending loop will be read by select magnet 701 of the outgoing line sequential selector 703 and since sequential selector 703 is in the select condition following the transmission of the end-of-message code sequence, contacts 715 momentarily close. The closure of contacts 715 completes a path from ground via contacts 715 and the winding of slow-to-operate require-answerback relay 7-RA to battery operating relay 7-RA which locks via make contacts 7-RA-3, break contacts 7-AD-1 and break contacts 7-4-RSA-11.

Relay 7-RA operated opens the previously described energizing path via contacts 4-7-RA-1 for the transmitter-distributor start magnets, in this case the energizing path of start magnet 201 of the No. 1 transmitter-distributor and the No. 1 transmitter-distributor will stop sending. Relay 7-RA is made sufficiently slow-to-operate, however, to permit the last two characters, K and Letters, of the answerback code sequence to be sent before the transmitter-distributor is stopped.

Relay 7-RA operated also opens the previously described discharge path for condenser 643 via contacts 6-7-RA-2 and condenser 643 slowly charges from positive battery by way of the winding of relay 6-P2 and resistance 645. After about two seconds, which allows the outlying station transmitter-distributors a chance to stop, condenser 643 will charge sufficiently to raise the voltage applied to the electrode of gas tube 647 via resistance 649 where tube 647 fires drawing plate current by way of the winding of relay 6-P2 operating relay 6-P2 which locks via make contacts 6-P2-1, break contacts 6-2-CCA-1, break contacts 6-3-RN-1, break contacts 6-7-BLD-3, break contacts 6-4-RSA-12 and the normally closed contacts of key 635. In addition, ground on the plate of tube 647 applied via the locking path of relay 6-P2 extinguishes tube 647.

Relay 6-P2 operated completes a path from ground via break contacts 7-4-RSA-11, the make contacts of transfer contacts 7-EMO-7, make contacts 7-6-P2-2, make contacts 7-RA-4 and the winding of blind relay 7-BLD to battery operating relay 7-BLD which locks via make contacts 7-BLD-4 shunting contacts 7-RA-4 and 7-6-P2-2 in the operating path of relay 7-BLD.

Relay 7-BLD operated opens the previously described signaling path from the spacing contact of line relay 6-LR to the select magnet of printer-perforator 629 via the break contacts of transfer contacts 6-7-BLD-1 thus blinding printer-perforator 629 and completes a path from the spacing contact of relay 6-LR to the winding of relay 7-AD by way of lead LRSL, the make contacts of transfer contacts 6-7-BLD-1 and answerback detector lead 6-7-ABDL. Relay 7-BLD operated also completes a path via the make contacts of transfer contacts 6-7-BLD-2 and break contacts 6-7-TSP-2 shunting contacts 6-7-BLD-2 and 6-7-RA-2 in the previously described discharge path for condenser 643 thus discharging condenser 643. In addition, relay 7-BLD operated opens the previously described locking path for relay 6-P2 via contacts 6-7-BLD-3 releasing relay 6-P2.

The operation of relay 7-BLD also completes a path from ground via make contacts 6-7-BLD-5 and the winding of select magnet 601 of the incoming line sequential selector 603 to battery thus maintaining the incoming line sequential selector 603 blinded to incoming signals. Furthermore, the operation of relay 7-BLD completes a discharge path for condenser 625 via make contacts 6-7-BLD-6. In addition, relay 7-BLD operated completes a path via make contacts 4-7-BLD-7 shunting contacts 4-7-RA-1 in the previously described energizing path for start magnet 201 whereby start magnet 201 is re-energized, restarting the No. 1 transmitter-distributor. Thus printer-perforator 629 and sequential selector 603 are effectively blinded to incoming signals and the central station is now arranged to look for answerbacks from the outlying stations.

The restarted transmitter-distributor now sends the call directing code sequences. Assuming a call directing code sequence requiring answerback wherein the first character is A is impressed upon the sending loop, the transmitter-distributor is stopped and the central station awaits the answerback from the outlying station.

The outgoing line sequential selector 703 senses the character A impressed upon the sending loop and momentarily closes contacts 713 and momentarily opens contacts 705. The momentary closure of contacts 713 completes a path from ground via contacts 713, make contacts 7-BLD-8 and the winding of slow-to-operate transmitter stop relay 7-TSP to battery operating relay 7-TSP which locks via make contacts 7-TSP-3, break contacts 7-2-CCA-2, break contacts 7-AD-2, break contacts 7-4-RSA-13 and break contacts 7-6-AR-1.

Relay 7-TSP operated opens the previously described energizing path for the transmitter-distributor start magnet, in this case start magnet 201, via contacts 4-7-TSP-1 whereby the No. 1 transmitter-distributor stops sending. Relay 7-TSP is made sufficiently slow-to-operate, however, whereby the No. 1 transmitter-distributor is enabled to send the second character and the Letters character of the call directing code sequence before it stops.

Relay 7-TSP operated also opens the previously described discharge path for condenser 643 via contacts 6-7-TSP-2 whereby condenser 643 starts charging in the same manner as previously described. In addition, relay 7-TSP operated completes a path via make contacts 6-7-TSP-4 shunting contacts 6-7-BLD-3 in the previously described locking path for relay 6-P2.

The No. 1 transmitter-distributor now stops and waits for the answerback. When the answerback is received, the transmitter-distributor is restarted to send the next character punched in the tape. The answerback may be either the character O or V and line relay 6-LR will operate its armature to its spacing contact upon the receipt of the mark to space transition in the character in the same manner as previously described. The operation of the armature of relay 6-LR to the spacing contact completes a path from ground via the break contacts of continuity contacts 6-4-SWA-1, the armature and spacing contact of relay 6-LR, lead LRSL, the make contacts of transfer contacts 6-7-BLD-1, lead 6-7-ABDL and the winding of answerback detector relay 7-AD to battery operating relay 7-AD which locks via make contacts 7-AD-3, make contacts 7-BLD-9 and the normally closed contacts 705 of sequential selector 703.

Relay 7-AD operated opens the previously described locking path for relay 7-RA via contacts 7-AD-1 releasing relay 7-RA and opens the previously described locking path for relay 7-TSP via contacts 7-AD-2 releasing relay 7-TSP. Relay 7-RA released recompletes the path via contacts 4-7-RA-1 shunting contacts 4-7-BLD-7 in the previously described energizing path for start magnet 201. Relay 7-TSP released recompletes the previously described discharge path for condenser 643 via contacts 6-7-TSP-2 discharging condenser 643 and recompletes the previously described energizing path for start magnet 201 via contacts 4-7-TSP-1 restarting the No. 1 transmitter-distributor.

If during the transmission of the subsequent call directing code sequences the character A is again impressed on the sending loop, contacts 705 of sequential selector 703 momentarily open, opening the previously described locking path for relay 7-AD whereby relay 7-AD releases. In addition the impression of the character A on the sending loop momentarily closes contacts 713 recompleting the previously described operating path for relay 7-TSP and the No. 1 transmitter-distributor again stops and awaits the answerback from the outlying station in the same manner as previously described.

If no answerback is received from the outlying station within two seconds, condenser 643 charges sufficiently to fire tube 647 which in turn operates relay 6-P2 whereupon relay 6-P2 locks and extinguishes tube 647 in the same manner as previously described. Relay 6-P2 operated completes a path from ground via make contacts 7-6-P2-3, make contacts 7-2-PST-1 of normally operated relay 2-PST, make contacts 7-TSP-5 and the winding of outgoing line alarm relay 7-OLA to battery operating relay 7-OLA which locks via make contacts 7-OLA-2, break contacts 7-4-RSA-13 and break contacts 7-6-AR-1.

Relay 7-OLA operated opens the previously described energizing path for start magnet 201 via contacts 2-7-OLA-1 and completes a discharge path for condenser 643 via make contacts 6-7-OLA-3 thus discharging condenser 643. Relay 7-OLA operated also completes a path from ground via the normally closed contacts of key 725, buzzer 723 and make contacts 7-OLA-4 to A.-C. source 727 energizing buzzer 723. Since the No. 1 transmitter-distributor is sending and relay 4-SM1 is operated, relay 7-OLA operated completes a path from ground via the make contacts of transfer contacts 7-OLA-5, make contacts 7-4-SM1-7 and transmitter-distributor 1 lamp 733 to ground energizing lamp 733. If the No. 2 transmitter-distributor is sending and relay 4-SM2 is operated, relay 7-OLA operated completes a path via the make contacts of transfer contacts 7-OLA-5, make contacts 7-4-SM2-7 and transmitter-distributor 2 lamp 735 to battery energizing lamp 735.

The alarm condition will persist until the central station attendant momentarily operates either the alarm release key 635 or the line reset key 419. Operation of key 635 restarts the central station transmitter-distributor without connecting the outlying station recorder which fails to answerback while operation of key 419 abandons the call and the tape must be reset.

The momentary operation of key 635 opens the previously described locking path for relay 6-P2 via the normally closed contacts of key 635 releasing relay 6-P2. In addition, the momentary operation of key 635 closes the previously described operating path for relay 6-AR via the normally open contacts of key 635. Relay 6-AR operated opens the previously described energizing path for start magnet 201 via contacts 4-6-AR-2 and opens the previously described locking paths for relays 7-TSP and 7-OLA via contacts 7-6-AR-1 releasing relays 7-TSP and 7-OLA. The release of key 635 and the consequent release of relay 6-AR recompletes the previously described energizing path for start magnet 201 via contacts 4-6-AR-2, 4-7-TSP-1 and 2-7-OLA-1 whereby the No. 1 transmitter-distributor will proceed to send the next character in the tape.

If it is desirable to abandon the call, the central station operator removes the tape from the alarmed transmitter-distributor, in this case the No. 1 transmitter-distributor, and momentarily operates key 419. Removal of tape from the No. 1 transmitter-distributor opens tape-out contacts 203 of the No. 1 transmitter-distributor releasing relay 2-TP1 which in turn opens the previously described operating path of relay 7-OT1 via contacts 7-2-TP1-2 and thus releasing relay 7-OT1. The momentary operation of key 419 operates relay 4-RS in the same manner as previously described and relay 4-RS operated opens the previously described locking path for relay 4-SM1 releasing relay 4-SM1. The release of key 419, the operation of relay 4-RS and the release of relay 4-SM1 completes the previously described energizing path for clutch magnet 512 via contacts 4-SM1-2, 4-SM2-2 and 4-RS-7 and the normally closed contacts of key 419 and the central station proceeds to send the end-of-address code sequence and the end-of-message code sequence in the same manner as previously described. The operation of relay 4-RSA during the generation of the Letters character in the end-of-address code sequence opens the previously described locking path for relay 7-BLD and the previously described locking path for relay 7-RA via contacts 7-4-RSA-11 releasing relay 7-BLD and releasing relay 7-RA if it is operated. In addition, relay 4-RSA operated opens the previously described locking path for relay 7-OLA and opens the previously described locking path for relay 7-TSP via contacts 7-4-RSA-13 releasing relay 7-TSP if it is operated. Relay 4-RSA operated also opens the previously described locking path for relay 6-P2 via contacts 6-4-RSA-12 releasing relay 6-P2. Relay 7-BLD released opens the previously described locking path for relay 7-AD via contacts 7-BLD-9 releasing relay 7-AD if it is operated. Relay 6-P2 released opens the previously described operating path for relay 7-OLA via contacts 7-6-P2-3 releasing relay 7-OLA. The release of relay 7-OLA extinguishes lamp 733 or 735 and buzzer 723.

The impression of the end-of-address code sequence Carriage Return-Line Feed-Letters on the sending loop causes sequential selector 703 to open contacts 719 and thus opening the previously described locking path for relay 7-EMO releasing the relay. The subsequent impression of the end-of-message code sequence Figures-H-Letters on the sending loop closes contacts 717 thus operating relay 7-EMO in the same manner as previously described. If tape has been supplied to the No. 2 transmitter-distributor, relay 7-EMO operated completes the previously described operating path for relay 7-OT2 and the central station is now prepared to start the No. 2 transmitter-distributor and the outlying stations are prepared to respond to the address codes.

If the tape is torn or goes tight while the transmitter-distributor is sending the address portion of the message, the central station automatically stops, locks out the sending transmitter-distributor, sends the end-of-address code sequence and the end-of-message code sequence and starts the other transmitter-distributor if it is supplied with tape. Operator action is then required to reset the alarmed transmitter-distributor.

If the No. 1 transmitter-distributor is sending, tape trouble opens tape-out contacts 203 or closes sixth pin contacts 605 releasing relay 2-TP1 which in turn stops the No. 1 transmitter-distributor and releases relay 7-OT1 in the same manner as previously described. Relay 2-TP1 released completes a path from ground via make contacts 4-7-EMO-8, break contacts 4-2-TP1-5, make contacts 4-SM1-8, break contacts 4-6-ST-8 and the winding of relay 4-RS to battery operating relay 4-RS. As previously described, relay 4-RS operated opens the locking and operating paths of relays 4-SM1 and 4-SM2 releasing relay 4-SM1 and opens the energizing paths of start magnets 201 and 207. Relay 4-RS operated also completes a path from ground via the break contacts of transfer contacts 7-OLA-5, make contacts 7-4-RS-11, make contacts 7-4-SM1-9 and the winding of the No. 1 transmitter-distributor alarm relay 7-AL1 to battery operating relay 7-AL1 which locks by way of make contacts 7-AL1-2 and break contacts 7-6-AR-1. Relay 7-AL1 operated opens the previously described energizing path for start magnet 201 of the No. 1 transmitter-distributor via contacts 2-7-AL1-1 and completes an obvious energizing path for lamp 733 via make contacts 7-AL1-3. Thus the No. 1 transmitter-distributor is locked out and a visual alarm is raised.

If the No. 2 transmitter-distributor is sending, tape trouble opens tape-out contacts 211 or closes sixth pin contacts 209 releasing relay 2–TP2 which in turn stops the No. 2 transmitter-distributor and releases relay 7–OT2 in the same manner as previously described. Relay 2–TP2 released completes a path from ground via make contacts 4–7–EMO–8, break contacts 4–2–TP2–5, make contacts 4–SM2–8, break contacts 4–6–ST–8 and the winding of relay 4–RS to battery operating relay 4–RS. Relay 4–RS operated releases relay 4–SM2 and completes a path from ground via the break contacts of transfer contacts 7–OLA–5, make contacts 7–4–RS–11, make contacts 7–4–SM2–9 and the winding of relay 7–AL2 to battery operating relay 7–AL2 which locks via make contacts 7–AL2–2 and break contacts 7–6–AR–1. Relay 7–AL2 operated opens the previously described energizing path for start magnet 207 of the No. 2 transmitter-distributor via contacts 2–7–AL2–1 and completes an obvious energizing path for lamp 735 via make contacts 7–AL2–3. Thus the No. 2 transmitter-distributor is locked out and a visual alarm is raised.

The operation of relay 4–RS and the release of relay 4–SM1 or relay 4–SM2 energizes clutch magnet 512 and the end-of-address code sequence and the end-of-message code sequence are sent in the same manner as described above. If the No. 1 transmitter is locked out and the No. 2 transmitter is supplied with tape, relay 7–EMO operates when the end-of-message code sequence is impressed upon the sending loop operating relay 7–OT2 which in turn operates relay 4–SM2, in the same manner as previously described, and the No. 2 transmitter is started. If the No. 2 transmitter is locked out and the No. 1 transmitter is supplied with tape, the No. 1 transmitter is started when relay 7–EMO operates, as previously described.

To extinguish the alarm, the operator first takes corrective action by resetting the tape in the transmitter-distributor and momentarily operating key 635 completing the previously described operating path for relay 6–AR. Relay 6–AR operated opens the previously described locking path for relays 7–AL1 and 7–AL2 via break contacts 7–6–AR–1 releasing relay 7–AL1 or 7–AL2. The release of relay 7–AL1 or relay 7–AL2 extinguishes lamp 733 or 735 and prepares the energizing path for start magnet 201 or 207 whereby the alarmed transmitter-distributor is prepared to send when again supplied with tape.

In order to insure against tape mutilation of the call directing code sequences, the control station raises an alarm and locks out the sending transmitter-distributor if at least one outlying station recorder requiring answerback is not selected. As previously described the transmission of the answerback code sequence operates relay 7–RA and with relay 7–RA operated tube 647 fires operating relay 6–P2 which in turn operates relay 7–BLD. If the end-of-address code sequence is sent before at least one answerback is received and contacts 719 of sequential selector 703 open releasing relay 7–EMO. Relay 7–EMO released prepares the previously described operating path of relay 6–ST via contacts 6–7–EMO–1 and opens the previously described locking path of relay 7–BLD via the make contacts of transfer contacts 7–EMO–7 releasing relay 7–BLD. Relay 7–BLD released opens the previously described path via contacts 6–7–BLD–5 applying ground to selector magnet 601 thus unblinding sequential selector 603. In addition, relay 7–BLD released recompletes the previously described signaling path via the break contacts of transfer contacts 6–7–BLD–1 to the select magnet of printer-perforator 629 thus unblinding printer-perforator 629 whereby the central station records the incoming message from the interrupted outlying station transmitter restored by the end-of-address code signal.

Since relay 7–RA is operated, the release of relay 7–EMO completes a path from ground via break contacts 7–4–RSA–11, the break contacts of transfer contacts 7–EMO–7, make contacts of transfer contacts 7–RA–5 and the winding of relay 7–OLA to battery operating relay 7–OLA which locks in the same manner as previously described. Relay 7–OLA operated completes the previously-described energizing path for buzzer 723 via contacts 7–OLA–4 and completes the previously-described energizing path for lamp 733 or lamp 735, in accordance with which transmitter-distributor is sending, via contacts 7–OLA–5.

This alarm can only be reset by abandoning the call. In this case the central station operator resets the tape in the transmitter-distributor and operates line reset key 419 whereby the call is abandoned in the same manner as previously described.

In normal operation the end-of-address code sequence is transmitted after all the call directing code sequences have been sent and the answerbacks, if any, have been received whereupon the sending transmitter-distributor proceeds to transmit the message text. The transmission of the end-of-address code sequence restarts an outlying station transmitter-distributor, if one was previously transmitting, and as previously described releases relay 7–EMO which in turn releases relay 7–BLD. Relay 7–EMO released also completes a path via break contacts 4–7–EMO–11 shunting contacts 4–6–AR–2 and 4–7–TSP–1 in the previously-described energizing paths for start magnets 201 and 207. Relay 7–BLD released unblinds sequential selector 703 and printer-perforator 629 as previously described. In addition, relay 7–BLD released completes the previously-described discharge path for condenser 643 via the break contacts of transfer contacts 6–7–BLD–2 and opens one of the previously described discharge paths for condenser 625 via make contacts 6–7–BLD–6.

If the No. 1 transmitter-distributor is sending, relays 2–TP1 and 2–OT1 are operated as previously described. The release of relay 7–EMO completes a holding path for relay 7–OT1 via make contacts 7–OT1–4 and the break contacts of continuity contacts 7–EMO–4. If at this time, the No. 2 transmitter-distributor is supplied with tape, relay 2–TP2 is operated as previously described and a path is completed from ground via the break contacts of continuity contacts 7–EMO–9, the make contacts of transfer contacts 7–OT1–2, make contacts 7–2–TP2–2 and the winding of relay 7–OT2 to battery operating relay 7–OT2. Relay 7–OT2 operated opens the previously described operating path of relay 7–OT1 via contacts 7–OT2–1. Thus during the transmission of text relay 7–OT1 is operated if the No. 1 transmitter-distributor is sending and relays 7–OT1 and 7–OT2 are operated if the No. 1 transmitter-distributor is sending and the No. 2 transmitter-distributor is supplied with tape.

If the No. 2 transmitter-distributor is sending, relays 2–TP2 and 7–OT2 are operated as previously described. The release of relay 7–EMO, when the end-of-address code sequence is impressed on the sending loop, opens the operating path of relay 7–OT2 via the make contacts of continuity contacts 7–EMO–4 and opens the locking path of relay 7–OT2 via the make contacts of continuity contacts 7–EMO–9 releasing relay 7–OT2. Thus during the transmission of the text relay 7–OT1 and 7–OT2 are released if the No. 2 transmitter-distributor is sending.

The central station circuit responds to the transmission of the end-of-message code sequence by the central station transmitter-distributor by stopping the sending transmitter-distributor and, if the alternate transmitter distributor is supplied with tape, by starting the alternate transmitter-distributor. If the alternate transmitter-distributor is not supplied with tape and the sending transmitter-distributor is supplied with an additional tape, the sending transmitter-distributor is restarted to send the next message.

If the No. 1 transmitter-distributor is sending, the No.

2 transmitter-distributor is not supplied with tape and the No. 1 transmitter-distributor is supplied with an additional tape, relays 2–TP1 and 7–OT1 are operated as previously described. When the end-of-message code sequence, Figures-H-Letters, is impressed upon the sending loop, relay 7–EMO operates in the same manner as previously described. Relay 7–EMO operated completes the previously described operating path for relay 7–OT1 via the make contacts of continuity contacts 7–EMO–4, the make contacts of transfer contacts 7–2–TP1–2 and break contacts 7–OT2–1 whereby relays 7–OT1 is maintained operated and the next message is transmitted from the No. 1 transmitter-distributor in the same manner as previously described.

If the No. 1 transmitter-distributor is sending and the No. 2 transmitter-distributor is supplied with tape, relays 2–TP1, 2–TP2, 7–OT1 and 7–OT2 are operated as previously described. The impression of the end-of-message code sequence on the sending loop operates relay 7–EMO which, in turn, completes the previously described holding path for relay 7–OT2 via the make contacts of continuity contacts 7–EMO–9, make contacts 7–OT2–3 and make contacts 7–2–TP2–2 maintaining relay 7–OT2 operated. In addition, relay 7–EMO operated opens the previously described holding path for relay 7–OT1 via the break contacts of continuity contacts 7–EMO–4. The release of relay 7–OT1 completes the previously described operating path of relay 4–SM2 via break contacts 4–7–OT1–3 operating relay 4–SM2 which in turn opens the previously described energizing path for start magnet 201 of the No. 1 transmitter-distributor via break contacts 2–4–SM2–4 stopping the No. 1 transmitter-distributor. In addition, relay 4–SM2 operated opens the previously described locking path for relay 4–SM1 via the break contacts of transfer contacts 4–SM2–3 releasing relay 4–SM1. With relay 4–SM2 operated and relay 4–SM1 released, the next message is transmitted from the No. 2 transmitter-distributor in the same manner as previously described.

If the No. 2 transmitter-distributor is sending text, relays 7–OT1 and 7–OT2 are released as previously described. If the No. 1 transmitter-distributor is supplied with tape whereby relay 2–TP1 is operated, the operation of relay 7–EMO at the end-of-message completes the previously described operating path for relay 7–OT1 via the make contacts of continuity contacts 7–EMO–4. Relay 7–OT1 operated completes the previously described operating path for relay 4–SM1 via make contacts 4–7–OT1–1 operating relay 4–SM1 which, in turn, opens the previously described energizing path of start magnet 207 of the No. 2 transmitter-distributor via the break contacts of transfer contacts 2–4–SM1–4 thus stopping the No. 2 transmitter-distributor. In addition, relay 4–SM1 operated opens the previously-described locking path for relay 4–SM2 via break contacts 4–SM1–5 releasing relay 4–SM2. With relay 4–SM1 operated and relay 4–SM2 released, the No. 1 transmitter-distributor sends the next message. If the No. 1 transmitter-distributor is not supplied with tape and the No. 2 transmitter-distributor is supplied with an additional tape whereby relay 2–TP2 is operated, the operation of relay 7–EMO at the end or the message completes the previously-described operating path for relay 7–OT2 via the make contacts of continuity contacts 7–EMO–4, the break contacts of transfer contacts 7–2–TP1–2, the break contacts of transfer contacts 7–OT1–2 and make contacts 7–2–TP2–2 whereby the No. 2 transmitter-distributor is restarted to send the next message in the same manner as previously described.

If the tape is torn or goes tight while the transmitter-distributor is transmitting the text, the central station will raise an alarm and stop the transmitter-distributor. If the No. 1 transmitter-distributor is sending, tape trouble releases relay 2–TP1 which in turn stops the No. 1 transmitter-distributor in the same manner as previously-described. Relay 2–TP1 released opens the previously-described discharge path for condenser 643 via make contacts 6–2–TP1–4 whereby condenser 643 starts to charge. After about two seconds tube 647 fires as previously-described operating relay 6–P2 which in turn locks via make contact 6–P2–1 and extinguishes tube 647. Relay 6–P2 operated completes a path from ground via make contacts 7–6–P2–3, make contacts 7–2–PST–1 of normally operated relay 2–PST, break contacts of transfer contacts 7–RA–5 and the winding of relay 7–OLA to battery operating relay 7–OLA which locks via contacts 7–OLA–2 in the same manner as previously described. Relay 7–OLA operated energizes buzzer 723 and lamp 733 as previously described or lamp 735 if the No. 2 transmitter-distributor is sending. In addition relay 7–EMO operated completes the previously described discharge path for condenser 643 via make contacts 6–7–EMO–6 discharging condenser 643.

The operator may restart the sending transmitter-distributor by resetting the tape thus reoperating relay 2–TP1 or 2–TP2 and operating key 635 which opens the previously described locking path for relay 6–P2 via the normally closed contacts of key 635 releasing relay 6–P2 and completes the previously described operating path for relay 6–AR via the normally open contacts of key 635. Relay 6–AR operated opens the previously described locking path for relay 7–OLA via contacts 7–6–AR–1 releasing relay 7–OLA which in turn extinguishes the audible and visual alarms and recompletes the energizing path for the transmitter-distributor start magnet via contacts 2–7–OLA–1.

The operator may start the alternate transmitter-distributor if it is supplied with tape by operating key 419 which operates relay 4–RS in the same manner as previously described. Relay 4–RS operated opens the previously described operating and locking paths for relays 4–SM1 or 4–SM2 and opens the previously described energizing path for the start magnets of the transmitter-distributor via contacts 4–RS–4 and as previously described initiates the transmission of the end-of-address and end-of-message code sequences. The subsequent operation of 4–RSA releases relays 7–OLA and 6–P2 in the same manner as previously described. If the No. 1 transmitter-distributor has been sending, the impression of the end-of-message code sequence on the sending loop operates relay 7–EMO which releases relay 7–OT1 in the same manner as previously described and if the No. 2 transmitter-distributor is supplied with tape, the operating path for relay 7–OT1 is completed via the make contacts of continuity contacts 7–EMO–4, the break contacts of transfer contacts 7–2–TP1–2, the break contacts of transfer contacts 7–OT1–2 and make contacts 7–2–TP2–2 whereby the No. 2 transmitter-distributor is started. If the No. 2 transmitter-distributor has been sending and the No. 1 transmitter distributor is supplied with tape, the operation of relay 7–EMO completes the previously described operating path for relay 7–OT1 via the make contacts of continuity contacts 7–EMO–4 whereby the No. 1 transmitter-distributor is started.

Recalling that the operating path of relay 4–LTRS is completed via contacts 4–7–LS–1 if relay 7–LS is operated during the generation of the standby or blank shift code sequences, Letters Shift relay 7–LS is operated whenever the sending transmitter-distributor impresses a Letters character on the sending loop and released whenever sending transmitter-distributor impresses a Figures character on the sending loop. The impression of a Letters character on a sending loop momentarily closes contact 707 of sequential selector 703 completing a path from ground via contacts 707, break contacts 7–6–ST–9 and the winding of relay 7–LS to battery operating relay 7–LS which locks via make contacts 7–LS–2 and normally closed contacts 711 of sequential selector 703. The subsequent impression of a Figures character on the sending loop by the sending transmitter-distributor momentarily opens contact 711 thus opening the previously described locking path for relay 7–LS releasing relay 7–LS. Thus relay 7–LS is operated and locked if the previous shift character transmitted by the sending transmitter is a Letters character and is released if the previous shift character transmitted by the sending transmitter is a Figures character. Assuming a new polling cycle is initiated, relay 5–DS operates followed by the operation of relay 6–ST and the release of relay 5–DS. Relay 5–DS operated completes a path via make contacts 7–5–DS–4 shunting contacts 7–6–ST–9 in the previously described operating path for relay 7–LS. Relay 6–ST operated stops the sending transmitter-distributor as previously described and opens the previously described operating path of relay 7–LS via contacts 7–6–ST–9. Relay 5–DS released completes a locking path for relay 7–LS via make contacts 7–LS–2, break contacts 7–5–DS–5 and make contacts 7–6–ST–10 whereby if relay 7–LS is operated, the relay is maintained operated. At this time, relay 7–LS is no longer under control of sequential selector contacts 707 and 711. As previously described relay 6–ST releases when an outlying transmitter-distributor is started or the central station is placed in the standby condition. Relay 6–ST released prepares the previously described operating path for relay 7–LS via contacts 7–6–ST–9 and opens the previously described locking path for relay 7–LS via contacts 7–6–ST–10 whereby relay 7–LS is returned to the control of sequential selector contacts 707 and 711.

If it is desired to preclude or terminate the operation of buzzer 723, the operator operates the alarm locking key 725. Key 725 operated opens the previously described energizing path via the normally closed contacts of key 725, for buzzer 723 and completes a path from ground via tthe normally open contacts of key 725 and alarm cutoff lamp 737 to battery energizing lamp 735 and thus indicating that buzzer 723 is disabled.

*The push-button circuit*

The central station includes a push-button calling circuit which provides means of introducing message tapes that do not contain directing and supervisory codes. In accordance with the present circuit up to 20 call directing code sequences may be introduced into an outgoing message. The circuit includes an 8-arc 51-position step-on-release selector generally indicated by block 301. Positions 4 through 23 of arcs 4 through 8 are strapped to the selector common lead 3–5–SLCL in accordance with the second character of the 20 call directing code sequences.

Selector 301 includes step magnet 303, normally closed interrupter contacts 307 and normally open interrupter contacts 305 which open and close respectively when step magnet 303 is energized and normally closed off-normal contacts 309 and normally open off-normal contacts 311 which open and close respectively when the wipers of selector 301 step to position 51, not shown. A nonlocking push-button is provided for each of the 20 call directing code sequences and each push-button includes two normally open sets of contacts wherein contacts 215 and 216 associated with push-button 1, contacts 217 and 218 associated with push-button 2 and contacts 219 and 220 associated with push-button 20 are shown in Fig. 2. A push-button request relay and a station lamp are also provided for each call directing code sequence wherein push-button control relays 2–PBR1, 2–PBR2 and 2–PBR20 and lamps 221, 222 and 223 are shown. One side of the windings of relay 2–PBR1 through 2–PBR20 are connected to an associated set of contacts of push-buttons 1 through 20 and to individual positions 4 through 23 of arc 3 of selector 301 via hold leads 3–2–PBRH1 through 3–2–PBRH20 respectively wherein leads 3–2–PBRH1, 3–2–PBRH2 and 3–2–PBRH20 are shown.

Since certain of the call directing code sequences require answerback, for example, the second and twentieth call directing code sequences, relays 2–ANK and 3–CA are provided to perform certain related functions described hereinafter. The winding of relay 2–ANK is connected to the contacts of the push-buttons associated with call directing code sequences requiring answerback. For example, the winding of relay 2–ANK is connected to contacts 217 and 219 of push-button 2 and push-button 20, respectively. Diodes 225 and 227 are connected to the junctions of contacts 217 and 219 and the winding of relay 2–ANK thus preventing current flow through the diodes to the winding of relay 2–ANK. A winding of relay 3–CA is connected to the positions 5 through 23 of arc 1 of selector 301 associated with the call directing code sequences requiring answerback.

When the power is turned on an operating path is completed from ground via contacts 4–RSA–2, 4–RS–4, 4–6–AR–2, 4–7–TSP–1 and 4–7–RA–1, lead 2–4–TDSL, break contacts 2–CCA–3, break contacts 2–CCB–1, break contacts 2–CCC–1, break contacts 2–PST–2 and the winding of initial control relay 2–IC to battery operating relay 2–IC. Relay 2–IC operated completes a path from ground via make contacts 3–2–IC–1, break contacts 3–SD–1 and the winding of step magnet 303 to battery energizing step magnet 303.

The energization of step magnet 303 closes interrupter contacts 305 completing a path from ground via contacts 3–2–IC–1, contacts 305 and the winding of step delay relay 3–SD to battery operating relay 3–SD. Relay 3–SD operated opens the previously described energizing path via contacts 3–SD–1 for step magnet 303 thus de-energizing step magnet 303 whereupon the wipers of selector 301 step to the next position and interrupter contacts 305 reopen opening the operating path of relay 3–SD. The winding of relay 3–SD is shunted by condenser 313 thus making relay 3–SD sufficiently slow-to-release to allow the wipers of selector 303 to step to the next position and momentarily rest on the next position before relay 3–SD releases.

Assuming that the wipers of selector 301 are initially on position 50 and step to position 51, when relay 3–SD releases, the previously described energizing path for step magnet 303 is recompleted via contacts 3–SD–1 and the wipers of selector 301 proceed to step to the next position in the same manner as previously described. When the wipers of selector 301 step to position 2, a path is completed from ground via the wiper and position 2 of arc 1, break contacts 3–2–PB–1 and the winding of return-to-normal relay 3–RN operating relay 3–RN which locks via make contacts 3–RN–2 and off-normal contacts 309. Relay 3–RN operated opens a path providing shunting ground to a winding of relay 2–PST via break contacts 2–3–RN–4 and 2–PST–3 whereupon push-button start relay 2–PST operates due to current flow from ground via the winding of relay 2–PST and resistance 229 to battery. In addition, relay 3–RN operated completes a path via make contacts 3–RN–3 shunting contacts 3–2–IC–1 in the previously described energizing path for step magnet 303. Relay 2–PST operated opens the previously described operating path via break contacts 2–PST–2 for relay 2–IC and the relay releases. The wipers of selector 301 now continue to step in the same manner as previously described until the wipers step to position 51, now shown, whereupon the previously described locking path for relay 3–RN via off-normal contacts 309 open and a shunting path via off-normal contacts 311 is completed around the winding of relay 3–RN and relay 3–RN releases opening the previously described energizing path via contacts 3–RN–3 for step magnet 303 and selector 301 stops stepping. The push-button circuit is now in the normal waiting condition wherein the wipers of selector 301 are on position 51 and relay 2–PST is operated.

In the event that the wipers of selector 301 are initially on one of positions 3 through 40 or 43 through 45, the previously described operation of relay 2–IC initiates the stepping of the wipers of selector 301 to position 41 or 46 in the same manner as previously described. When the wipers step to position 41 or 46, a holding path for relay 3–SD is completed via make contacts 3–2–IC–3, make contacts 3–SD–2, the wiper and position 41 or 46 of arc 2 of selector 301 and break contacts 3–RN–5 whereupon relay 3–SD is maintained operated and the energizing path via contacts 3–SD–1 for step magnet 303 is maintained open. Selector 301 thus stops on position 41 or 46.

It is recalled that prior to the transmission of the first outgoing message, the operator operates line reset key 419 to place the sequential selectors in the select condition. As previously described the operation of key 419 operates relay 4–RS. Relay 4–RS operated completes a path from ground via the make contacts of transfer contacts 7–4–RS–12, lead 7–3–RNOL, break contacts 3–2–PST–4 and the winding of relay 3–RN to battery. Relay 3–RN operated operates relay 2–PST which in turn releases relay 2–IC. In addition, relay 3–RN operated opens the previously described holding path for relay 3–SD via contacts 3–RN–5 releasing relay 3–SD and the wipers of selector 301 proceed to step to position 51 in the same manner as previously described.

Similarly, if the wipers of selector 301 are initially on position 41, 42, 46 or 47 when the wipers of selector 301 step to the next position, the holding path for relay 3–SD is completed via the next position and the wiper of arc 2 of selector 301 stopping the stepping of selector 301. The subsequent operation of line reset key 419 operates relay 3–RN and selector 301 steps to position 51 in the same manner as previously described. If the wipers of selector 301 are initially on position 48 and step to position 49 or are initially on position 49, a path is completed from ground via the wiper and position 49 of arc 1 of selector 301 and the winding of relay 3–RN to battery thus operating relay 3–RN whereupon relay 2–PST operates and relay 2–IC releases and the wipers of selector 301 step to position 51 in the same manner as previously described.

During the previously described stepping action of selector 301 relays 2–CA, 2–CDP, 2–CD and 2–DCC may operate and release as described hereinafter but without effect at this time.

If supervisory and directing codes are to be inserted in a message, the operator momentarily operates the appropriate push-buttons, inserts the message tape in a transmitter-distributor and momentarily operates a start key associated with the transmitter-distributor supplied with the message tape. Assuming the message is destined for stations designated by the first, second and twentieth call directing code sequences, push-button 1, push-button 2 and push-button 20 are operated completing a path from battery via resistance 231, the winding of push-button relay 2–PB and 3 parallel paths comprising a first path via the normally open contacts 215 of push-button 1, a second path via diode 225 and the normally open contacts 217 of push-button 2 and a third path via diode 227 and the normally open contacts 219 of push-button 20 to ground operating relay 2–PB which locks to ground via make contacts 2–PB–2 and the normally closed contacts 233 of the cancel address key. In addition, a path is completed from battery via resistance 235, the winding of answerback relay 2–ANK and contacts 217 or contacts 219 in shunt thereto to ground operating relay 2–ANK which locks via make contacts 2–ANK–1 and contacts 233. Relay 2–PB operated completes a path from ground via make contacts 2–PB–3, station 1 lamp 221, push-button 1 key contacts 216 and the winding of relay 2–PBR1 to battery operating relay 2–PBR1 which locks via make contacts 2–PBR1–1 which shunt contacts 216. Relay 2–PB operated also completes a path from ground via make contacts 2–PB–3, station 2 lamp 222, contacts 218 and the winding of relay 2–PBR2 to battery operating relay 2–PBR2 which locks via make contacts 2–PBR2–1 which shunt contacts 218. In addition, relay 2–PB operated completes a path via make contacts 2–PB–3, station 20 lamp 223, push-button 20 contacts 220 and the winding of relay 2–PBR20 to battery operating relay 2–PBR20 which locks via make contacts 2–PBR20–1 which shunt contacts 220.

After all the push-buttons are operated, the operator inserts the message tape in a transmitter-distributor operating relay 2–TP1 or 2–TP2 as previously described and then momentarily operates a start key. If the start key associated with the No. 1 transmitter-distributor is operated, a path is completed from ground via the normally open start key contacts 237 and the winding of relay 2–ST1 to battery operating the relay which locks via make contacts 2–ST1–1, the break contacts of transfer contacts 2–ST2–1 and make contacts 2–PB–4. If the start key associated with the No. 2 transmitter-distributor is operated, a path is completed from ground via normally open start key contacts 239 and the winding of relay 2–ST2 to battery operating the relay which locks via break contacts 2–ST1–2, make contacts of transfer contacts 2–ST2–1 and make contacts 2–PB–4.

Assuming that the directing code of a previous message is not being transmitted at this time whereby relay 7–EMO is released if the text of the previous message is being transmitted or relay 4–SM1 and 4–SM2 are released if the central station transmitter-distributors are idle, a path is completed from ground via break contacts 4–SM1–2 and 4–SM2–2 or via break contacts 4–7–EMO–2 in shunt thereto and then via the winding of the push-button auxiliary relay 4–PBA and make contacts 4–2–PB–5 to battery operating relay 4–PBA which locks to ground via make contacts 4–PBA–1. If the previous message is transmitting the directing code, relay 4–PBA operates when the end-of-address code sequence is transmitted and relay 7–EMO releases.

The push-button circuit now awaits the completion of the previous message, if any, and the subsequent operation of relay 7–EMO. Assuming relay 7–EMO is operated and the central station is not sending start codes at this time whereby relay 6–ST is released, a path is completed from ground via make contacts 3–7–EMO–10, make contacts 3–4–PBA–2, break contacts 3–6–ST–11 and the winding of transfer relay 3–TR to battery operating relay 3–TR.

Relay 3–TR operated:

(1) Opens the previously described operating path for relay 6–ST via contacts 6–3–TR–1, (2) Opens the previously described energizing path for clutch magnet 512 via the break contacts of transfer contacts 5–3–TR–2, (3) Transfers distributor leads DL1 through DL5 from the coding circuit via the break contacts of transfer contacts 5–3–TR–4, 5–3–TR–6, 5–3–TR–7, 5–3–TR–8 and 5–3–TR–9 to the push-button coding leads 5–3–PBC1 through 5–3–PBC5 via the make contacts of transfer contacts 5–3–TR–4, 5–3–TR–6, 5–3–TR–7, 5–3–TR–8 and 5–3–TR–9, (4) Opens the previously described operating path for relay 2–DA via the break contacts of transfer contacts 2–3–TR–3, (5) Transfers lead 5–6–DST from the coding circuit via the break contacts of continuity contacts 5–3–TR–5 to lead 3–5–SLCL via the make contacts of transfer contacts 5–3–TR–5, (6) Opens the previously described distributor shunt path via break contacts 6–3–TR–10, (7) Opens the previously described operating paths for relays 4–SM1 and 4–SM2 via the break contacts of transfer contacts 4–3–TR–11, and (8) Opens the previously described energizing paths for start magnets 201 and 207 via break contacts 2–3–TR–12.

If the No. 1 transmitter-distributor is supplied with tape and relay 2–ST1 is operated, relay 3–TR operated completes a path from ground via contacts 4–RSA–2 and 4–RS–4, the make contacts of transfer contacts 4–3–TR–11, the make contacts of transfer contacts 4–2–ST1–3, break contacts 4–2–ST2–2 and the winding of relay 4–SM1 to battery operating relay 4–SM1 which locks in the same manner as previously described. In addition, relay 3–TR operated completes a path applying shunting ground to the winding of relay 2–PST via make contacts 2–3–TR–13 and make contacts 2–ST1–4 releasing relay 2–PST.

If the No. 2 transmitter-distributor is supplied with tape and relay 2–ST2 is operated, relay 3–TR operated completes a path from ground via contacts 4–RSA–2 and 4–RS–4, the make contacts of transfer contacts 4–3–TR–11, the break contacts of transfer contacts 4–2–ST1–3, make contacts 4–2–ST2–3 and the winding of relay 4–SM2 to battery operating relay 4–SM2 which locks in the same manner as previously described. In addition, relay 3–TR operated completes a path applying shunting ground to the winding of relay 2–PST via make contacts 2–3–TR–13 and make contacts 2–ST2–4 releasing relay 2–PST.

The push-button circuit now proceeds to send the call directing code sequences in accordance with the push-buttons operated preceded by the answerback code sequence K-K if one or more of the call directing code sequences require answerback whereby relay 2–ANK is operated.

Returning now to relay 2–PST released, the previously described operating path via break contacts 2–PST–2 for relay 2–IC is completed operating relay 2–IC. Relay 2–IC operated completes the previously described energizing path via contacts 3–2–IC–1 for step magnet 303 whereupon relay 3–SD is operated and the wipers step from position 51 to position 1 in the same manner as previously described.

When the wipers of selector 301 step to position 1 a path is completed from ground via the wiper and position 1 of arc 1, the winding of code prepare relay 3–CDP and resistance 315 to battery operating relay 3–CDP which locks to ground by way of make contacts 3–CDP–1. Relay 3–CDP operated prepares the operating path for relay 3–CD by way of make contacts 3–CDP–2.

If one or more of the call directing code sequences require answerback, relay 2–ANK is operated as previously described and when the wipers of selector 301 step to position 1 a holding path for relay 3–SD is completed via make contacts 3–2–IC–3, make contacts 3–SD–2, the wiper and position 1 of arc 2 of selector 301, make contacts 3–2–ANK–2 and break contacts 3–RN–5 whereby relay 3–SD is maintained operated and selector 301 stops stepping. In addition, a path is completed from ground via contacts 3–RN–5 and 3–2–ANK–2, position 1 and the wiper of arc 2 of selector 301, contacts 3–SD–2, selector-interrupter contacts 307, push-button clutch magnet lead 3–5–PBCM, the break contacts of transfer contacts 5–3–DCC–1, the make contacts of transfer contacts 5–3–TR–2 and the winding of clutch magnet 512 to battery releasing distributor 511 for rotation.

During this revolution, distributor 511 is coded for the character K insofar as lead 5–3–PBC1, 5–3–PBC2, 5–3–PBC3 and 5–3–PBC4 are connected to lead 3–5–SLCL. Lead 5–3–PBC1 is connected to lead 3–5–SLCL via the break contacts of transfer contacts 3–CD–1 and the wiper and position 1 of arc 4 of selector 301. Lead 5–3–PBC2 is connected to lead 3–5–SLCL via the break contacts of transfer contacts 3–CD–2 and the wiper and position 1 of arc 5 of selector 301. Lead 5–3–PBC3 is connected to lead 3–5–SLCL via the break contacts of transfer contacts 3–CD–3 and the wiper and position 1 of arc 6 of selector 301. Lead 5–3–PBC4 is connected to lead 3–5–SLCL via the break contacts of transfer contacts 3–CD–4 and the wiper and position 1 of arc 7 of selector 301.

During the transmission of the start pulse to the sending loop distributor auxiliary contacts 213 close completing a path from ground via contacts 213, the make contacts of transfer contacts 5–3–TR–3, the break contacts of transfer contacts 2–3–CD–6, the selector stepping lead 2–3–SLSL and the winding of step magnet 303 to battery energizing step magnet 303.

During the transmission of the fifth intelligence pulse of the character K, distributor auxiliary contacts 213 reopen opening the previously described energizing path for step magnet 301 via contacts 213 thereby de-energizing step magnet 303 and thus stepping the wipers of selector 301 to position 2. With the wipers at position 2, relay 3–SD is maintained operated and clutch magnet 512 is maintained energized via the wiper and position 2 of arc 2 of selector 301. Thus the wipers of selector 301 stop on position 2 and distributor 511 is released for a second rotation.

For the second rotation distributor 511 is coded for the character K in the same manner as previously disclosed for the generation of the first K character with the exception that the paths connecting lead 3–5–SLCL to leads 5–3–PBC1, 5–3–PBC2, 5–3–PBC3 and 5–3–PBC4 are completed via position 2 of selector 301 instead of position 1.

During the generation of the start pulse of the second K character, distributor auxiliary contacts 213 close completing the previously described energizing path for step magnet 303.

The impression of the first K character on the sending loop closes contacts 715 of the outgoing line sequential selector 703 and thus operating slow-to-operate relay 7–RA during the transmission of the second K character in the same manner as previously described. Relay 7–RA operated opens the previously described discharge path for condenser 643 via contacts 6–7–RA–2 and opens the previously described energizing path for relay 2–IC via contacts 4–7–RA–1 whereby condenser 643 starts to charge and relay 2–IC releases. Relay 2–IC released opens the previously described energizing path for step magnet 303 via contacts 3–2–IC–1 and opens the previously described holding path for relay 3–SD via contacts 3–2–IC–3 releasing relay 3–SD.

During the transmission of the fifth intelligence pulse of the second K character, distributor auxiliary contacts 213 reopen opening the previously described energizing path for step magnet 303 via contacts 213 and step magnet 303 is de-energized stepping the wipers of selector 301 to position 3. At position 3, shunting ground is placed on the winding of relay 2–ANK via the wiper and position 3 of arc 1 of selector 303 and knockdown lead 3–2—KKNL releasing relay 2–ANK. The push-button circuit now stops and waits in this condition.

After about two seconds condenser 643 charges sufficiently to fire tube 647 which in turn operates and locks relay 6–P2 in the same manner as previously described. Relay 6–P2 operated operates relay 7–BLD which locks in the same manner as previously described and releases relay 6–P2. In addition relay 7–BLD operated completes a path via make contacts 4–7–BLD–7 shunting contacts 4–7–RA–1 in the previously described operating path for relay 2–IC thus recompleting the operating path of relay 2–IC and the relay operates. Relay 2–IC operated completes the previously described energizing path for step magnet 303 via contacts 3–2–IC–1 and step magnet 303 energized closes interrupter contacts 305 thus completing the previously described operating path for relay 3–SD via contacts 305 whereby relay 3–SD operates. Relay 3–SD operated opens the previously described energizing path for step magnet 303 via contacts 3–SD–1 stepping the wipers of selector 301 to position 4.

In the event the call directing code sequences to be inserted in the message do not require answerback, relay 2–ANK remains released whereby the previously described holding path for relay 3–SD via contacts 3–2–IC–3 is not completed when the wipers of selector 301 step to position 1. Relay 3–SD therefore releases and the wipers of selector 301 continue to step until they reach position 4. Thus, if relay 2–ANK is released, the push-button circuit does not generate the answerback code sequence.

When the wipers of selector 301 step to position 4, a path is completed from ground via the wiper and position 4 of arc 1 of selector 301, make contacts 3–CDP–2 and the winding of coding relay 3–CD to battery operating relay 3–CD which locks via contacts 3–CDP–2 and make contacts 3–CD–7.

With relay 2–IC operated, the selector wipers continue to step until the wiper of arc 2 of selector 301 finds a holding ground for relay 3–SD. Since it is assumed that push-button 1 was operated whereby relay 2–PBR1 is operated, ground is placed on position 4 of arc 2 via break contacts 3–RN–5 and make contacts 3–2–PBR1–2 thus supplying holding ground to relay 3–SD whereby the relay is maintained operated and the wipers of selector 301 stop on position 4. The circuit now generates the first call directing code sequence, B–E–Letters which requires no answerback.

With the wipers on position 4, a path is completed from ground via contacts 3–RN–5 and 3–2–PBR1–2 position 4 and the wipers of arc 2 of selector 301, contacts 3–SD–2, interrupter contacts 307, lead 3–5–PBCM, the break contacts of transfer contacts 5–3–DCC–1, the make contacts of transfer contacts 5–3–TR–2 and the winding of clutch magnet 512 to battery releasing distributor 511 for rotation.

For the first revolution of distributor 511 the distributor is coded for the character B insofar as leads 5–3–PBC1, 5–3–PBC4 and 5–3–PBC5 are connected to lead 3–5–SLCL. Lead 5–3–PBC1 is connected to lead 3–5–SLCL via the make contacts of transfer contacts 3–CD–1, the break contacts of transfer contacts 3–2–CCC–2 and the break contacts of transfer contacts 3–2–CCB–2. Lead 5–3–PBC4 is connected to lead 3–5–SLCL via the make contacts of transfer contacts 3–CD–4, the break contacts of transfer contacts 3–2–CCC–3, the break contacts of transfer contacts 3–2–CCB–3 and break contacts 3–CA–1. Lead 5–3–PBC5 is connected to lead 3–5–SLCL via the make contacts of transfer contacts 3–CD–5, the break contacts of transfer contacts 3–2–CCC–4, the break contacts of transfer contacts 3–2–CCB–4 and break contacts 3–CA–2.

During the generation of the start pulse of the character B distributor auxiliary contacts 213 close completing a path from ground via contacts 213, the make contacts of transfer contacts 2–3–TR–3, the make contacts of transfer contacts 2–3–CD–6, the break contacts of continuity contacts 2–CCA–4, break contacts 2–CCC–5, the winding of relay 2–CCA, of the character coding chain relays 2–CCA, 2–CCB and 2–CCC, and resistance 241 to battery operating relay 2–CCA which locks via break contacts 2–CCC–5 and the make contacts of continuity contacts 2–CCA–4. Relay 2–CCA operated completes a path from ground via make contacts 5–2–CCA–5, the break contacts of transfer contacts 5–3–DCC–1, the make contacts of transfer contacts 5–3–TR–2 and the winding of clutch magnet 512 to battery maintaining clutch magnet 512 energized. In addition relay 2–CCA operated opens the previously described operating path for relay 2–IC via contacts 2–CCA–3 and relay 2–IC releases. Relay 2–IC released opens the previously described energizing path for step magnet 303 via contacts 3–2–IC–1 and opens the previously described holding path for relays 3–SD via contacts 3–2–IC–3 whereupon relay 3–SD releases opening one of the previously described energizing paths for clutch magnet 512 via contacts 3–SD–2.

During the generation of the fifth intelligence pulse of the character B distributor auxiliary contacts 213 open removing shunting ground applied to the winding of relay 2–CCB via contacts 213, the make contacts of transfer contacts 2–3–TR–3, the make contacts of transfer contacts 2–3–CD–6 and the break contacts of transfer contacts 2–CCB–5 whereupon relay 2–CCB operates due to current flow from ground via the make contacts of continuity contacts 2–CCA–4, the break contacts of continuity contacts 2–CCB–6, the winding of relay 2–CCB and resistance 243 to battery. Relay 2–CCB operated locks to ground via the make contacts of continuity contacts 2–CCB–6. Relay 2–CCB operated also completes a path via make contacts 5–2–CCB–7 which shunt contacts 5–2–CCA–5 in the previously described energizing path for clutch magnet 512 thus maintaining clutch magnet 512 energized. In addition, relay 2–CCB operated maintains open the operating path of relay 2–IC via break contacts 2–CCB–1.

Figure 3:
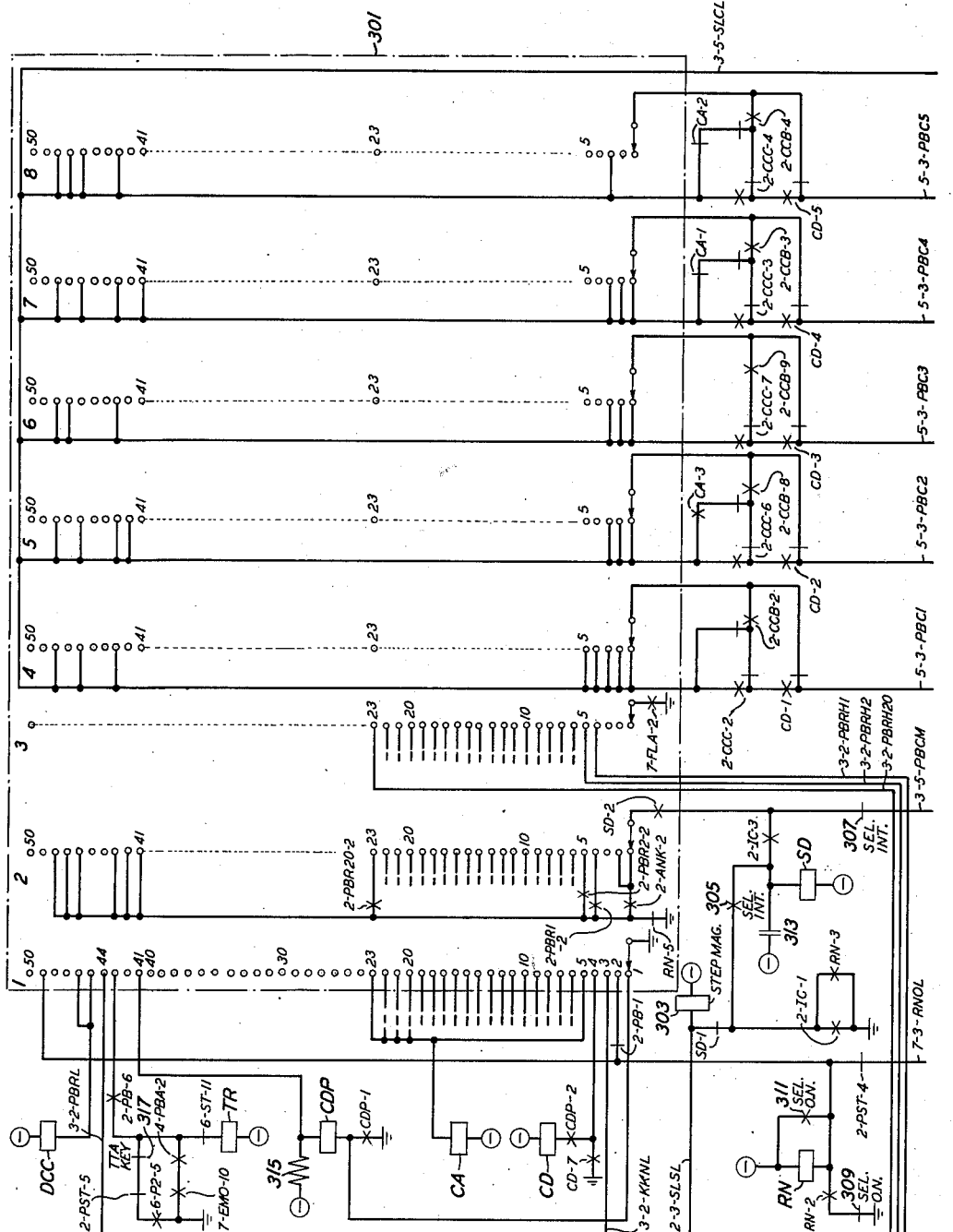
Figure 4:
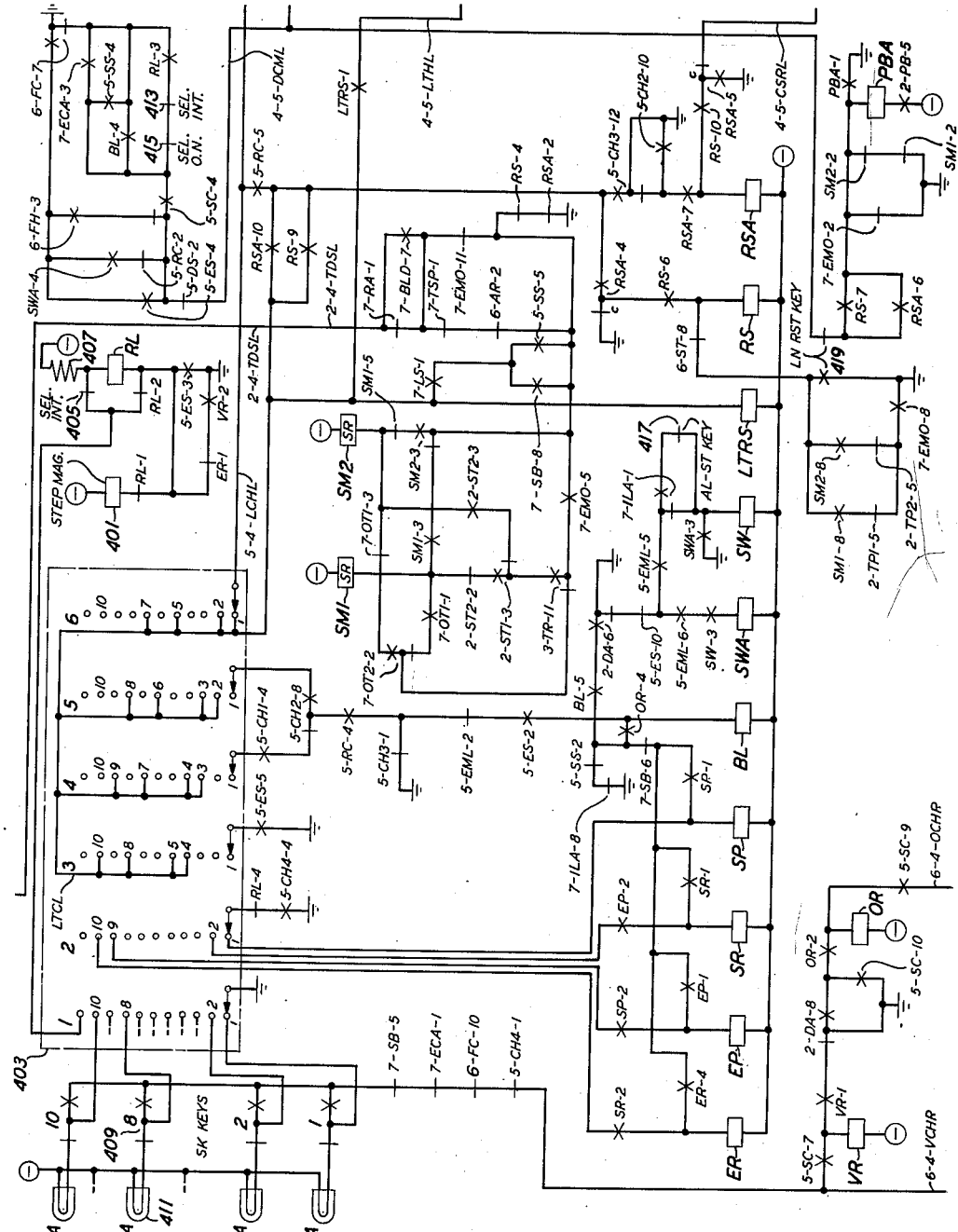
Figure 5:
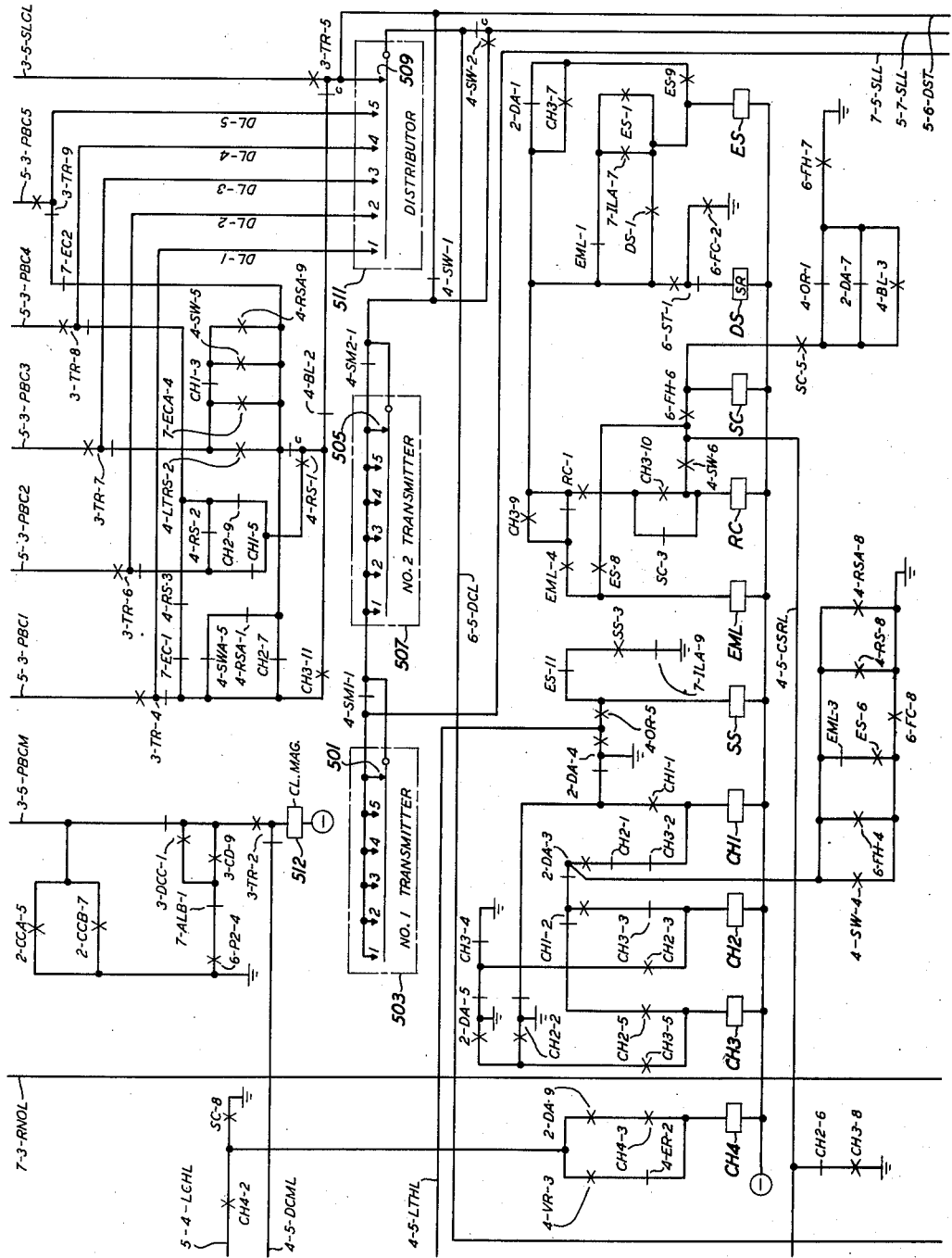

For the second revolution distributor 511 is coded in accordance with the strapping of positions 4 of arcs 4 through 8 of selector 301 insofar as leads 5–3–PBC–1, 5–3–PBC2, 5–3–PBC3, 5–3–PBC4 and 5–3–PBC5 are connected to the wipers of arcs 4, 5, 6, 7 and 8, respectively. Lead 5–3–PBC1 is connected to the wiper of arc 4 of selector 301 via the make contacts of transfer contacts 3–CD–1, the break contacts of transfer contacts 3–2–CCC–2 and the make contacts of transfer contacts 3–2–CCB–2. Lead 5–3–PBC2 is connected to the wiper of arc 5 of selector 301 via the make contacts of transfer contacts 3–CD–2, the break contacts of transfer contacts 3–2–CCC–6 and the make contacts of transfer contacts 3–2–CCB–8. Lead 5–3–PBC3 is connected to the wiper of arc 6 of selector 301 via the make contacts of transfer contacts 3–CD–3, the break contacts of transfer contacts 3–2–CCC–7 and make contacts 3–2–CCB–9. Lead 5–3–PBC4 is connected to the wiper of arc 7 of selector 301 via the make contacts of transfer contacts 3–CD–4, the break contacts of transfer contacts 3–2–CCC–3 and the make contacts of transfer contacts 3–2–CCB–3. Lead 5–3–PBC5 is connected to the wiper of arc 8 of selector 301 via the make contacts of transfer contacts 3–CD–5, the break contacts of transfer contacts 3–2–CCC–4 and the make contacts of transfer contacts 3–2–CCB–4. Since as shown in Fig. 3 position 4 of arc 4 is strapped to lead 3–5–SLCL, distributor 511 is coded for the character E.

During the generation of the start pulse of the character E, distributor auxiliary contacts 213 close applying shunting ground to the winding of relay 2–CCA via contacts 213, the make contacts 2–3–TR–3, the make contacts of transfer contacts 2–3–CD–6 and the make contacts of transfer contacts 2–CCB–5 whereby relay 2–CCA releases.

During the generation of the fifth intelligence pulse of the character E, distributor auxiliary contacts 213 open removing shunting ground from the winding of relay 2–CCC via contacts 213, the make contacts of transfer contacts 2–3–TR–3, the make contacts of transfer contacts 2–3–CD–6 and the break contacts of transfer contacts 2–CCC–8 whereby relay 2–CCC operates due to current flow from ground via the make contacts of continuity contacts 2–CCB–10, break contacts 2–CCA–6 and resistance 245 to battery. Relay 2–CCC operated maintains open the operating path of relay 2–IC via break contacts 2–CCC–1.

For the third revolution of distributor 511 the distributor is coded for the character Letters insofar as leads 5–3–PBC1, 5–3–PBC2, 5–3–PBC3, 5–3–PBC4 and 5–3–PBC5 are connected to lead 3–5–SLCL. Lead 5–3–PBC1 is connected to lead 3–5–SLCL via the make contacts of transfer contacts 3–CD–1 and the make contacts of transfer contacts 3–2–CCC–2. Lead 5–3–PBC2 is connected to lead 3–5–SLCL via the make contacts of transfer contacts 3–CD–2 and the make contacts of transfer contacts 3–2–CCC–6. Lead 5–3–PBC3 is connected to lead 3–5–SLCL via the make contacts of transfer contacts 3–CD–3 and the make contacts of transfer contacts 3–2–CCC–7. Lead 5–3–PBC4 is connected to lead 3–5–SLCL via the make contacts of transfer contacts 3–CD–4 and the make contacts of transfer contacts 3–2–CCC–3. Lead 5–3–PBC5 is connected to lead 3–5–SLCL via the make contacts of transfer contacts 3–CD–5 and the make contacts of transfer contacts 3–2–CCC–4.

During generation of the start pulse of the Letters character distributor auxiliary contacts 213 close supplying shunting ground to relay 2–CCB via contacts 213, the make contacts of transfer contacts 2–3–TR–3, the make contacts of transfer contacts 2–3–CD–6 and the make contacts of transfer contacts 2–CCC–8 whereby relay 2–CCB releases. Relay 2–CCB released opens the previously described energizing path for clutch magnet 512 via contacts 5–2–CCB–7 whereby clutch magnet 512 is deenergized and distributor 511 will stop at the end of this revolution. In addition, relay 2–CCB operated completes a holding path for relay 2–CCC via break contacts 2–CCA–6, the break contacts of continuity contacts 2–CCB–10, the make contacts of transfer contacts 2–3–CD–6, the make contacts of transfer contacts 2–3–TR–3 and distributor auxiliary contacts 213.

During the generation of the fifth intelligence pulse of the character Letters distributor auxiliary contacts 213 open opening the previously described holding path for relay 2–CCC whereby relay 2–CCC releases. Relay 2–CCC released recompletes the previously described operating path for relay 2–IC via contacts 2–CCC–1 whereby relay 2–IC operates. Relay 2–IC operated completes the previously described energizing path for step magnet 303 via contacts 3–2–IC–1 thus energizing step magnet 303. As previously described with relay 2–IC operated and step magnet 303 energized relay 3–SD operates deenergizing step magnet 303 whereby the wipers of selector 301 resume stepping.

When the wipers of selector 301 step to position 5 a holding path for relay 3–SD is completed from ground via break contacts 3–RN–5, make contacts 3–2–PBR2–2, position 5 and the wiper of arc 2 of selector 301 and contacts 3–SD–2 and 3–2–IC–3 thus maintaining relay 3–SD operated whereby the wipers of selector 301 stop on position 5. The push-button circuit is now prepared to generate the second call directing code sequence A–E–Letters, which requires answerback insofar as the first character is A.

With the wipers of selector 301 on position 5, a path is completed from ground via the wiper and position 5 of arc 1 and the winding of code answerback relay 3–CA to battery operating the relay. In addition, a path is completed from ground via contacts 3–RN–5 and 3–2–PBR2–2, position 5 and the wiper of arc 2, contacts 3–SD–2, interrupter contacts 307, lead 3–5–PBCM, contacts 5–3–DCC–1 and 5–3–TR–2 and the winding of clutch magnet 512 to battery releasing distributor 511 for rotation.

During the next two revolutions of distributor 511, the action of the push-button circuit is similar to the previously described action of the circuit during the generation of the characters B and E of the call directing code sequence B–E–Letters with relays 2–CCA and 2–CCB successively operating and relays 2–IC and 3–SD releasing during the first revolution and relay 2–CCC operating and relay 2–CCA releasing during the second revolution of distributor 511.

For the first revolution of distributor 511 the distributor is coded for the character A insofar as lead 5–3–PBC1 is connected to lead 3–5–SLCL in the same manner as previously described for the generation of the B character in the call directing sequence B–E–Letters and lead 5–3–PBC2 is connected to lead 3–5–SLCL via the make contacts of transfer contacts 3–CD–2, the break contacts of transfer contacts 3–2–CCC–6, the break contacts of transfer contacts 3–2–CCB–8 and make contacts 3–CA–3. During the second revolution of distributor 511, the distributor is coded for the character E insofar as positions 5 of arcs 4 through 8 are strapped to lead 3–5–SLCL in the same manner as position 4 of arcs 4 through 8 whereby lead 5–3–PBC1 is connected to lead 3–5–SLCL in the same manner as previously described for the generation of the E character in the call directing code sequence B–E–Letters.

The impression of the character A on the sending loop closes contacts 713 of sequential selector 703 whereby slow-to-operate relay 7–TSP operates during the second revolution of distributor 511 and locks via contacts 7–TSP–3, 7–2–CCA–2, 7–AD–2, 7–4–RSA–13, and 7–6–AR–1. Relay 7–TSP operated opens the previously described discharge path for condenser 643 via contacts 6–7–TSP–2 whereby condenser 643 starts to charge. In addition, relay 7–TSP operated further opens the previously described operating path for relay 2–IC via contacts 4–7–TSP–1.

For the third revolution of distributor 511, the distributor is coded for the character Letters in the same manner as previously described for the generation of the Letters character in the call directing code sequence B–E–Letters. During the generation of the start pulse of the Letters character, relay 2–CCB releases in the same manner as previously described and relay 2–CCB released opens the energizing path for clutch magnet 512 via contacts 5–2–CCB–7. During the generation of the fifth intelligence pulse of the Letters character, relay 2–CCC releases in the same manner as previously described. Relay 2–CCC released does not recomplete the previously described operating path for relay 2–IC at this time insofar as the operating path of relay 2–IC is open via break contacts 4–7–TSP–1 whereby selector 301 does not resume stepping.

The push-button circuit now stops and waits for an answerback from the station called by the call directing code sequence. If no answerback is received within two seconds the push-button circuit again generates the call directing code sequence. If an answerback is received selector 301 resumes stepping.

In the event that no answerback is received within two seconds, condenser 643 charges sufficiently to fire tube 647 which in turn operates relay 6–P2 in the same manner as previously described and relay 6–P2 locks via contacts 6–P2–1, 6–2–CCA–1, 6–3–RN–1, 6–7–TSP–4 and 6–4–RSA–12 and the normally closed contacts of key 635. Relay 6–P2 operated completes a path from ground via make contacts 7–6–P2–3, make contacts 7–3–CD–8, the break contacts of continuity contacts 7–ALA–1, the winding of relay 7–ALA of the alarm relay chain 7–ALA and 7–ALB, and resistance 739 to battery operating relay 7–ALA which locks via the make contacts of continuity contacts 7–ALA–1 and break contacts 7–2–IC–2. In addition, relay 6–P2 operated completes a path from ground via make contacts 5–6–P2–4, break contacts 5–7–ALB–1, make contacts 5–3–CD–9, the make contacts of transfer contacts 5–3–TR–2 and the winding of clutch magnet 512 to battery releasing distributor 511.

The push-button circuit again generates the call directing code sequence A–E–Letters in the same manner as previously described. During the first revolution of distributor 511, relay 2–CCA operates as previously described. Relay 2–CCA operated opens the previously described locking path for relay 6–P2 via contacts 6–2–CCA–1 and opens the previously described locking path for relay 7–TSP via contacts 7–2–CCA–2 whereby relays 7–TSP and 6–P2 release. Relay 7–TSP released recompletes the previously described discharge path for condenser 643 via contacts 6–7–TSP–2. Relay 6–P2 released opens a path applying shunting ground to a winding of relay 7–ALB via make contacts 7–6–P2–3, make contacts 7–3–CD–8 and the break contacts of transfer contacts 7–ALB–2 whereby relay 7–ALB operates due to current from ground via break contacts 7–2–IC–2, the make contacts of continuity contacts 7–ALA–1, the winding of relay 7–ALB and resistance 741 to battery.

The impression of the character A on the sending loop operates relay 7–TSP during the second revolution of distributor 511 and relay 7–TSP locks in the same manner as previously described. Relay 7–TSP operated opens the previously described discharge path for condenser 643 via contacts 6–7–TSP–2.

If no answerback is received after the transmission of the call directing code sequence for the second time, tube 647 fires operating relay 6–P2. Relay 6–P2 operated applies shunting ground to a winding of relay 7–ALA via make contacts 7–6–P2–3, make contacts 7–3–CD–8 and the make contacts of transfer contacts 7–ALB–2 whereby relay 7–ALA releases. Relay 7–ALA released completes a holding path for relay 7–ALB via the break contacts of continuity contacts 7–ALA–1, make contacts 7–3–CD–8 and make contacts 7–6–P2–3. In addition, relay 7–ALA completes a path from ground via make contacts 7–ALB–3, break contacts 7–ALA–2, make contacts 7–3–CD–10, make contacts 7–TSP–5 and the winding of relay 7–OLA to battery operating relay 7–OLA which locks and energizes buzzer 723 and lamp 733 or lamp 735 in the same manner as previously described. In addition, relay 7–ALA released completes a path from ground via contacts 7–ALB–3, contacts 7–ALA–2, break contacts 7–FL–1 and the winding of relay 7–FLA, of the flip-flop relays 7–FLA and 7–FL, to battery operating relay 7–FLA. Relay 7–FLA operated completes a path from ground via contacts 7–ALB–3, 7–ALA–2, make contacts 7–FLA–1 and the winding of relay 7–FL to battery operating relay 7–FL. Relay 7–FL operated opens the previously described operating path for relay 7–FLA via contacts 7–FL–1 whereby relay 7–FL releases and relay 7–FLA released opens the previously described operating path for relay 7–FL via contacts 7–FLA–1 whereby relay 7–FL releases. The release of relay 7–FL recompletes the previously described operating path for relay 7–FLA and relay 7–FLA and 7–FL will alternately operate and release in the same manner as previously described. In addition, relay 7–FLA while operated completes a path applying shunting ground to station 2, lamp 222 via make contacts 3–7–FLA–2, the wiper and position 5 of arc 3 of selector 301, lead 3–2–PBRH2 and make contacts 2–PBR2–1 periodically deenergizing lamp 222 whereby lamp 222 flashes.

This alarm can be canceled by either omitting the station failing to send the answerback or by abandoning the call. The station can be omitted by operating alarm release key 635 which opens the previously described locking path for relay 6–P2 releasing relay 6–P2 and completes the previously described operating path for relay 6–AR. Relay 6–P2 released opens the previously described operating paths for relays 7–FLA and 7–FL releasing the relays. In addition, relay 6–P2 released opens the previously described holding path for relay 7–ALB whereby relay 7–ALB releases. Relay 6–AR operated opens the previously described locking paths for relays 7–TSP and 7–OLA via contacts 7–6–AR–1 whereby relays 7–TSP and 7–OLA release. Relay 7–TSP released recompletes the previously described operating path for relay 2–IC via contacts 4–7–TSP–1 and relay 2–IC operated recompletes the previously described energizing path for step magnet 303 via contacts 3–2–IC–1 whereby selector 301 resumes stepping.

Line reset key 419 is operated if the operator decides to abandon the call. Operation of key 419 operates relay 4–RS as previously described and relay 4–RS completes the previously described operating path for relay 3–RN. Relay 3–RN operated returns the push-button circuit to normal by stepping the wipers of selector 301 to position 51 in the same manner as previously described. In addition, as previously described, the operation of relay 4–RS initiates the generation of the end-of-address code sequence and the end-of-message code sequence and relay 4–RSA subsequently operates whereby relays 6–P2, 7–TSP, 7–OLA, 7–BLD and 7–RA are released if they had been previously operated. Relay 6–P2 released releases relay 7–FL, 7–FLA and 7–ALB if they had been previously operated.

Assuming now that the acknowledging answerback is received after the first or second transmission of the call directing code sequence A-E-Letters, the armature of relay 6–LR is operated to the spacing contact operating relay 7–AD which in turn releases relays 7–RA and 7–TSP as previously described. Relay 7–TSP released completes the previously described discharge path for condenser 643 via contacts 6–7–TSP–2. In addition, relays 7–RA and 7–TSP released complete the previously described operating path for relay 2–IC via contacts 4–7–RA–1 and 4–7–TSP–1. Relay 2–IC operated opens the previously described holding paths for relays 7–ALA and 7–ALB and these relays release if they had been previously operated. Relay 2–IC operated also completes the previously described energizing path for step magnet 303 via contacts 3–2–IC–1 energizing step magnet 303 which closes interrupter contacts 305 completing the operating path for relay 3–SD. Relay 3–SD operated opens the energizing path for step magnet 303 and the wipers of selector 301 resumes stepping thus opening the previously described operating path for relay 3–CA via the wiper and position 5 of arc 1 of selector 301 and relay 3–CA releases.

Insofar as it is assumed that push-button 20 was operated whereby relay 2–PBR20 is operated, the wiper of arc 2 of selector 301 does not find holding ground for relay 3–SD until the wiper steps to position 23. Insofar as holding ground is applied to position 23 via break contacts 3–RN–5 and make contacts 3–2–PBR20–2, relay 3–SD is maintained operated when the wipers of selector 301 step to position 23 and selector 301 stops stepping. With the wipers on position 23 an operating path for relay 3–CA is completed via the wiper and position 23 of arc 1 of selector 301 operating relay 3–CA. In addition a path is completed from ground via contacts 3–RN–5 and 3–2–PBR20–2, position 23 and the wiper of arc 2 of selector 301, contacts 3–SD–2, interrupter contacts 307, lead 3–5–PBCM, contacts 5–3–DCC–1 and 5–3–TR–2 and the winding of clutch magnet 512 to battery releasing distributor 511 for rotation. At this time the push-button circuit generates the twentieth call directing code sequence employing the same circuit action as previously described for the generation of the second call directing code sequence A-E-Letters with the exception that the second character of the call directing code sequence is determined by the strapping of position 23 of arcs 4 through 8 of selector 301. When the answerback is received or, if no answerback is received, the station is omitted by operator action, the wipers of selector 301 resume stepping as previously described opening the operating path of relay 3–CA via position 23 and the wiper of arc 1 whereupon relay 3–CA releases.

The next action of the push-button circuit is to send the end-of-address code sequence carriage return-line feed and start the transmitter-distributor that has been prepared by the insertion of tape and the operation of start 1 key 237 or start 2 key 239.

When the wiper of arc 2 steps to position 41 it finds holding ground for relay 3–SD supplied by way of contacts 3–RN–5 maintaining relay 3–SD operated whereupon selector 301 stops stepping. With the wipers on position 41 shunting ground is applied to a winding of relay 3–CDP by way of the wiper and position 41 of arc 1 releasing relay 3–CDP which in turn opens the operating path of relay 3–CD by way of contacts 3–CDP–2 releasing relay 3–CD. In addition, the ground on position 41 of arc 2 of selector 301 is applied via the wiper of arc 2 to the winding of clutch magnet 512 in the same manner as previously described releasing distributor 511 for rotation.

At this time distributor 511 is coded for the character Carriage Return insofar as lead 5-3-PBC4 is connected to lead 3-5-SLCL via the break contacts of transfer contacts 3-CD-4 and the wiper and position 41 of arc 7 of selector 301. During the transmission of the start pulse of the character Carriage Return auxiliary contacts 213 close completing a path from ground via contacts 213, the make contacts of transfer contacts 2-3-TR-3, the break contacts of transfer contacts 2-3-CD-6, lead 2-3-SLSL and the winding of step magnet 303 to battery. During the generation of the fifth intelligence pulse of the character Carriage Return contacts 213 reopen opening the previously described energizing path for step magnet 303 whereupon the wipers of selector 301 step to position 42. At position 42 the holding ground for relay 3-SD and the energizing path for clutch magnet 512 is maintained via the wiper and position 42 of arc 2 of selector 301 maintaining relay 3-SD operated and releasing distributor 511 for a second rotation.

At this time distributor 511 is coded for the character Line Feed insofar as lead 5-3-PBC2 is connected to lead 3-5-SLCL via the break contacts of transfer contacts 3-CD-3 and the wiper and position 42 of arc 5 of selector 301. During the generation of the start pulse of the character Line Feed auxiliary contacts 213 close completing the previously described energizing path for step magnet 303. During the transmission of the fifth intelligence pulse of the character Line Feed contacts 213 reopen opening the previously described energizing path for step magnet 303 whereupon the wipers of selector 301 step to position 43. With the wipers of selector 301 at position 43, the holding path for relay 3-SD and the energizing path for clutch magnet 512 is maintained closed via the wiper and position 43 of arc 2 of selector 301 whereby relay 3-SD is maintained operated and distributor 511 is released for a third rotation. With the wipers of selector 301 on position 43 a path is completed via the wiper and position 43 of arc 1, make contacts 3-2-PB-6, break contacts 3-6-ST-11 and the winding of relay 3-TR to battery maintaining relay 3-TR operated.

For the third revolution of distributor 511 the distributor is coded for the character Letters insofar as leads 5-3-PBC1 through 5-3-PBC5 are connected to lead 3-5-SLCL via the break contacts of transfer contacts 3-CD-1 through 3-CD-5 and the wipers and positions 43 of arcs 4 through 8 of selector 301. During the generation of the start pulse of the Letters character auxiliary contacts 213 close completing the previously described energizing path for step magnet 303.

The impression of the end-of-address code sequence Carriage Return-Line Feed on the sending loop opens contacts 719 of sequential selector 703 during the transmission of the Letters character releasing relay 7-EMO which in turn releases relay 7-BLD as previously described. In addition, relay 7-EMO released opens one of the previously described operating paths for relay 3-TR via contacts 3-7-EMO-10.

During the generation of the fifth intelligence pulse of the Letters character contacts 213 open opening the previously described energizing path for step magnet 303 whereupon the wipers of selector 301 step to position 44 opening the energizing path for clutch magnet 512 and the previously described operating path for relay 3-TR via the wiper and position 43 of arc 1. Relay 3-TR released transfers the leads of distributor 511 from the push-button circuit back to the coding circuit and completes the previously described shunting path for distributor 511 via contacts 6-3-TR-10. In addition, relay 3-TR released prepares the operating circuit for relay 6-ST via contacts 6-3-TR-1 whereupon the central station circuit may initiate a new polling cycle. Relay 3-TR released also completes the previously described energizing path for start magnet 201 or 207 thus starting the No. 1 transmitter-distributor if relay 4-SM1 is operated or starting the No. 2 transmitter-distributor if relay 4-SM2 is operated.

With the wipers of selector 301 on position 44 shunting ground is applied to a winding of relay 3-PB via the wiper and position 44 of arc 1 and lead 3-2-PBRL releasing relay 2-PB which in turn opens the operating paths for relays 2-PBR1 through 2-PBR20 and the energizing paths for station 1 through 20 lamps releasing relays 2-PBR1, 2-PBR2 and 2-PBR20 and de-energizing lamps 221, 222 and 223. In addition, relay 2-PB released opens the previously described locking paths for relays 2-ST1 and 2-ST2 releasing the relay which is operated. Relay 2-PB released also opens the operating and locking path for relay 4-PBA via contacts 4-2-PB-5 releasing relay 4-PBA.

Insofar as position 44 of arc 2 of selector 301 is not supplied holding ground for relay 3-SD, the relay releases re-energizing step magnet 303 via contacts 3-2-IC-1 and 3-SD-1, stepping the wipers 301 to position 45 in the same manner as previously described. With the wipers of selector 301 on position 45, a path is completed from ground via the wiper and position 45 of arc 1 and the winding of directing code complete relay 3-DCC to battery operating relay 3-DCC which in turn further opens the previously described energizing path for step magnet 512 via the break contacts of transfer contacts 5-3-DCC-1. Insofar as position 45 of arc 2 of selector 301 is not supplied holding ground for relay 3-SD, the wipers of selector 301 step to position 46 where holding ground is supplied via contacts 3-RN-5 to position 46 of arc 2 maintaining relay 3-SD operated and thus stopping the stepping of the wipers of selector 301. At position 46 the operating path for relay 3-DCC is maintained via the wiper and position 46 of arc 1 of selector 301.

The text of the message is now transmitted from the started transmitter-distributor and the wipers of selector 301 are maintained on position 46 during the transmission of the message text. At this time the operator may address a new message by operating the appropriate pushbuttons and start key 237 or 239. This as previously described will operate relays 2-PB, 2-ANK, 4-PBA and 2-ST1 or 2-ST2 and the appropriate call directing code sequences will be generated during the next successive stepping of the wipers of selector 301 through positions 1 through 23.

At the termination of the transmission of the message text, the end-of-message sequence is transmitted by the sending transmitter-distributor whereupon the pushbutton circuit returns to normal. The impression of the end-of-message code sequence, Figures-H-Letters, on the sending loop closes contacts 717 of sequential selector 703 operating relay 7-EMO as previously described. Relay 7-EMO operated completes a path from ground via contacts 717, make contacts 7-EMO-12, the break contacts of transfer contacts 7-4-RS-12, lead 7-3-RNOL, break contacts 3-2-PST-4 and the winding of relay 3-RN to battery operating relay 3-RN. Relay 3-RN operated opens the path applying shunting ground to the winding of relay 2-PST via contacts 2-3-RN-4 operating relay 2-PST which in turn releases relay 2-IC. With relay 3-RN operated, the wipers of selector 301 proceed to step to position 51 as previously described whereupon relay 3-RN releases and the push-button circuit is in the normal waiting condition.

If the alternate transmitter-distributor is supplied with tape it will now send under the control of the central station circuit or if only the sending transmitter-distributor is supplied with tape the sending transmitter will continue to send as previously described. If the call directing code sequences of the next message are to be inserted and appropriate push-buttons are operated during the transmission of the text of the previous message, relay 7–EMO operated operates relay 3–TR whereby the call directing codes of the next message are generated by the push-button circuit as previously described.

If each message is punched on individual pieces of tape, the circuit is arranged to insert the end-of-message code sequence if the tape runs out of the sending transmitter-distributor without sending the end-of-message code sequence. Assuming the end-of-message code sequence has not been transmitted and the sending transmitter-distributor runs out of tape, relay 2–TP1 or 2–TP2 release as previously described opening the discharge path of condenser 643. After about two seconds tube 647 fires operating relay 6–P2. Relay 6–P2 operated completes a path from ground via make contacts 3–6–P2–5, break contacts 3–2–PST–5, normally closed contacts 317, break contacts 3–6–ST–11 and the winding of relay 3–TR to battery operating relay 3–TR. Relay 3–TR operating completes a path from ground via make contacts 5–6–P2–4, break contacts 5–7–ALB–1, the make contacts of transfer contacts 5–3–DCC–1, the make contacts of transfer contacts 5–3–TR–2 and the winding of clutch magnet 512 to battery releasing distributor 511 for rotation.

For the first revolution of distributor 511, the distributor is coded for the character Figures insofar as leads 5–3–PBC1 through 5–3–PBC5 are connected to the wipers of arcs 4 through 8 of selector 301 via the break contacts of transfer contacts 3–CD–1 through 3–CD–5 and positions 46 of arcs 4, 5, 7 and 8 are strapped to lead 3–5–SLCL. During the generation of the start pulse of the character Figures, distributor auxiliary contacts 213 close completing the previously described energizing path for step magnet 303. During the generation of the fifth intelligence pulse of the character Figures contacts 213 open opening the previously described energizing path for step magnet 303 whereupon the wipers of selector 301 step to position 47 and thus open the previously described operating path for relay 3–DCC via the wiper and position 46 of arc 1 of selector 301 releasing relay 3–DCC which in turn opens the energizing path for clutch magnet 512 via the make contacts of transfer contacts 5–3–DCC–1.

With the wipers of selector 301 on position 47 the previously described holding path for relay 3–SD and the previously described energizing path for clutch magnet 512 are completed via the wiper and position 47 of arc 2 maintaining relay 3–SD operated and releasing distributor 511 for a second rotation.

Distributor 511 is coded for the character H for the second rotation insofar as positions 47 of arcs 6 and 8 of selector 301 are strapped to lead 3–5–SLCL. During the generation of the start pulse of the character H auxiliary contacts 213 close completing the previously described energizing path for step magnet 303. During the generation of the fifth intelligence pulse of the character H contacts 213 reopen opening the previously described energizing path of step magnet 303 whereby the wipers of selector 301 step to position 48. With the wipers of selector 301 on position 48 the holding path for relay 3–SD and the energizing path for clutch magnet 512 are maintained via the wiper and position 48 of arc 2 of selector 301 maintaining relay 3–SD operated and releasing distributor 511 for a third rotation.

For the third rotation distributor 511 is coded for the character Letters insofar as positions 48 of arcs 4 through 8 are strapped to lead 3–5–SLCL. During the generation of the start pulse of the Letters character contacts 213 close completing the previously described energizing path for step magnet 303. During the generation of the fifth intelligence pulse of the Letters character contacts 213 reopen opening the previously described energizing path for step magnet 303 stepping the wipers of selector 301 to position 49.

With the wipers of selector 301 on position 49, the previously described path via the wiper and position 49 of arc 1 of selector 301 and the winding of relay 3–RN is completed operating relay 3–RN. Relay 3–RN operated opens the previously described locking path for relay 6–P2 via contacts 6–3–RN–1 releasing relay 6–P2. In addition relay 3–RN operated opens the previously described path applying shunting ground to relay 2–PST via contacts 2–3–RN–4 and relay 2–PST operates as previously described. Relay 6–P2 released opens the previously described operating path for relay 3–TR via contacts 3–6–P2–5 and relay 3–TR releases. Relay 2–PST operated opens the previously described operating path for relay 2–IC via contacts 2–PST–2 releasing relay 2–IC. With relay 3–RN operated the wipers of selector 301 continue to step to position 51 whereupon relay 3–RN releases as previously described returning the push-button circuit to the normal waiting condition. In addition the impression of the code sequence Figures-H-Letters on the sending loop operates relay 7–EMO as previously described whereupon the central station circuit is prepared to send the next message.

If continuous tape operation is employed, it is undesirable to insert the end-of-message code sequence Figures-H-Letters if tape-out occurs. A teletypewriter alarm locking key is provided under these circumstances to stop the sending transmitter-distributor and raise an alarm if tape-out occurs whereupon operator action is required to resume the transmission of the message or abandon the message. The teletypewriter alarm key is provided with normally closed contacts 317 and normally open contacts 743.

Assuming the teletypewriter alarm key is operated and locked and tape-out or tape trouble occurs, relay 2–TP1 or 2–TP2 releases as previously described thus opening the previously described discharge path for condenser 643 via contacts 6–2–TP1–4 or 6–2–TP2–4. After about two seconds tube 647 fires operating relay 6–P2. Relay 6–P2 operated completes a path from ground via make contacts 7–6–P2–3, the normally open contacts 743 of the teletypewriter alarm key, make contacts 7–3–DCC–2, the break contacts of transfer contacts 7–RA–5 and the winding of relay 7–OLA to battery operating relay 7–OLA. As previously described relay 7–OLA operated opens the energizing path of start magnets 201 and 207, completes the energizing path of buzzer 723 and completes the energizing path of lamp 733 or 735 thus stopping the sending transmitter-distributor and raising the audible and visual alarms. The operator may continue the transmission of the message by resetting the tape and operating the alarm release key 635 or may abandon the message by operating the line reset key 419 as previously described.

The push-button circuit is provided with a non-locking cancel address key whereby the operator may cancel the call directing code sequences stored on relays 2–PBR1 through 2–PBR20 before the push-button circuit starts to generate the call directing code sequences. The cancel address key is provided with normally closed contacts 233. It is undesirable to cancel the address sequences if start key 237 or 239 has been operated.

Assuming the call directing code sequences are stored in the push-button circuit whereby relays 2–PB, 2–ANK, 2–ST1 or 2–ST2, 2–PBA and selective ones of relays 2–PBR1 through 2–PBR20 are operated as previously described. The momentary operation of the cancel address key opens contacts 233 thereby opening the previously described locking path for relay 2–PB releasing relay 2–PB. Relay 2–PB released opens the previously described operating and locking path for relay 2–PBA releasing relay 2–PBA. In addition, relay 2–PB released opens the previously described locking paths for relays 2–PBR1 through 2–PBR20 releasing the relays that are operated and returning the push-button circuit to its initial condition.

The outlying station

As previously described central station signals are impressed across the sending loop, Fig. 7, which extends to each outlying station, a typical outlying station being shown in Fig. 8. In addition, the central station receives signals impressed across the receiving loop, Fig. 7, which also extends to each outlying station.

The winding of select magnet 801 of the outlying station incoming sequential selector, generally indicated by block 803, and the winding of biased receiving line relay 8-RR are in series with the sending loop whereby selector magnet 801 and relay 8-RR follow the central station signals impressed on the sending loop. Sequential selector 803 includes normally closed contacts 805 which are opened by the reception of the transmitter start code sequence, for example Figures-Letters-Figures-Figures, and are reclosed by the reception of any subsequent character; normally closed contacts 807 and normally open contacts 809 which are opened and closed respectively by the reception of the code sequence Figures-Letters-Figures-Figures-Blank and reclosed and reopened by the reception of any subsequent character; normally closed contacts 811 which are opened by the reception of the blank shift code sequence blank followed by Figures or Letters and reclosed by the reception of any subsequent character; normally closed contacts 813 which are opened by the reception of the code character Figures or Letters and reclosed by the reception of any subsequent character; normally closed contacts 815 and normally open contacts 817 which are opened and closed respectively by the reception of the character upper case S designating the standby code sequence Figures-S and reclosed and reopened by the reception of any subsequent character; normally open contacts 819 which are momentarily closed by the reception of any code character; and normally closed contacts 821 and normally open contacts 823 which are opened and closed respectively by the reception of the code character Blank and reclosed and reopened by the reception of any subsequent character. In addition, the reception of the end-of-message code sequence Figures-H-Letters by selector magnet 801 places sequential selector 803 in the select condition and momentarily opens normally closed contacts 825. During the select condition, the reception of the call directing code sequence, for example AE, momentarily opens normally closed contacts 827 and momentarily closes normally open contacts 829 and the reception of the request answerback code character K opens and locks normally closed contacts 831. The reception of the end-of-address code sequence Carriage Return-Line Feed places sequential selector 803 in the non-select condition and recloses contacts 831.

Sequential selector 803 also includes a printing unit and print suppress mechanism, not shown, wherein the print suppress mechanism normally blocks the printing unit. Receipt of an appropriate call directing code sequence, for example BE, by selector magnet 801 during the select condition of sequential selector 803 disables the print suppress mechanism and the printing unit prints the subsequent characters received by selector magnet 801. The subsequent reception of the end-of-message code sequence Figures-H-Letters re-enables the print suppress mechanism thus reblocking the printing unit. The printing unit and the print suppress mechanism may be of the type described in Patent No. 2,666,095, granted to W. J. Zenner on January 12, 1954. The disclosure of this patent is hereby incorporated herein by reference as though fully set forth herein.

The grounded armature of line relay 8-RR is normally operated to its marking contact which in turn is connected to battery via the winding of selector magnet 833 of a printer-perforator generally indicated by block 835 whereby printer-perforator 835 prints the signals received from the central station. Printer-perforator 835 is normally blinded to incoming signals insofar as selector magnet 833 is maintained in the idle marking condition by current from battery via the winding of selector magnet 833 and break contacts 8-DC-1, or break contacts 8-ESC-1 in shunt thereto, to ground.

The winding of biased transmitter monitor line relay 8-TM, transmitter contacts 837 of the outlying station transmitter-distributor, generally indicated by block 839, and break contacts 8-VG-1 are in series with the central station receiving loop whereby transmitter-distributor 839 and relay 8-VG operated, as described hereinafter, impress signals on the receiving loop and relay 8-TM follows signals impressed on the receiving loop. Transmitter-distributor 839 includes start magnet 841, normally open tape-out contacts 843, which close when transmitter-distributor 839 is supplied with tape, and normally closed sixth pin contacts 845, which open during the sensing pin cycle if the tape is torn.

The grounded armature of relay 8-TM is normally operated to its marking contact which, in turn, is connected to battery via the winding of selector magnet 847 of the outlying station outgoing sequential selector, generally indicated by block 849, whereby sequential selector 849 follows the signals impressed on the receiving loop. Sequential selector is normally blinded to the signals on the receiving loop, however, insofar as selector magnet 847 is maintained in the idle marking condition by current from battery via the winding of selector magnet 847 and break contacts 8-KR-1, or break contacts 8-TS-1 in shunt thereto, to ground. Sequential selector 849 includes normally closed contacts 851 which momentarily open in response to the end-of-message code sequence Figures-H-Letters.

In the initial condition with the battery turned on at the outlying station a path is completed from ground via normally closed contacts 831 of sequential selector 803 and the winding of K response relay 8-KR to battery operating relay 8-KR. In addition, a path is completed from ground via normally closed contacts 807 and 805 of sequential selector 803, break contacts 8-TA-1 and the winding of skip relay 8-SK to battery operating relay 8-SK which locks via make contacts 8-SK-1 which shunt contacts 8-TA-1 in the previously described operating path for relay 8-SK.

In the initial condition, a path is also completed from ground via break contacts 8-PCA-1, break contacts 8-TS-2, diode 853, break contacts 8-ESC-2 and the winding of bid control relay 8-BC to battery operating relay 8-BC which locks via make contacts 8-BC-1 and normally closed contacts 811, or diode 855 and normally closed contacts 813 in shunt thereto. A path is also completed from ground via normally closed contacts 807 and 805 and the winding of slow-to-release transmitter answerback relay 8-TA to battery operating relay 8-TA. Relay 8-TA operated opens the previously described operating path for relay 8-SK via contacts 8-TA-1.

In addition, in the initial condition a path is completed from ground via normally closed contacts 813 and 815, break contacts 8-TS-3 and the winding of slow-to-release emergency stop control relay 8-ESC to battery operating relay 8-ESC which locks via make contacts 8-ESC-3 and normally closed contacts 811, or diode 855 and normally closed contacts 813. Relay 8-ESC operated opens the previously described operating path for relay 8-BC via contacts 8-ESC-2 and opens the previously described energizing path for selector magnet 833 unblinding printer-perforator 855 if relay 8-DC is operated, as described hereinafter. A path is also completed from ground via normally closed contacts 813 and 821 and the secondary winding of biased valid start relay 8-VS to battery, overcoming the current from battery via the primary winding of relay 8-VS to ground, operating relay 8-VS which locks via normally closed contacts 821 and make contacts 8-VS-1. Relay 8-VS operated completes a holding path for relay 8-BC via contacts 8-BC-1, diode 855 and contacts 8–VS–1 and completes a holding path for relay 8–ESC via contacts 8–ESC–3, diode 855 and contacts 8–VS–1.

*The outlying station sends a message*

To send a regular message from the outlying station to the central station and place the outlying station in a bidding condition, the outlying station operator supplies a message tape to transmitter-distributor 839. Supplying tape to transmitter-distributor 839 closes tape-out contacts 843 completing a path from ground via contacts 845 and 843 and the winding of transmitter control relay 8–TC to battery. In addition, a path is completed from ground via contacts 845 and 843 and bid lamp 856 to battery energizing lamp 856 thus indicating that the station is bidding for an opportunity to transmit a message.

The central station initiates a polling cycle by impressing on the sending loop the emergency stop code sequence Blank followed by a two-character pause and Figures or Letters and then, after a four-character delay, sending the transmitter start code sequences. The reception of the character Blank by selector magnet 801 momentarily closes contacts 819 shunting contacts 821 in the previously described operating and locking path for relay 8–VS. In addition, sequential selector 803 opens contacts 821 in response to the code character Blank. Contacts 819 subsequently reopen opening the operating and locking path of relay 8–VS. Relay 8–VS is maintained operated, however, by capacitor 857 discharging via the secondary winding of relay 8–VS, the discharge current decreased exponentially as determined by the capacitance of capacitor 857 and the resistance of the secondary winding of relay 8–VS.

During the two-character pause following the reception of the Blank character, the current through the primary winding of relay 8–VS becomes dominant and the relay releases. Relay 8–VS released opens the previously described holding paths for relays 8–BC and 8–ESC via contacts 8–VS–1.

The reception of the Figures or Letters character in the emergency stop code sequence opens contacts 813 opening the previously described operating paths of relays 8–VS and 8–ESC and one of the previously described locking paths for relays 8–BC and 8–ESC. In addition, contacts 811 open opening the other previously described locking paths for relays 8–BC and 8–ESC releasing relay 8–BC. The reception of the Figures or Letters character also recloses contacts 821.

During the four-character delay, after the emergency stop code sequence, slow-to-release relay 8–ESC releases completing the previously described blinding path for selector magnet 833 of printer-perforator 835 via contacts 8–ESC–1. Relay 8–ESC released also completes the previously described operating path for relay 8–BC via contacts 8–ESC–2 and relay 8–BC reoperates.

The central station now polls the outlying stations for priority messages sequentially sending the transmitter start code sequences and pausing for replies. The reception of the next Figures or Letters character in the transmitter start code sequences recloses contacts 811 and thus recompletes the previously described locking path for relay 8–BC.

The reception of the transmitter start code sequence individual to the outlying station opens contacts 805 opening the previously described operating paths for relays 8–SK and 8–TA whereby relay 8–SK releases. During the following pause, while the central station is waiting for the reply, slow-to-release relay 8–TA releases opening a discharge path for condenser 859 via break contacts 8–WC–1 or 8–PCA–2 in shunt thereto, make contacts 8–TA–2 and contacts 827 or the make contacts of continuity contacts 8–KR–2 in shunt thereto. With the discharge path of condenser 859 open, charging current flows from battery via resistance 861, capacitance 859 and the secondary winding of biased V generator relay 8–VG to ground, the current decreasing exponentially as determined by the capacitance of capacitor 859 and the resistances of resistance 861 and the secondary winding of relay 8–VG. Relay 8–VG is normally maintained released by current from battery via the break contacts of continuity contacts 8–PCA–3, potentiometer 863, and the primary winding of relay 8–VG to ground. The charging current through capacitor 859 operates relay 8–VG for two selective units as determined by the adjustment of potentiometer 863. Relay 8–VG operated opens the central station receiving loop via break contacts 8–VG–1 for two selective units thus impressing a simulated start-stop character V on the receiving loop indicating that no priority message is available.

Returning now to relay 8–TA released, a path is completed from ground via break contacts 8–PCA–1, break contacts 8–TS–2, break contacts 8–TA–3, the winding of slow-to-operate relay 8–PCA, make contacts 8–TC–1 and the winding of poll count relay 8–PC to battery operating relay 8–PC which locks via make contacts 8–PC–1, make contacts 8–BC–2, contacts 851 of sequential selector 849 and the normally closed contacts of alarm release key 865. The shunting ground applied to the winding of relay 8–PCA via contacts 865 and 851, make contacts 8–BC–2 and make contacts 8–PC–1 maintain relay 8–PCA released.

In the event that the outlying station is on skip, the central station does not pause for reply after transmitting the transmitter start code sequence whereby the reception of the next character recloses contacts 805 before relay 8–TA releases. With contacts 805 closed and relay 8–TA operated, a path is completed from ground via contacts 807 and 805, break contacts 8–SK–2 and skip lamp 867 to battery energizing lamp 867 and thus indicating that the station is on skip. Lamp 867 remains energized until the outlying station is again polled for traffic.

After the outlying station sends the no-traffic response signal, the central station recontinues polling, reclosing contacts 805 whereby relays 8–SK and 8–TA operate in the same manner as previously described. Relay 8–TA operated recompletes the previously described discharge path for condenser 859 via contacts 8–TA–2 and opens the previously described operating path for relay 8–PC via contacts 8–TA–3 thus removing ground from a winding of relay 8–PCA. Insofar as a path is completed from ground via contacts 865 and 851, make contacts 8–BC–2, make contacts 8–PC–1, make contacts 8–TC–1, the winding of slow-to-operate relay 8–PCA and resistance 869 to battery, relay 8–PCA operates. Relay 8–PCA operated further opens the previously described operating path for relay 8–PC via contacts 8–PCA–1. In addition, relay 8–PCA operated transfers the current path for the primary winding of relay 8–VG from the break contacts of continuity contacts 8–PCA–3 and potentiometer 863 to the make contacts of continuity contacts 8–PCA–3 and potentiometer 871.

In the event that another outlying station has message material and returns a traffic-available response, the central station starts the transmitter-distributor of the other outlying station by sending the blank shift code sequence Blank followed by Figures or Letters. The reception of the character Blank momentarily closes contacts 819, recloses contacts 313 and opens contacts 821 completing previously described operating path for relay 8–VS via contacts 819 and 813 operating relay 8–VS which locks via contacts 8–VS–1. In addition, the previously described operating path for relay 8–ESC is completed via contacts 813 operating relay 8–ESC. Relay 8–ESC operated completes a supplementary locking path for relay 8–PC and a supplementary operating path for relay 8–PCA via make contacts 8–ESC–4 which shunt contacts 8–BC–2 in the previously described locking path for relay 8–PC and operating path for relay 8–PCA. The reception of the Figures or Letters character recloses contacts 821, opens contacts 813 and opens contacts 811. Relay 8–VS is maintained locked via contacts 821 and relays 8–ESC and 8–VS are maintained operated via contacts 8–VS–1. Relay 8–ESC operated also unblinds printer-perforator 835, if relay 8–DC is operated, as subsequently described.

When the other outlying station completes the message, the central station starts a new polling cycle and relays 8–BC and 8–ESC release as previously described. Relays 8–BC and 8–ESC released open the previously described locking path for relay 8–PC and operating path for relay 8–PCA via contacts 8–ESC–4 and 8–BC–2 releasing relays 8–PC and 8–PCA. The central station now proceeds to poll for the priority messages and the outlying station operates in the same manner as previously described.

If another outlying station transmitter-distributor is not started, the outlying station will next be polled for a regular message. Reception of the transmitter start code sequence opens contacts 805 and relays 8–SK and 8–TA release in the same manner as previously described. Relay 8–TA released opens the previously described discharge path for condenser 859 via contacts 8–TA–2 whereby charging current for condenser 859 is applied via the secondary winding of relay 8–VG. Insofar as relay 8–PCA remains operated if another station is not started, the current through the primary winding of relay 8–VG is determined by the resistance of potentiometer 871 and relay 8–VG operates for four selective units whereby the central station receiving loop is opened, via contacts 8–VG–1, for four selective units impressing a simulated traffic available start-stop character "O" on the loop.

The central station in response to the traffic available response character sends the blank shift code sequence to start transmitter-distributor 839. The reception of the Blank character at the outlying station recloses contacts 805, opens contacts 821, momentarily closes contacts 819 and recloses contacts 813 whereby relays 8–VS and 8–ESC reoperate and printer-perforator 835 is unblinded in the same manner as previously described. In addition, the reception of the Blank character closes contacts 809 and opens contacts 807 completing a path from ground via contacts 809, make contacts 8–PCA–4, break contacts 8–TA–4, make contacts 8–ESC–5 and the winding of transmitter start relay 8–TS to battery operating relay 8–TS which locks via make contacts 8–TS–4 and contacts 851 and 865. With relays 8–KR and 8–TS–1 operated, the energizing paths of selector magnet 847 via contacts 8–TS–1 and 8–KR–1 are open unblinding sequential selector 849. In addition, relay 8–TS operated completes a path from ground via the make contacts of transfer contacts 8–PCA–5, make contacts 8–TS–5, make contacts 8–KR–3 and the winding of start magnet 841 to battery starting transmitter-distributor 839.

The reception of the Figures or Letters character of blank shift code sequence recloses contacts 807 and 821 and reopens contacts 809 whereby relays 8–SK and 8–TA reoperate in the same manner as previously described. In addition, the reception of the Figures or Letters character opens contacts 811 and 813. Relays 8–VS, 8–BC and 8–ESC are maintained operated at this time via contacts 8–VS–1. The outlying station now proceeds to send the regular message.

The reception of the emergency stop code sequence Blank followed by a pause of two character lengths and Figures or Letters stops the outlying station transmitter-distributor and raises an audible alarm. The reception of the character Blank recloses contacts 811 and 813, if they are open, opens contacts 821 and momentarily closes contacts 819. The subsequent reopening of contacts 819 open the previously described operating and locking path of relay 8–VS and relay 8–VS releases during the pause following the reception of the Blank character. The reception of the Figures or Letters character opens contacts 811 and 813 opening the previously described operating path for relay 8–ESC and the previously described locking paths for relays 8–BC and 8–ESC and relay 8–BC and 8–ESC release as previously described. Relay 8–ESC released reblinds printer-perforator 835. In addition, relays 8–BC and 8–ESC released open the previously described operating and locking paths for relays 8–PCA and 8–PC respectively releasing relays 8–PC and 8–PCA. Relay 8–PCA released opens the previously described energizing path for start magnet 841 via the make contacts of transfer contacts 8–PCA–5 stopping transmitter-distributor 839. In addition, relay 8–PCA released completes a path from ground via the break contacts of transfer contacts 8–PCA–5, make contacts 8–TS–6, buzzer 873 and A.-C. source 881 to ground energizing buzzer 873.

To remove the alarm condition, the outlying station operator must reset the tape in the transmitter-distributor and momentarily operate nonlocking alarm release key 865. The operation of the alarm release key opens normally closed contacts 865 opening the previously described locking path for relay 8–TS and relay 8–TS releases. Relay 8–TS released opens the previously described energizing path for buzzer 873 via contacts 8–TS–6 de-energizing buzzer 873. In addition, relay 8–TS released completes the previously described energizing path for relay 8–BC via contacts 8–TS–2 and relay 8–BC reoperates. The removal of the tape from transmitter-distributor 839 opens tape-out contacts 843 releasing relay 8–TC and de-energizing bid lamp 856. With relay 8–ESC released and printer-perforator 835 blinded, the outlying station is prepared to receive subsequent supervisory code signals from the central station.

In the event that the sending loop goes open while the transmitter-distributor is sending, whereby the emergency stop code sequence cannot be received, an alarm is raised at the outlying station. An open line condition of the central station sending loop appears to select magnet 801 as a succession of Blank characters closing contacts 823 and thus completing a path from ground via contacts 813, contacts 823, make contacts 8–TA–5, make contacts 8–TS–6, buzzer 873 and A.-C. source 881 to ground energizing buzzer 873.

To remove the alarm condition the outlying station operator must momentarily operate alarm release key 865 stopping the outlying station transmitter-distributor. Operation of the alarm release key opens normally closed contacts 865 opening the previously described locking paths for relays 8–TS and 8–PC and the previously described operating path for relay 8–PCA releasing relays 8–TS, 8–PC and 8–PCA. Relay 8–TS released opens the previously described energizing paths for start magnet 841 and buzzer 873 stopping transmitter-distributor 839 and de-energizing buzzer 873. The outlying station operator must now reset the tape in the transmitter-distributor and the circuit awaits the reception of the following emergency stop code sequence.

In the event that the tape supplied to transmitter-distributor 839 runs out or is torn, contacts 843 or 845 open releasing relay 8–TC and de-energizing lamp 856 in the same manner as previously described. Relay 8–TC released opens the previously described operating path for relay 8–PCA via contacts 8–TC–1 releasing relay 8–PCA. Relay 8–PCA released stops transmitter-distributor 839 and energizes buzzer 873 in the same manner as previously described.

To remove the alarm condition, the outlying station operator momentarily operates alarm release key 865 releasing relays 8–PC and 8–TS de-energizing buzzer 873 in the same manner as previously described. If the central station does not receive incoming signals for twenty seconds, it initiates a new polling cycle sending out the emergency stop code sequence followed by the transmitter start code sequences. The outlying station in response to the reception of the code sequences of the new polling cycle operates in the same manner as described above.

When the transmission of the message from the outlying station is completed, the outlying station transmitter-distributor stops and the outlying station circuit is returned to its initial condition. At the end of the message, the end-of-message code sequence Figures-H-Letters is impressed on the central station receiving loop opening contacts 851 of sequential selector 849 as previously described. The opening of contacts 851 opens the previously described locking paths for relays 8–TS and 8–PC and the previously described operating path for relay 8–PCA releasing relays 8–TS, 8–PC and 8–PCA. Relay 8–TS released opens the previously described energizing path for start magnet 841 via contacts 8–TS–5 stopping transmitter-distributor 839. The outlying station circuit is now prepared to receive the new polling cycle.

In the event that the outlying station desires to send multiple messages, locking message key 875 is operated shunting contacts 851 in the previously described locking paths for relays 8–TS and 8–PC and the previously described operating path for relay 8–PCA. Thus relays 8–TS, 8–PC and 8–PCA are maintained operated when the end-of-message code sequence is impressed on the central station receiving loop whereby transmitter-distributor 839 continues to transmit until it runs out of tape. When the transmitter-distributor runs out of tape, relay 8–TC releases and in turn relay 8–PCA releases stopping transmitter-distributor 839 in the same manner as described above.

If the central station operator desires to send a priority message, transmitter-distributor 839 is supplied with tape operating relay 8–TC and the nonlocking priority key 877 is momentarily operated completing a path from ground via the normally open contacts of priority key 877 and the winding of priority relay 8–PR to battery operating relay 8–PR which locks via make contacts 8–PR–1 and break contacts 8–TS–7. Relay 8–PR operated completes a path from ground via contacts 8–TS–7 and 8–PR–1 and priority lamp 879 to battery energizing priority lamp 879 and thus indicating a priority message is supplied to transmitter-distributor 839. In addition, relay 8–PR operated completes a path from ground via contacts 865 and 851, make contacts 8–BC–2, make contacts 8–PR–2, and the winding of relay 8–PC to battery operating relay 8–PC. If at this time, the station is not being polled whereby relay 8–TA is operated removing the previously described shunting ground from the winding of relay 8–PCA via contacts 8–TA–3, relay 8–PCA operates in the same manner as previously described. With relay 8–PCA operated, the outlying station sends a traffic available response when relay 8–TA releases in response to the reception of the transmitter start code sequence polling for a priority message. The central station then sends the blank shift code sequence starting the outlying transmitter-distributor in the same manner as previously described. The operation of relay 8–TS in response to the reception of the blank shift code sequence opens the previously described locking path for relay 8–PR via contacts 8–TS–7 releasing relay 8–PR and de-energizing lamp 879. The outlying station circuit is now in the same condition as previously described for the transmission of a regular message.

*Outlying station standby condition*

If none of the outlying stations has a message available, the central station will complete two rounds of polling and then, following the transmission of the Figures character in the transmitter start code sequence of the last polled station, transmit the standby code character S to set the outlying stations in the standby condition. During the standby condition, the outlying station operator may remotely initiate a new polling cycle by inserting tape in the transmitter-distributor whereby a signal is sent to the central station indicating that a message is available at an outlying station.

The reception of the character S following the reception of the Figures character of the last transmitter start code sequence recloses contacts 813, opens contacts 815 and closes contacts 817 of sequential selector 803. A path is thus completed from ground via contacts 813 and 817, the break contacts of continuity contacts 8–ESC–6, make contacts 8–SK–3 and the winding of wait control relay 8–WC to battery operating relay 8–WC. Relay 8–WC operated completes a path from ground via contacts 811, make contacts 8–WC–2, break contacts 8–TS–3 and the winding of relay 8–ESC to battery operating relay 8–ESC which locks via contacts 8–ESC–3 as previously described. Relay 8–ESC operated unblinds printer-perforator 835 if relay 8–DC is operated. Relay 8–ESC operated also completes a locking path for relay 8–WC via make contacts 8–SK–3, the make contacts of continuity contacts 8–ESC–6 and make contacts 8–WC–4.

Returning now to relay 8–WC operated, a path is completed from ground via contacts 865 and 851, make contacts 8–BC–2 or 8–ESC–4 in shunt thereto, make contacts 8–WC–3 and the winding of relay 8–PC to battery operating relay 8–PC which locks via contacts 8–PC–1 as previously described. Relay 8–WC operated also opens one of the previously described discharge paths for condenser 859 via break contacts 8–WC–1. In addition, the closure of contacts 813 recompletes the previously described operating path for relay 8–VS and the relay locks via contacts 8–VS–1.

The central station now transmits a Figures or Letters character to shift the outlying station receivers to the proper case. The receipt of the shift character reopens contacts 817 in the previously described operating path for relay 8–WC, recloses contacts 815 and opens contacts 813. The outlying station circuit is now in the standby condition and will remain in this condition until a new polling cycle is started or the outlying station operator inserts tape in the transmitter-distributor.

The insertion of tape in transmitter-distributor 839 closes tape-out contacts 843 completing the previously described operating path for relay 8–TC. Relay 8–TC operated completes a path from ground via contacts 865 and 851, make contacts 8–BC–2 or 8–ESC–4 in shunt thereto, make contacts 8–WC–3 or 8–PC–1 in shunt thereto, make contacts 8–TC–1, winding of relay 8–PCA and resistance 869 to battery operating relay 8–PCA.

Relay 8–PCA operated opens the previously described discharge path for condenser 859 via contacts 8–PCA–2 and charging current flows through the second winding of relay 8–VG in the same manner as previously described. In addition, relay 8–PCA operated transfers the current path through the primary winding of relay 8–VG from the break contacts of continuity contacts 8–PCA–3 and potentiometer 863 to the make contacts of continuity contacts 8–PCA–3 and potentiometer 871. Relay 8–VG is thus operated for four selective units in the same manner as previously described whereby a traffic available response character O is impressed on the central station receiving loop.

The central station in response to the traffic available code character initiates a new polling cycle sending first the emergency stop code sequence. During the reception of the emergency stop code sequence at the outlying station, relays 8–VS, 8–BC and 8–ESC successively release in the same manner as previously described. Relays 8–BC and 8–ESC released open the previously described operating and locking paths for relays 8–PC and 8–PCA and these relays release. In addition, relay 8–ESC released opens the previously described locking path for relay 8–WC via the make contacts of continuity contacts 8–ESC–6 and relay 8–WC releases. With relays 8–ESC and 8–PCA released, relay 8–BC reoperates and the central station is now prepared to respond to the transmitter start code sequence in the same manner as previously described.

In the event that another outlying station transmitter-distributor is supplied with tape and thus initiates a new polling cycle, relays 8–VS, 8–BC and 8–ESC release as described above followed by the release of relays 8–PC and 8–WC.

The outlying station receives a message

When the central station operator desires to send a message to an outlying station, sequential selector 803 is placed in the select condition by the transmission of the end-of-message code sequence Figures-H-Letters derived from the previous message or the operation of the central station line reset key. With sequential selector 803 in the select condition, the call directing code character for the selected outlying station or stations is transmitted.

The printing unit associated with sequential selector 803 is selected by the call directing code sequence BE. As previously described, the reception of the call directing code sequence BE disables the print suppress mechanism associated with sequential selector 803 whereby the printing unit, not shown, is enabled to print the succeeding message characters. When the end-of-message code sequence Figures-H-Letters is received, the print suppress mechanism is re-enabled, blocking the printing unit.

Printer-perforator 835 is selected by the call directing code sequence AE. If the call directing code sequence AE is received, contacts 829 momentarily close completing an operating path from ground via contacts 829 and the winding of directing code relay 8–DC to battery operating relay 8–DC which locks via make contacts 8–DC–2 and contacts 825. Relay 8–DC operated opens the previously described energizing path for selector magnet 833 whereby printer-perforator 835 is unblinded and thus prints the succeeding message characters. The reception of the end-of-message code sequence Figures-H-Letters momentarily opens contacts 825 in the previously described locking path for relay 8–DC releasing relay 8–DC which in turn reblinds printer-perforator 835.

In the event that the central station desires an answerback response to the selection of printer-perforator 835, the call directing code sequence is preceded by the answerback code sequence K–K–Letters. The reception of the code character K opens and locks contacts 831 opening the previously described operating path for relay 8–KR. Relay 8–KR released completes the previously described energizing path for selector magnet 847 via contacts 8–KR–1 blinding sequential selector 849. In addition, relay 8–KR operated opens one of the previously described discharge paths for condenser 859 via the make contacts of continuity contacts 8–KR–2 and completes a path shunting contacts 8–TA–2, 8–PCA–2, and 8–WC–1 in the previously described discharge path for condenser 859.

The subsequent reception of the call directing code sequence AE operates relay 8–DC in the same manner as previously described. In addition, the reception of the call directing code sequence AE momentarily opens contacts 827 opening the previously described discharge path for condenser 859 for a sufficient period of time to enable charging current to flow through the secondary winding of relay 8–VG for at least the duration of four selective units. Relay 8–VG operates for two or four selective units, depending on whether relay 8–PCA is operated or released, thus impressing an answerback character on the central station receiving loop.

The central station in response to the answerback character proceeds to send the next call directing code sequence, if any, followed by the end-of-address code sequence Carriage Return-Line Feed. In response to the end-of-address code sequence, contacts 831 reclose re-operating relay 8–KR which in turn completes the previously described discharge path for condenser 859 via the make contacts of continuity contacts 8–KR–2 and opens the previously described energizing path for selector magnet 847 via contacts 8–KR–1. Printer-perforator 835 now receives the message in the same manner as previously described.

The preferred embodiment of the invention disclosed and described herein is by way of illustration only and not to be considered as limited thereto but capable of modification and rearrangement without departing from the spirit of the invention and within the scope of the appended claims.

What is claimed is:

1. In a telegraph system, a telegraph station, a transmission channel extending from said station, a code generator at said station for transmitting to said channel consecutive code patterns each comprising a sequence of variable code signals and means at said station responsive to the reception of a predetermined code signal from said channel for enabling said code generator to transmit to said channel a portion only of said sequence of variable code signals.

2. In a telegraph system, a telegraph station, a transmission channel extending from said station, a code generator at said station for transmitting to said channel consecutive code patterns comprising sequences of variable code signals and means at said station responsive to the reception of a predetermined code signal from said channel for enabling said code generator to transmit to said channel the last sequential code signal only of said code pattern.

3. In a telegraph system, a telegraph station, a two-way channel extending from said station, a code generator at said station for transmitting to said channel consecutive code patterns, each of said code patterns comprising a first and second portion of variable code characters, and means at said station jointly responsive to the transmission of each of said code patterns and the reception of a predetermined code signal from said channel for enabling said code generator to transmit to said channel said second portion only of the next consecutive one of said code patterns.

4. In a telegraph system, a telegraph station, a two-way channel extending from said station, a code generator at said station for transmitting to said channel consecutive code patterns each of said code patterns comprising variable sequences of code characters and a final one of said code characters and means at said station jointly responsive to the transmission of each of said code patterns and the reception of a predetermined code signal from said channel for enabling said code generator to transmit to said channel said final one code character only of the next consecutive one of said code patterns.

5. In a telegraph system, a telegraph station, a two-way channel extending from said station, a code generator at said station for transmitting to said channel consecutive patterns of code characters, wherein the sequence of all but the first character of each of said patterns is identical with the sequence of all but the last character of the next consecutive one of said patterns and means at said station jointly responsive to the transmission of each of said code patterns and the reception of a predetermined code signal from said channel for enabling said code generator to transmit to said channel said last character only of the next consecutive one of said code patterns.

6. In a telegraph system, a transmission channel, means for transmitting successive patterns of signals to said channel, each of said patterns comprising a plurality of variable code signals, means responsive to the reception of a signal from said channel for transmitting the variable code signals of said next successive pattern to said channel and further means responsive to the reception of a different signal for transmitting a portion only of said variable code signals of said next successive pattern to said channel.

7. In a telegraph system, a transmission channel, transmitting means for transmitting signals to said channel, means for preparing consecutive patterns of code signals comprising a plurality of variable code characters, means responsive to the reception of a signal from said channel for sequentially applying said code characters of said prepared pattern to said transmitting means and further means responsive to the reception of a different signal for applying a portion only of said sequence of code characters to said transmitting means.

8. In a telegraph system, a transmission channel, transmitting means for transmitting code signals to said channel, means for preparing consecutive patterns of code signals comprising a plurality of variable code characters, means responsive to the reception of a signal from said channel for sequentially applying said code characters of said prepared pattern to said transmitting means and further means effective upon the transmission of each of said patterns for applying a portion only of said sequence of code characters of the next consecutive one of said patterns to said transmitting means in response to the reception of a different signal.

9. In a telegraph system, a transmission channel, transmitting means for transmitting code signals to said channel, means for preparing consecutive patterns of code signals comprising a plurality of variable code characters, means responsive to the reception of a signal from said channel for sequentially applying said code characters of said prepared pattern to said transmitting means and further means effective upon the transmission of each of said patterns for applying the last sequential character only of the next consecutive one of said patterns to said transmitting means in response to the reception of a different signal.

10. In a telegraph system, a transmission channel, a plurality of transmitters associated with said channel and individually contionable to transmit messages, means for transmitting consecutive transmitter selection code signals, means selectively responsive to said transmitter selection code signals and rendered effective upon the prior conditioning of the selected transmitter for preparing said selected transmitter and transmitting a first response signal, other means selectively responsive to said transmitter selection code signals and rendered effective in the absence of a prior conditioning of said selected transmitter for transmitting a second response signal, means controlled by said second response signal for initiating the transmission of the next consecutive one of said transmitter selection code signals, means controlled by said first response signal for transmitting a different code signal and means responsive to said different code signal for initiating the operation of said prepared transmitter.

11. In a telegraph system, a telegraph station, a transmission channel extending from said station, a plurality of transmitters associated with said channel and individually conditionable to transmit messages, means in said station for transmitting consecutive sequences of transmitter selection code signals, means selectively responsive to said sequence of transmitter selection code signals and rendered effective upon the prior conditioning of the selected transmitter for preparing said selected transmitter and transmitting a first response signal, other means selectively responsive to said transmitter selection code signals and rendered effective in the absence of a prior conditioning of said selected transmitter for transmitting a second response signal, means controlled by said second response signal for transmitting a portion only of the next consecutive one of said sequences of transmitter selection code signals, means controlled by said first response signal for transmitting a different code signal and means responsive to said different code signal for initiating the operation of said prepared transmitter.

12. In a telegraph system, a transmission channel, a plurality of transmitters associated with said channel and individually conditionable to transmit messages, means for transmitting consecutive patterns of transmitter selection code signals comprising sequences of variable code characters, means selectively responsive to said pattern of transmitter selection code signals and rendered effective upon the prior conditioning of the selected transmitter for preparing said selected transmitter and transmitting a first response signal, other means selectively responsive to said pattern of transmitter selection code signals and rendered effective in the absence of a prior conditioning of said selected transmitter for transmitting a second response signal, means controlled by said second response signal for transmitting the last sequential character only of the next consecutive one of said patterns of transmitter selection code signals, means controlled by said first response signal for transmitting a different code pattern and means responsive to said different code pattern for initiating the operation of said prepared transmitter.

13. In a selection system, a control station, a transmission channel extending from said station, a code generator at said station for transmitting to said channel consecutive selection code patterns, each of said patterns comprising a first and second portion of variable signals, and means responsive to a predetermined condition of said channel for enabling said code generator to transmit said second portion only of the next consecutive one of said patterns.

14. In a selection system for selecting remote stations on a common transmission channel, a code generator for transmitting to said channel station selection code patterns one at a time and in rotation, each of said patterns comprising a first and second portion of variable code signals, and means responsive to a predetermined condition of said channel for enabling said code generator to transmit said second portion only of the next successive one of said patterns.

15. In a selection system for selecting remote stations on a common transmission channel, a code generator for transmitting to said channel station selection code patterns one at a time and in rotation, each of said patterns comprising a plurality of variable code signals, means at each of said remote stations selectively responsive to the reception of an individual one of said patterns for impressing a predetermined condition on said channel, and means responsive to said predetermined condition on said channel for enabling said code generator to transmit a portion only of the plurality of variable code signals of the next successive one of said patterns.

16. In a selection system, a control station, a plurality of outlying stations, a transmission channel extending from said control station to said outlying stations, coding means at said control station for generating selection code patterns, each of said patterns comprising a first and second portion of variable code signals, transmitting means for sequentially impressing each of said patterns on said channel, means at each of said outlying station selectively responsive to the reception of an individual one of said patterns for impressing an answerback signal on said channel, and means responsive to the reception of said answerback signal for enabling said transmitting means to impress on said channel said second portion only of the next consecutive one of said sequence of patterns.

17. In a selection system, a control station, a plurality of outlying stations, a transmission channel extending from said control station to said outlying stations, coding means at said control station for generating transmitter selection code patterns, each of said patterns comprising a first and second portion of variable code signals, transmitting means for sequentially impressing each of said patterns on said channel, a storage transmitter at each of said outlying stations selectable by an individual one of said patterns, means associated with said storage transmitter and jointly responsive to the absence of storage material in said associated storage transmitter and the reception from said channel of said individual pattern for impressing an answerback signal on said channel, and means responsive to the reception of said answerback signal for enabling said transmitting means to impress on said channel said second portion only of the next consecutive one of said sequence of patterns.

References Cited in the file of this patent

UNITED STATES PATENTS 2,667,533   Zenner _____ Jan. 26, 1954